(12) United States Patent
Aston et al.

(10) Patent No.: US 10,416,928 B2
(45) Date of Patent: Sep. 17, 2019

(54) DATA STORAGE SYSTEM AND PROCESS FOR DATA COMPRESSION OF DISTRIBUTED DATA IN A SCALABLE CLUSTER SYSTEM AND COMPUTER PROGRAM FOR SUCH DATA STORAGE SYSTEM

(71) Applicant: Hitachi, Ltd., Tokyo (JP)

(72) Inventors: Christopher James Aston, Hughenden Valley (GB); Mitsuo Hayasaka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 22 days.

(21) Appl. No.: 15/623,735

(22) Filed: Jun. 15, 2017

(65) Prior Publication Data
US 2018/0364949 A1    Dec. 20, 2018

(51) Int. Cl.
*G06F 3/06* (2006.01)

(52) U.S. Cl.
CPC ............ *G06F 3/0661* (2013.01); *G06F 3/067* (2013.01); *G06F 3/0608* (2013.01)

(58) Field of Classification Search
None
See application file for complete search history.

(56) References Cited

U.S. PATENT DOCUMENTS

| 6,826,615 B2 | 11/2004 | Barrall et al. |
| 7,457,822 B1 | 11/2008 | Barrall et al. |
| 2014/0074805 A1* | 3/2014 | Kapoor ............ G06F 17/30501 707/693 |

FOREIGN PATENT DOCUMENTS

| WO | 01/28179 A2 | 4/2001 |
| WO | 2012/071335 A1 | 5/2012 |

* cited by examiner

*Primary Examiner* — Denise Tran
(74) *Attorney, Agent, or Firm* — Mattingly & Malur, PC

(57) ABSTRACT

The present disclosure relates to storing a data object to one or more storage devices of the data storage system in units of data blocks; storing a metadata structure for the data object including one or more direct metadata nodes, and optionally including a root metadata node and optionally further including one or more indirect metadata nodes, each direct metadata node including block pointers referencing respective data blocks of the respective data object; dividing the data object into plural compression units; compressing each compression unit of the plural compression units to a respective compressed unit associated with the respective compression unit; modifying, for each compression unit, block pointers of the direct metadata node referencing respective data blocks of the respective compression unit on the basis of the associated compressed unit; and managing I/O access to the data object based on the metadata structure of the data object.

14 Claims, 24 Drawing Sheets

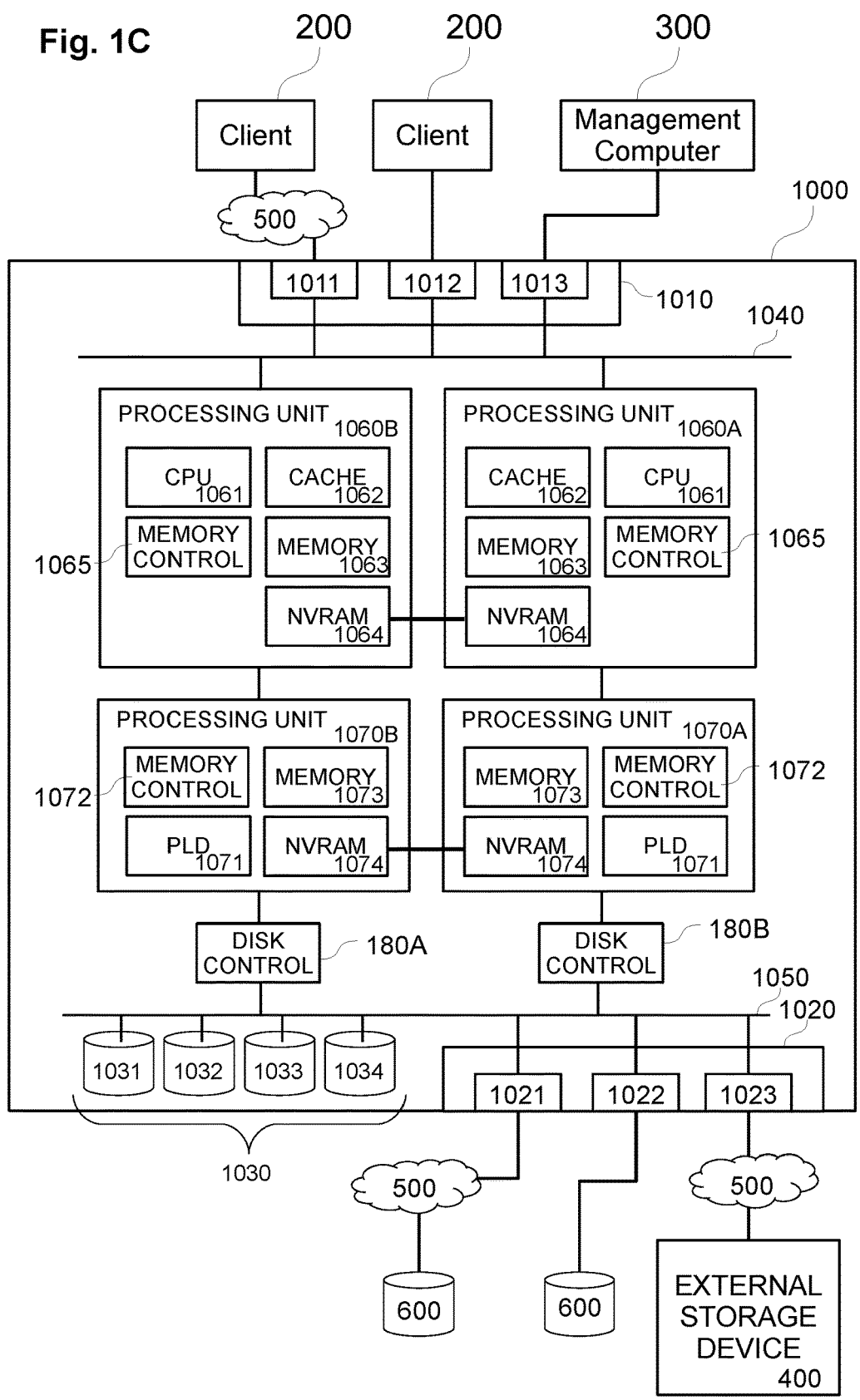

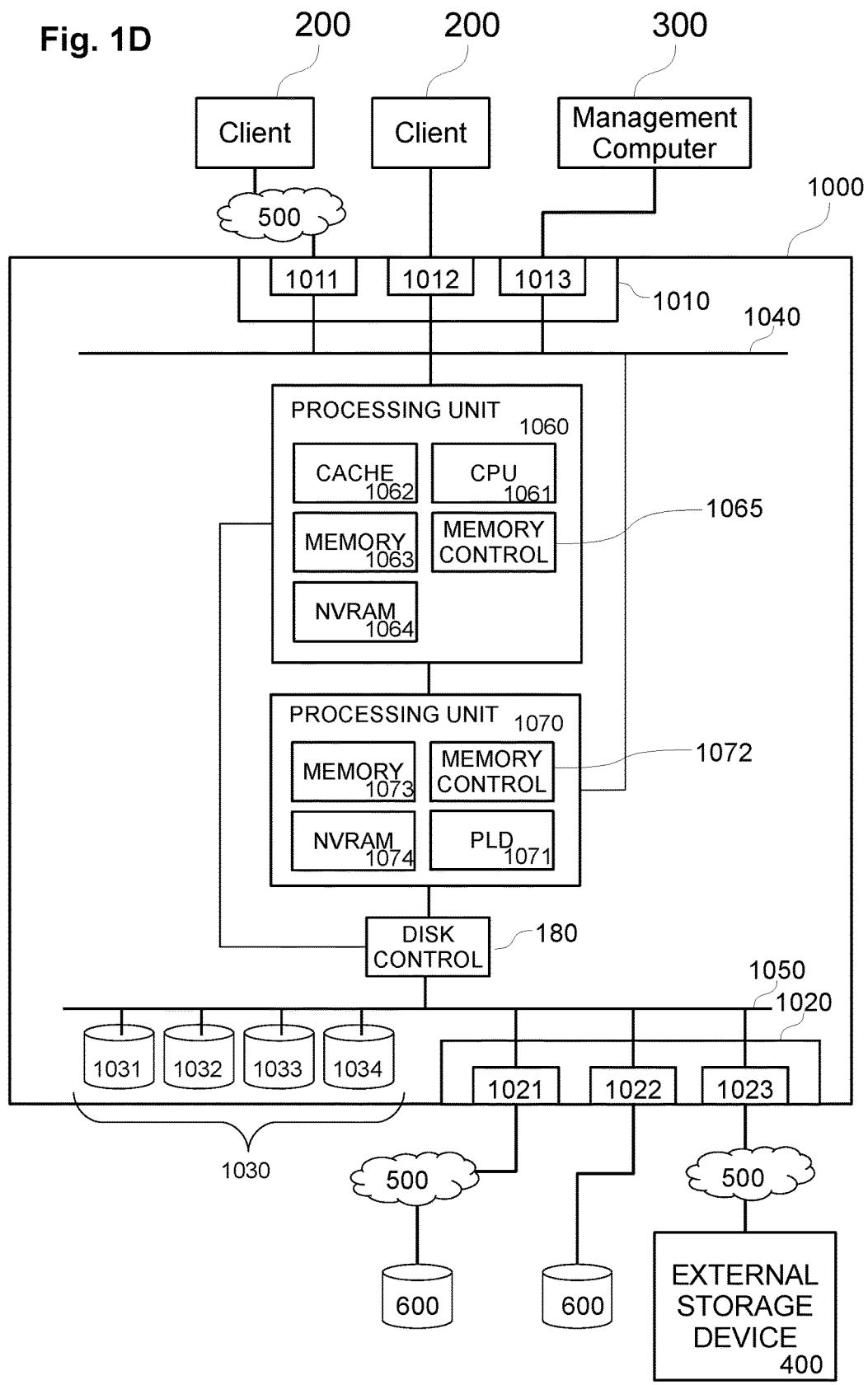

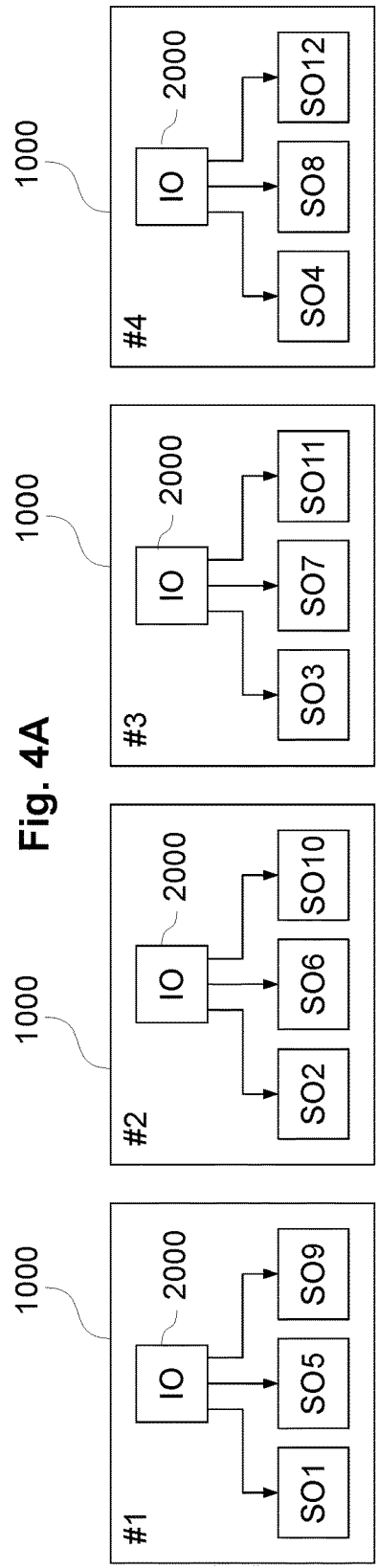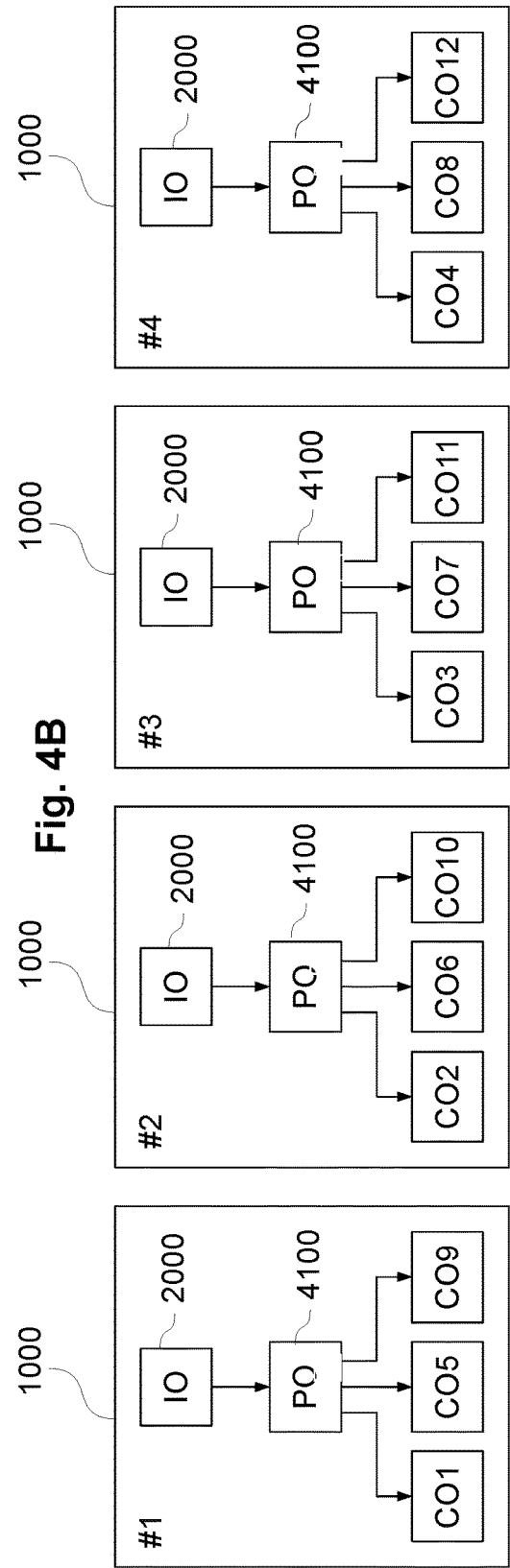

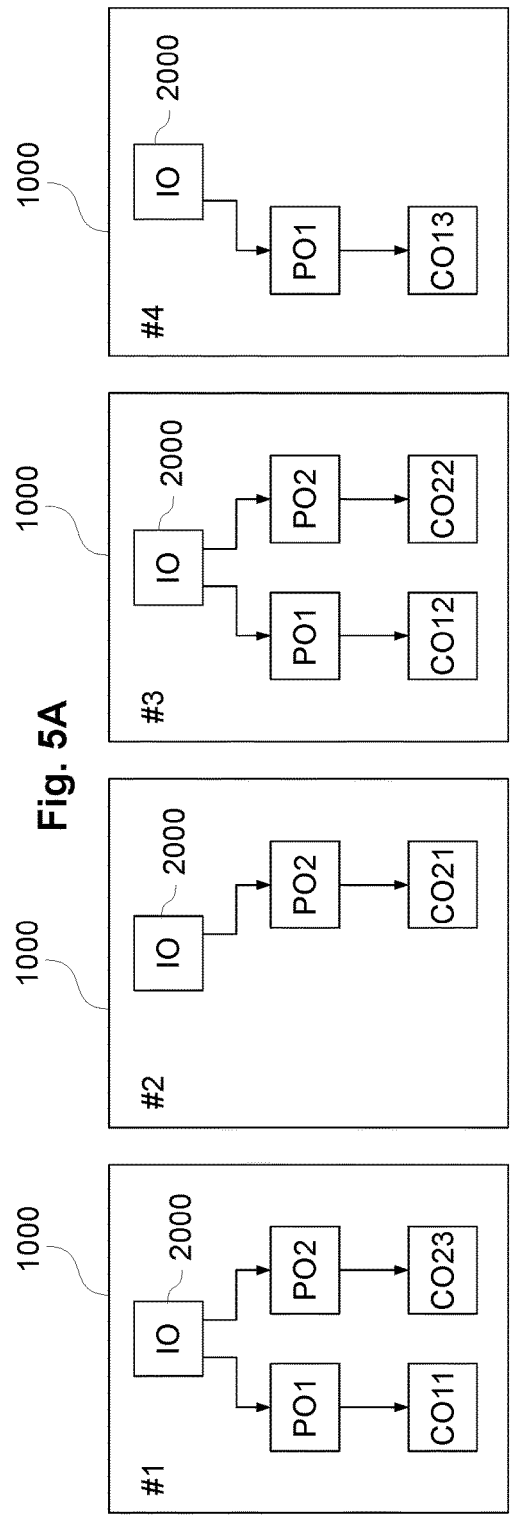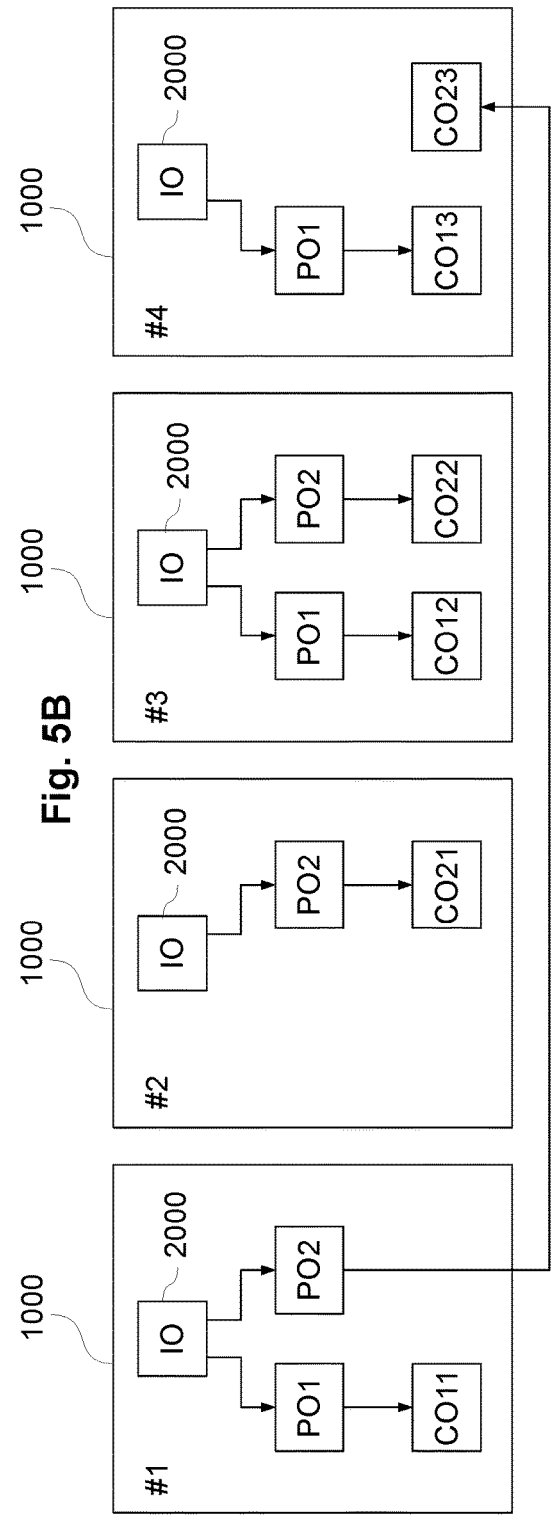

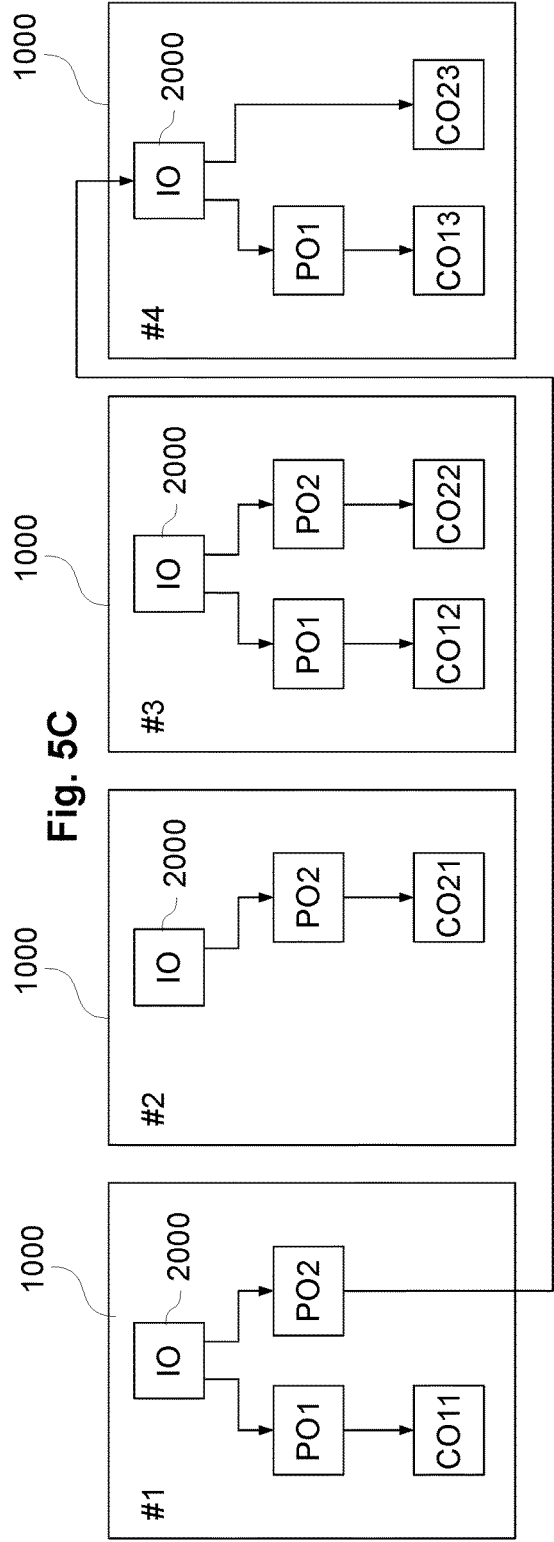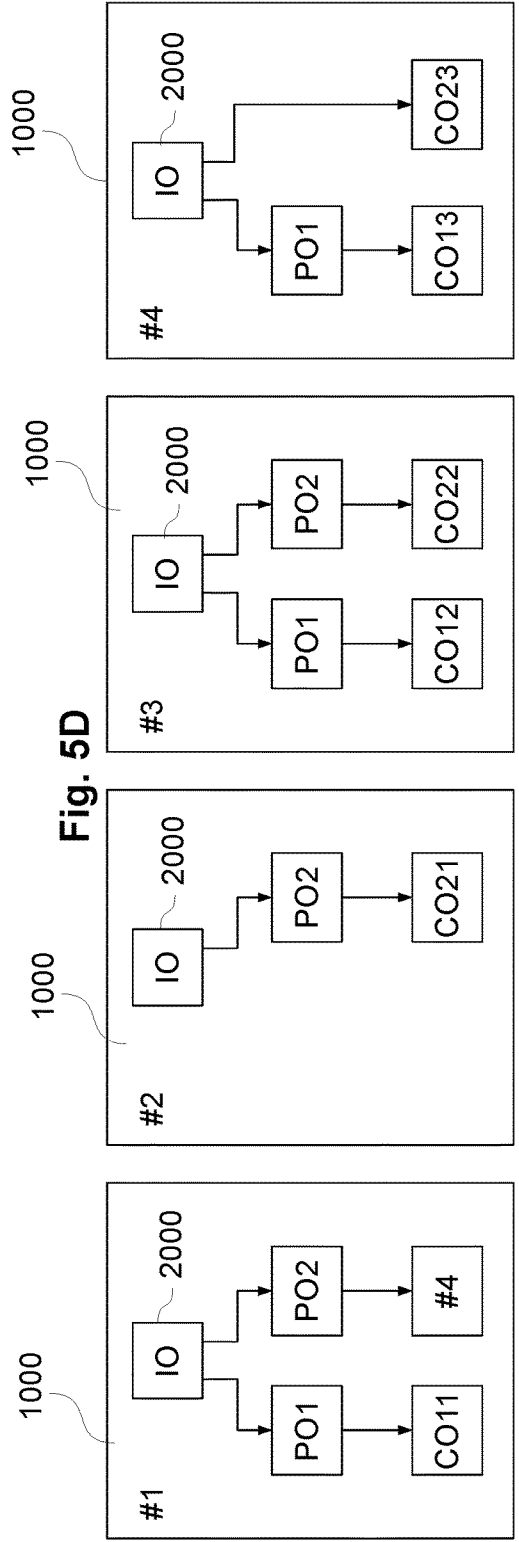

DATA STORAGE SYSTEM AND PROCESS FOR DATA COMPRESSION OF DISTRIBUTED DATA IN A SCALABLE CLUSTER SYSTEM AND COMPUTER PROGRAM FOR SUCH DATA STORAGE SYSTEM

The present disclosure relates to a data storage system and/or a data storage apparatus connectable to one or more host computers, and in particular a data storage system and/or a data storage apparatus processing I/O requests.

The present invention specifically relates to a data storage system including a cluster system of a plurality of node apparatuses storing data objects in a distributed manner across the node apparatuses of the cluster system and the handling of I/O access requests to the data objects.

Data objects may relate to objects of a file system (such e.g. as files and directories to allow for I/O file access to data objects being file system objects) and/or logical or virtual volumes (such as e.g. LUs to allow for I/O block access to data objects being logical or virtual volumes), or other types of data objects.

Further, the present disclosure relates to methods of control of such data storage system and/or a data storage apparatus. Other aspects may relate to computer programs, computer program products and computer systems to operate software components including executing processing I/O requests at such data storage system and/or a data storage apparatus.

BACKGROUND

In the prior art, it is known to manage I/O requests from clients to data stored in units of blocks on storage devices of a storage apparatus based on a metadata tree structure including a root node directly or indirectly pointing to blocks e.g. via indirect nodes pointing to direct nodes and via direct nodes pointing to blocks of data, e.g. in connection with a log write method which writes modified data to newly allocated blocks.

Below, some potential objects are described. Exemplary embodiments and aspects as described in the following may be proposed to solve one, more or all of the below objects.

It is an object of the present invention to provide aspects in a data storage system in which a cluster system of plural node apparatuses is enabled to efficiently and reliably manage I/O access to one or more data objects distributed across a plurality of node apparatuses and is, at the same time, enabled to efficiently and reliably utilize available storage space in the distribution of data across one or more node apparatuses, including increased storage efficiency by way of data compression techniques.

It is an object of the present invention to provide aspects in a data storage system, which provides an efficient and reliable scale-out approach in which a cluster system of plural node apparatuses is enabled to efficiently and reliably manage I/O access to one or more data objects distributed across a plurality of node apparatuses and is, at the same time, enabled to efficiently and reliably utilize available storage space in the distribution of data across one or more node apparatuses, including increased storage efficiency by way of data compression techniques.

It is another object of the present invention to provide aspects in a data storage system, which allows to efficiently and reliably manage the I/O access independent of data location in the cluster system enabled to perform data compression of data across one or more node apparatuses.

It is yet another object of the present invention to provide aspects in a data storage system, which allows to efficiently and reliably allow for rebalancing and redistributing of data across node apparatuses of the cluster system by being, at the same time, enabled to perform data compression of data across one or more node apparatuses.

SUMMARY

According to the present disclosure, for solving one or more of the above objects, there is proposed a computer program, a method and a data storage system according to independent claims. Dependent claims related to preferred embodiments. According to exemplary aspects, there may be provided a computer program including instructions to cause a computer to execute a method for managing a data storage system.

According to some exemplary aspects, there may be provided a computer program including instructions to cause a computer to execute a method for managing data compression of data objects in a data storage system, which may be comprising: storing a data object to one or more storage devices of the data storage system in units of data blocks; storing a metadata structure for the data object including one or more direct metadata nodes, each direct metadata node including block pointers referencing respective data blocks of the respective data object, for managing I/O access to the data object based on the metadata structure of the data object; dividing the data object into plural compression units; compressing each compression unit of the plural compression units to a respective compressed unit associated with the respective compression unit; and/or modifying, for each compression unit, block pointers of the direct metadata node associated with respective data blocks of the respective compression unit on the basis of the associated compressed unit.

Preferably, managing I/O access to the data object after compression thereof may be based on the metadata structure of the data object and based on the modified block pointers of direct metadata nodes of the metadata structure of the data object.

According to exemplary aspects, the metadata structure for the data object may include a metadata tree including a root metadata node and the one or more direct metadata nodes, and optionally further including one or more indirect metadata nodes.

According to exemplary aspects, a metadata node structure of the metadata tree of the data object may be built based on the data object in the uncompressed state.

According to exemplary aspects, upon compression of the data object, managing I/O access to the data object may be based on the same tree structure of the metadata tree of the data object as built based on the data object in the uncompressed state, and preferably further be based on the modified block pointers of the direct metadata nodes of the metadata tree of the data object.

According to exemplary aspects, each block pointer of a direct metadata node of the metadata structure may be associated with a respective data block being included in one of the compression units of the data object in the uncompressed state.

According to exemplary aspects, for each block pointer, the corresponding modified block pointer may be associated with the compressed unit that is associated with the compression unit including the respective data block.

According to exemplary aspects, for each block pointer, the corresponding modified block pointer may indicate a location of the associated block in the compressed unit associated with the respective the compression unit including the associated data block.

According to exemplary aspects, each modified block pointer may indicate a block pointer type of a group of block pointer types, and the group of block pointer types may include, for example, a first block pointer type indicating that the associated data block is located at a start of the compressed unit associated with the respective the compression unit including the associated data block; and/or a second type block pointer type indicating that the associated data block is located at an end of the compressed unit associated with the respective the compression unit including the associated data block; and optionally may further include a third type block pointer type indicating that the associated data block is located at a middle of the compressed unit associated with the respective the compression unit including the associated data block.

According to exemplary aspects, for managing I/O access directed to a respective data block of the data object based on the metadata structure of the data object, the method may further include: identifying a block pointer associated with the respective data block of the data object, observing the identified block pointer, observing multiple other modified block pointers of the direct metadata node, which includes the identified block pointer, and/or identifying a compressed unit associated with the respective compression unit including the respective data block based on the identified block pointer and/or the observed multiple other modified block pointers of the direct metadata node, which includes the identified block pointer.

According to exemplary aspects, at least one of the observed block pointers including the identified block pointer and the multiple other modified block pointers of the direct metadata node, which includes the identified block pointer, may be indicative of a compressed length of the compressed unit associated with the respective compression unit including the respective data block.

According to exemplary aspects, at least one of the observed block pointers including the identified block pointer and the multiple other modified block pointers of the direct metadata node, which includes the identified block pointer, may be indicative of an offset of the compressed unit, which is associated with the respective compression unit including the respective data block, in the data object in the compressed state.

According to exemplary aspects, the method may further comprise determining an offset of the compressed unit, which is associated with the respective compression unit including the respective data block, in the data object in the compressed state based on compressed lengths of one or more compression units preceding the respective compressed unit associated with the respective compression unit including the respective data block.

According to exemplary aspects, the method may further comprise: receiving an I/O access request directed to a respective data block of the data object in the uncompressed state; identifying a compressed unit associated with the compression unit including the respective data block based on the modified block pointers; decompressing the identified compressed unit to obtain the compression unit including the respective data block; and/or executing the I/O access request based on the obtained compression unit.

According to exemplary aspects, identifying the compressed unit associated with the compression unit including the respective data block may be performed based on a compressed length of the compressed unit associated with the compression unit determined based on the modified block pointers and/or based on an offset of the compressed unit, which is associated with the respective compression unit including the respective data block, in the data object in the compressed state.

According to exemplary aspects, the method may further comprise: dividing the data object into a plurality of compression regions, each compression region including one or more of the compression units; and/or storing, for each compression region, the one or more compressed units of the same respective compression region into a concatenated compressed region contiguously comprising the compressed units of the respective compression region, optionally further including padding units between adjacent compressed units to provide a padding space for re-written compressed units of increased compressed length.

According to exemplary aspects, the method may further comprise: receiving a write access request directed to a respective data block of the data object in the uncompressed state; identifying a compressed unit associated with the compression unit including the respective data block based on the modified block pointers; decompressing the identified compressed unit to obtain the compression unit including the respective data block; executing the write access request based on the obtained compression unit to modify the obtained compression unit based on the write request; re-compressing the modified compression unit; and/or storing the re-compressed compression unit as a new compressed unit in place of the previously identified compressed unit into the compressed region; optionally further including shifting one or more following compressed units of the compressed region, in particular when a compressed length of the re-compressed compression unit has increased or when a compressed length of the re-compressed compression unit has decreased.

According to yet another aspect there may be provided a data storage system, comprising: a plurality of node apparatuses communicably connected to each other, the data storage system being configured, in particular by a processor, to execute: storing a data object to one or more storage devices of the data storage system in units of data blocks; storing a metadata structure for the data object including one or more direct metadata nodes, each direct metadata node including block pointers referencing respective data blocks of the respective data object; managing I/O access to the data object based on the metadata structure of the data object; dividing the data object into plural compression units; compressing each compression unit of the plural compression units to a respective compressed unit associated with the respective compression unit; and/or modifying, for each compression unit, block pointers of the direct metadata node associated with respective data blocks of the respective compression unit on the basis of the associated compressed unit; wherein managing I/O access to the data object after compression thereof may be based on the metadata structure of the data object and/or based on the modified block pointers of direct metadata nodes of the metadata structure of the data object.

According to yet another aspect there may be provided a node apparatus for use in a data storage system as discussed above, comprising: an interface for establishing a communication connection to one or more other node apparatuses of the data storage system; one or more storage devices for storing data; and/or a storage controller for controlling a data storage distribution in the data storage system, including: storing a data object to one or more storage devices of the data storage system in units of data blocks; storing a metadata structure for the data object including one or more direct metadata nodes, each direct metadata node including block pointers referencing respective data blocks of the respective data object; managing I/O access to the data object based on the metadata structure of the data object; dividing the data object into plural compression units; compressing each compression unit of the plural compression units to a respective compressed unit associated with the respective compression unit; and/or modifying, for each compression unit, block pointers of the direct metadata node associated with respective data blocks of the respective compression unit on the basis of the associated compressed unit; wherein managing I/O access to the data object after compression thereof may be based on the metadata structure of the data object and/or based on the modified block pointers of direct metadata nodes of the metadata structure of the data object.

According to yet another aspect there may be provided a method for managing data compression of data in a data storage system, comprising: storing a data object to one or more storage devices of the data storage system in units of data blocks; storing a metadata structure for the data object including one or more direct metadata nodes, each direct metadata node including block pointers referencing respective data blocks of the respective data object; managing I/O access to the data object based on the metadata structure of the data object; dividing the data object into plural compression units; compressing each compression unit of the plural compression units to a respective compressed unit associated with the respective compression unit; and/or modifying, for each compression unit, block pointers of the direct metadata node associated with respective data blocks of the respective compression unit on the basis of the associated compressed unit; wherein managing I/O access to the data object after compression thereof may be based on the metadata structure of the data object and/or based on the modified block pointers of direct metadata nodes of the metadata structure of the data object.

The following aspects may relate to background of de-duplication and managing a de-duplication object, and this may relate to synergistic aspects that can be combined with exemplary embodiments, e.g. in that a de-duplication object (or alternative holding object) may be compressed by data compression aspects as discussed above and below.

The method may comprise: storing plural data objects to one or more storage devices of the data storage system in units of blocks; managing (processing) I/O access to the plural data objects based on metadata structures being respectively provided for each data object, each metadata structure including a root metadata node and optionally including one or more direct metadata nodes, and optionally further including one or more indirect metadata nodes; and/or storing a (first) metadata object for managing de-duplicated data blocks based on a metadata structure of the (first) metadata object including a root metadata node and optionally including one or more direct metadata nodes, and optionally further including one or more metadata indirect nodes. According to some exemplary preferred aspects, at least one direct metadata node of the metadata structure of the (first) metadata object may includes a block reference pointing to a de-duplicated data block being associated with two or more data objects. According to some exemplary preferred aspects, at least one direct metadata node of the data object may include a block reference pointing to a data block being associated with the respective data object, and/or direct metadata nodes of the metadata structure of the first metadata object (e.g. a de-duplication object) may only include block references pointing to de-duplicated data blocks being associated with two or more data objects. According to some exemplary preferred aspects, if it is determined that a duplicate data block corresponding to the new data block is already stored in the data storage system and the duplicate data block is pointed to by a direct metadata node of the first metadata object, the method further comprises: writing or updating at least one direct metadata node of the target data object to include an object reference to the first metadata object to indirectly reference the duplicate data block. According to some exemplary preferred aspects, the method may further comprise: storing a second metadata object for managing reference counts of data blocks based on a metadata structure of the second metadata object including a root metadata node and optionally including one or more direct metadata nodes, and optionally further including one or more metadata indirect nodes. Preferably, at least one direct metadata node of the metadata structure of the second metadata object may include a block reference pointing to a data block storing information indicative of a reference count of a certain data block pointed to by a direct metadata node of the first metadata object. According to some exemplary preferred aspects, the respective direct metadata node of the metadata structure of the second metadata object and the respective data block storing information indicative of the reference count of the certain data block pointed to by the respective direct metadata node of the first metadata object are stored on a same node apparatus in the data storage system as the certain data block and the respective direct metadata node of the first metadata object.

The following aspects may relate to background of managing large objects as parent and child objects, and this may relate to synergistic aspects that can be combined with exemplary embodiments, e.g. in that large objects and specifically child objects thereof are compressed by data compression aspects as discussed above and below.

The method may be comprising: managing I/O access to a respective data object based on metadata structures including a metadata structure being associated with a parent object of the respective data object and plural metadata structures being respectively associated with one of a plurality of child objects of the respective data object. For each child object, the metadata structure of the respective child object is stored to one of the node apparatuses of the group of node apparatuses for managing locations of data blocks of the data object. The metadata structure of the respective child object includes a root metadata node and optionally includes one or more direct metadata nodes, optionally further including one or more indirect metadata nodes. The root metadata node of the respective child object(s) may include references (pointers) to direct and/or indirect metadata nodes of the respective child object(s). The indirect metadata node of the respective child object(s) may include references (pointers) to direct and/or indirect metadata nodes of the respective child object(s). The direct metadata nodes of the respective child object(s) may include references (pointers) to data blocks storing data of the data object. The metadata structure of the parent object associated with the data object is distributed across the plural node apparatuses of the group of node apparatuses for managing locations of child objects of the data object. In particular, the metadata structure of the parent object or parts thereof may be stored in a distributed manner on different node apparatuses. For example, each of plural node apparatuses may store the metadata structure of the parent object, or different node apparatuses may store respective parts of the metadata structure of the parent object, preferably such that each of plural parts of the metadata structure of the parent object are stored on at least one node apparatus. The metadata structure of the parent object includes, on each node apparatus of the group of node apparatuses, a root metadata node and optionally includes one or more direct metadata nodes, optionally further including one or more indirect metadata nodes. The root metadata node of the parent object may include references (pointers) to data blocks, direct and/or indirect metadata nodes of the parent object, and/or to root metadata nodes of child objects (the latter may be realized by pointers to data blocks storing location information of the respective child objects or by pointers to root metadata nodes of child objects on the same or other apparatuses). The indirect metadata node of the parent object may include references (pointers) to direct and/or indirect metadata nodes of the parent object. The direct metadata nodes of the parent object may include references (pointers) to root metadata nodes of child objects on the same and/or other node apparatuses. This may be realized by pointers to data blocks storing location information of the respective child objects or by pointers to root metadata nodes of child objects on the same or other apparatuses. According to some exemplary preferred aspects, the parent object on a certain node apparatus includes object-references indicating locations of one or more child objects of the data object; the parent object in the data storage system includes a respective object-references for each child object of the data object; and/or each child object is referenced by an object reference of the parent object on at least one of the node apparatuses. According to some exemplary preferred aspects, upon creation of the data object, the parent object on a certain node apparatus includes object-references indicating locations of the one or more child objects of the data object created on the same certain node apparatus; and/or, upon creation of the data object, each child object on a certain node apparatus is referenced by an object reference of the parent object on the same certain node apparatuses.

The following aspects may relate to background of managing distribution of data objects (compressed or uncompressed) across a cluster of node apparatuses, and this may relate to synergistic aspects that can be combined with exemplary embodiments.

According to some exemplary preferred aspects, the method further comprises: creating the data object; including: dividing the data of the data object into a plurality of data segments, each data segment having a size smaller than or equal to a pre-determined distribution size, storing the data segments in a distributed manner across the plural node apparatuses of the group of node apparatuses, creating a respective child object for each stored data segment, and/or creating a respective parent object on each node apparatus on which a child object is created. According to some exemplary preferred aspects, storing the data segments in a distributed manner across the plural node apparatuses of the group of node apparatuses is executed based on a deterministic distribution algorithm and/or based on a distribution map being generated based on a deterministic distribution algorithm. According to some exemplary preferred aspects, the method further comprises: receiving an I/O access request to access a target data segment of the data object on a receiving node apparatus, determining a child object node apparatus being the designated location of a child object associated with the target data segment based on a deterministic algorithm, sending an I/O access request to access the target data segment from the receiving node apparatus to the determined child object node apparatus, obtaining an object reference to the child object associated with the target data segment from the parent object on the determined child object node apparatus, and accessing the child object associated with the target data segment based on the object reference obtained from the parent object on the determined child object node apparatus. According to some exemplary preferred aspects, the method further comprises: accessing the child object associated with the target data segment on the determined child object node apparatus; or determining that the child object associated with the target data segment has been moved to another node apparatus based on the object reference obtained from the parent object on the determined child object node apparatus, and accessing the child object associated with the target data segment on the other node apparatus. According to some exemplary preferred aspects, the metadata structure of the parent object is distributed across the plural node apparatuses of the group of node apparatuses in that the complete metadata of the parent object is stored on each of the plural node apparatuses of the group of node apparatuses; or the metadata structure of the parent object is distributed across the plural node apparatuses of the group of node apparatuses in that each of the plural node apparatuses of the group of node apparatuses stores a respective part of the metadata structure of the parent object.

According to further aspects there may be provided data storage system connectable to one or more client computers, comprising a processing unit including a processor and/or a programmable logic device; a cache memory; and one or more storage devices and/or an interface to communicably connect with one or more storage devices; the processing unit being preferably adapted to execute one or more methods according to one or more of the above aspects and/or one or more methods of the present disclosure.

BRIEF DESCRIPTION OF THE DRAWINGS

FIG. 1C exemplarily shows a schematic diagram of another data storage apparatus according to some exemplary embodiments;

FIG. 1D exemplarily shows a schematic diagram of another data storage apparatus according to some exemplary embodiments;

FIG. 4A exemplarily shows a distribution of plural small data objects across a plurality of node apparatuses of a cluster system according to a hybrid scale-out approach according to some exemplary embodiments;

FIG. 4B exemplarily shows a distribution of plural large data objects across a plurality of node apparatuses of a cluster system according to a hybrid scale-out approach according to some exemplary embodiments;

FIG. 5A exemplarily shows a distribution of plural large data object across a plurality of node apparatuses of a cluster system according to a hybrid scale-out approach according to exemplary embodiments, and FIGS. 5B to 5D show a distribution of plural large data object across a plurality of node apparatuses of a cluster system according to a hybrid scale-out approach according to some exemplary embodiments after moving a data object segment to another node apparatus;

DETAILED DESCRIPTION OF THE ACCOMPANYING DRAWINGS AND EXEMPLARY EMBODIMENTS

Figure 1A:
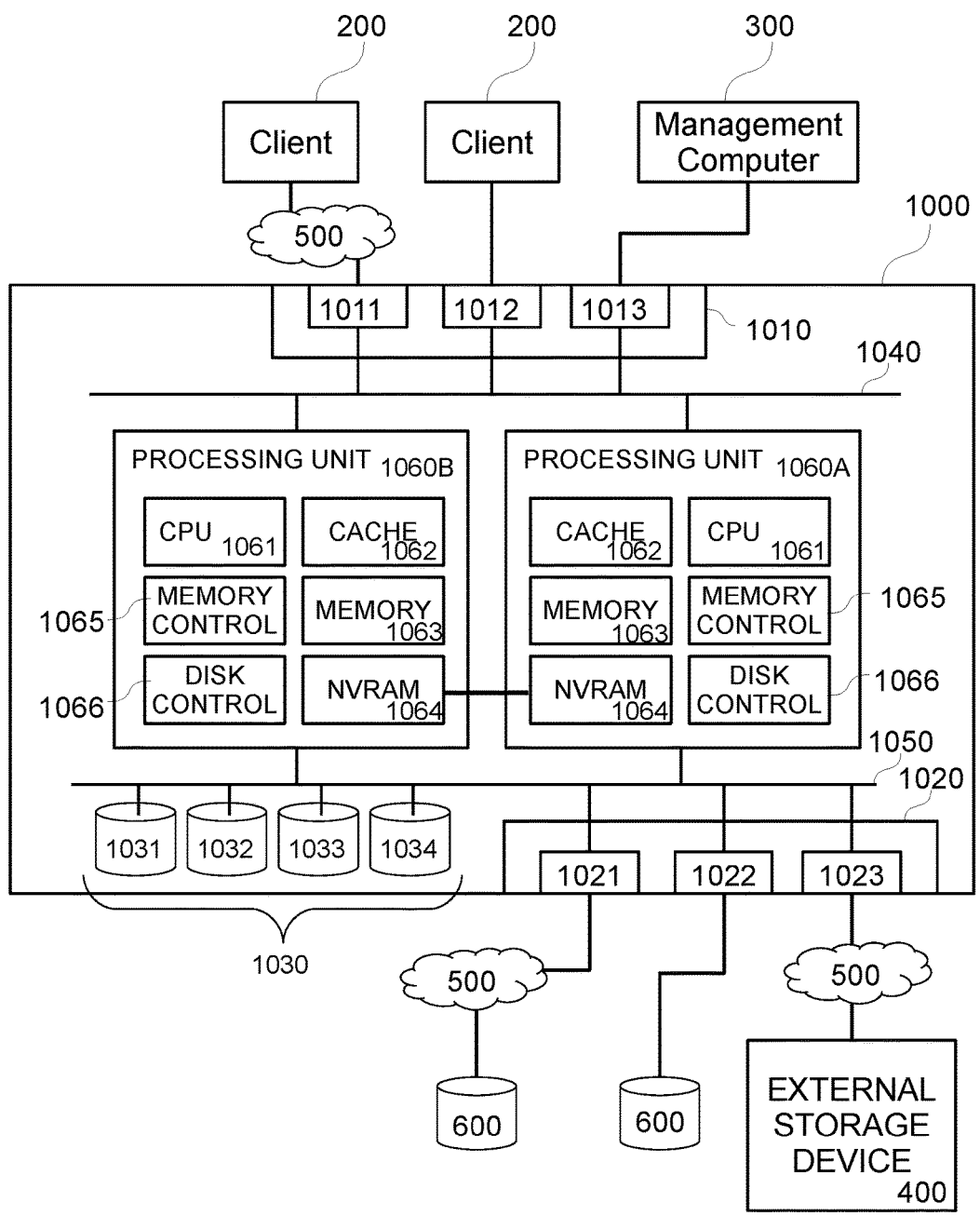
FIG. 1A exemplarily shows a schematic diagram of a data storage apparatus according to some exemplary embodiments.

In the following, preferred aspects and exemplary embodiments will be described in more detail with reference to the accompanying figures. Same or similar features in different drawings and embodiments are sometimes referred to by similar reference numerals.

It is to be understood that the detailed description below relating to various preferred aspects and preferred embodiments are not to be meant as limiting the scope of the present invention.

I. Terminology

As used in this description and the accompanying claims, the following terms shall have the meanings indicated, unless the context otherwise requires:

A "storage device" is a device or system that is used to store data. A storage device may include one or more magnetic or magneto-optical or optical disk drives, solid state storage devices, or magnetic tapes. For convenience, a storage device is sometimes referred to as a "disk" or a "hard disk." A data storage system may include the same or different types of storage devices having the same or different storage capacities.

A "RAID controller" is a device or system that combines the storage capacity of several storage devices into a virtual piece of storage space that may be referred to alternatively as a "system drive" ("SD"), a "logical unit" ("LU" or "LUN"), or a "volume." Typically, an SD is larger than a single storage device, drawing space from several storage devices, and includes redundant information so that it can withstand the failure of a certain number of storage devices without data loss. In exemplary embodiments, each SD is associated with a unique identifier that is referred to hereinafter as a "logical unit identifier" or "LUID," and each SD will be no larger than a predetermined maximum size, e.g., 2 TB-64 TB or more.

When commands are sent to an SD, the RAID controller typically forwards the commands to all storage devices of the SD at the same time. The RAID controller helps to overcome three of the main limitations of typical storage devices, namely that the storage devices are typically the slowest components of the storage system, they are typically the most likely to suffer catastrophic failure, and they typically have relatively small storage capacity.

A "RAID system" is a device or system that includes one or more RAID controllers and a number of storage devices. Typically, a RAID system will contain two RAID controllers (so that one can keep working if the other fails, and also to share the load while both are healthy) and a few dozen storage devices. In exemplary embodiments, the RAID system is typically configured with more or much more than two SDs. When a file server needs to store or retrieve data, it sends commands to the RAID controllers of the RAID system, which in turn are responsible for routing commands onwards to individual storage devices and storing or retrieving the data as necessary.

With some RAID systems, mirror relationships can be established between SDs such that data written to one SD (referred to as the "primary SD") is automatically written by the RAID system to another SD (referred to herein as the "secondary SD" or "mirror SD") for redundancy purposes. The secondary SD may be managed by the same RAID system as the primary SD or by a different local or remote RAID system. Mirroring SDs effectively provides RAID 1+0 functionality across SDs in order to provide recovery from the loss or corruption of an SD or possibly even multiple SDs in some situations.

A "file system" is a structure of files and directories (folders) stored in a file storage system. Within a file storage system, file systems are typically managed using a number of virtual storage constructs, and in exemplary embodiments, file systems are managed using a hierarchy of virtual storage constructs. In some embodiments, file systems are managed as a group of objects, each file or directory being associated with and/or managed as a file system object. Metadata of the file system, its configuration and the file system objects may be stored and managed in system objects and/or metadata objects. File system functionality of a file server may include object management, free space management (e.g. allocation) and/or directory management.

A "block" is generally a unit of storage of predetermined size. A "storage block" may be a unit of storage in the file system that corresponds to portion of physical storage in which user data and/or system data is stored. A file system object (discussed below) generally includes one or more blocks. A "data block" may refer to a unit of data (e.g. user data or metadata) to be written to one storage block. Typically the terms "block", "data block" or "data storage block" may be used interchangeably in the framework of the present disclosure since usually the allocation of a storage block is followed by writing the data to the storage block, hence "data block" may also refer to the unit of storage in the file system that corresponds to portion of physical storage in which user data and/or system data is stored.

In the exemplary embodiments, it is to be noted that the terms "objects" and "blocks" do not refer to only the application to file systems. Rather, objects may relate to logical volumes, logical units (LUNs), file systems, file system objects, object-type storage, and many others. In general, an object is an entity that stores related data in one or more data blocks, and data stored for an object may be extended, truncated, modified, deleted, over-written, to name but a few operations. Each data object has related metadata indicating information of logical and/or physical storage locations, such metadata being managed and stored as one or more tree structures of metadata nodes.

Exemplary embodiments of the present invention are described with reference to an exemplary file system of the type used in various file servers e.g. as sold by Hitachi Data Systems, although it should be noted that various concepts may be applied to other types of data storage systems.

An exemplary file server is described in U.S. Pat. No. 7,457,822, entitled "Apparatus and Method for Hardware-based File System", which is incorporated herein by reference, and PCT application publication number WO 01/28179 A2, published Apr. 19, 2001, entitled "Apparatus and Method for Hardware Implementation or Acceleration of Operating System Functions", which is incorporated herein by reference.

Another implementation of an exemplary file server and hardware-implemented file system management is set forth in U.S. application Ser. No. 09/879,798, filed Jun. 12, 2001, entitled "Apparatus and Method for Hardware Implementation or Acceleration of Operating System Functions", which is incorporated herein by reference.

An exemplary file storage system is described in WO 2012/071335 and U.S. application Ser. No. 13/301,241 entitled "File Cloning and De-Cloning in a Data Storage System", which was filed on Nov. 21, 2011, which are incorporated herein by reference.

An exemplary file server including various hardware-implemented and/or hardware-accelerated subsystems, for example, is described in U.S. patent application Ser. Nos. 09/879,798 and 10/889,158, which are incorporated by reference herein, and such file server may include a hardware-based file system including a plurality of linked sub-modules, for example, as described in U.S. patent application Ser. Nos. 10/286,015 and 11/841,353, which are incorporated by reference herein.

II. Exemplary Architectures of Data Storage Systems of Exemplary Embodiments

FIG. 1A exemplarily shows a schematic diagram of a data storage apparatus 1000 in a data storage system according to exemplary embodiments. One or more such data storage apparatuses 1000 may be used to realize a functional layer structure of any of FIGS. 2A to 2D below.

The data storage apparatus 1000 exemplarily includes an I/O interface 1010 (e.g. front-end interface) exemplarily having physical ports 1011, 1012 and 1013 and being connectable to one or more input/output devices 200 (such as e.g. the clients 200, and/or a management computer 300). Such I/O interface 1010 functions and/or functional handling thereof may be included in an interface/protocol layer 110 of any of FIGS. 2A to 2D below.

The data storage apparatus 1000 exemplarily further includes an external storage interface 1020 (e.g. back-end interface) exemplarily having physical ports 1021, 1022 and 1023 and being connectable to one or more externally connected storage devices 600 (e.g. one or more storage disks and/or storage flash modules) for storing metadata (e.g. system metadata) and data (e.g. user data) and/or to an external storage system 400 (which may include one or more externally connected storage devices such as storage disks and/or storage flash modules) for storing metadata (e.g. system metadata) and data (e.g. user data). Such external storage interface 1020 functions and/or functional handling thereof may be included in a storage device layer 140 of any of FIGS. 2A to 2D below.

The connections to the above interfaces 1010 and 1020 may be direct, via wired connections or wireless connections, and/or via communication networks, such as e.g. networks 500 in FIG. 1A.

Furthermore, exemplarily, the data storage apparatus 1000 further includes one or more internal storage devices 1031, 1032, 1033 and 1034 (e.g. one or more storage disks and/or storage flash modules), summarized as internal storage devices 1030, for storing metadata (e.g. system metadata) and data (e.g. user data).

In further exemplary embodiments, the data storage apparatus(es) may only include internal storage devices (not being connected to external storage devices/systems) and in further exemplary embodiments, the data storage apparatus(es) may only be connected to external storage devices/systems (not having internal storage devices).

The data storage apparatus 1000 exemplarily further includes a processing unit 1060A and optionally another processing unit 1060B. The processing units 1060A and 1060B exemplarily communicate with the interfaces 1010 and 1020, as well as with the internal storage devices 1030, via internal bus systems 1040 and 1050.

Each of the processing units 1060A and 1060B exemplarily includes a processor 1061 (e.g. central processing unit, or CPU), a memory controller 1065, a disk controller 1066 and memories such as e.g. the cache memory 1062, the system memory 1063 and the non-volatile memory 1064 (e.g. NVRAM). The memory controller 1065 may control one or more of the memories such as e.g. the cache memory 1062, the system memory 1063 and the non-volatile memory 1064 (e.g. NVRAM).

The I/O requests/responses to/from the internal storage devices 1030 and/or to/from the external storage devices/ systems 400 and 600 (via the interface 1020) is exemplarily controlled by the disk controller 1066 of the data storage apparatus 1000. Accordingly, the disk controller 1066 and/or its functions and/or functional handling thereof may be included in a storage device layer 140 of any of FIGS. 2A to 2D below.

Exemplarily, e.g. for mirroring purposes, the NVRAMs 1064 of the processing units 1060A and 1060B of the data storage apparatus 1000 are exemplarily connected to each other to transfer data between the NVRAMs 1064.

For example, each NVRAM 1064 may be divided into two portions of similar size, and one portion of each NVRAM 1064 is provided to store data and or metadata handled by its respective processing unit 1060 and the other portion of each NVRAM 1064 is provided to store mirrored data from the other NVRAM via the connection, respectively.

For example, the connection between the non-volatile memories 1064 may be exemplarily realized as a non-transparent bridge connection, e.g. by PCIe connection.

Further exemplarily, each of the processing units 1060A and 1060B exemplarily includes a system memory 1063 (e.g. for storing processing related data or program data for execution by the respective processing units) and a cache memory 1063 for temporarily storing data such as e.g. cache data related with metadata and/or data for handling I/O access messages.

For controlling the system memory 1063, the cache memory 1064 and/or the non-volatile memory 1064 (NVRAM), each of the processing units 1060A and 1060B exemplarily includes a memory controller 1065.

For processing, handling, converting, and/or encoding headers of messages, requests and/or responses, the data storage apparatus 1000 exemplarily further includes the processor 1061 (or other type of processing unit which may include one or more processors, one or more programmable logic devices such as integrated circuits, Field Programmable Gate Arrays (FPGAs), or the like, and/or one or more processors such as e.g. CPUs and/or microprocessors).

For temporarily storing data (including metadata and/or user data), the data storage apparatus 1000 includes the non-volatile memory 1064 (e.g. one or more NVRAMs). The non-volatile memory and/or NVRAM(s) may also be referred to as "cache memory" in exemplary embodiments, e.g. if the cache memory 1062 is formed as a portion of the non-volatile memory.

For example, in some embodiments, the difference between cache memory and the non-volatile memory may be that the data in non-volatile memory is stored such as to be retained even after power loss (i.e. being non-volatile), while cache memory may refer to volatile memory. In some exemplary embodiments a difference between the configuration of cache memory and the non-volatile memory (NVRAM) may be that the data stored in the non-volatile memory may additionally be mirrored to another non-volatile memory (e.g. one or more NVRAMs of the other processing unit or another connected data storage apparatus).

The processing unit(s) 1060A and/or 1060B and/or its functions and/or functional handling thereof may be included in a metadata layer 120 and/or a data protection layer 130 of any of FIGS. 2A to 2D below.

Figure 1B:
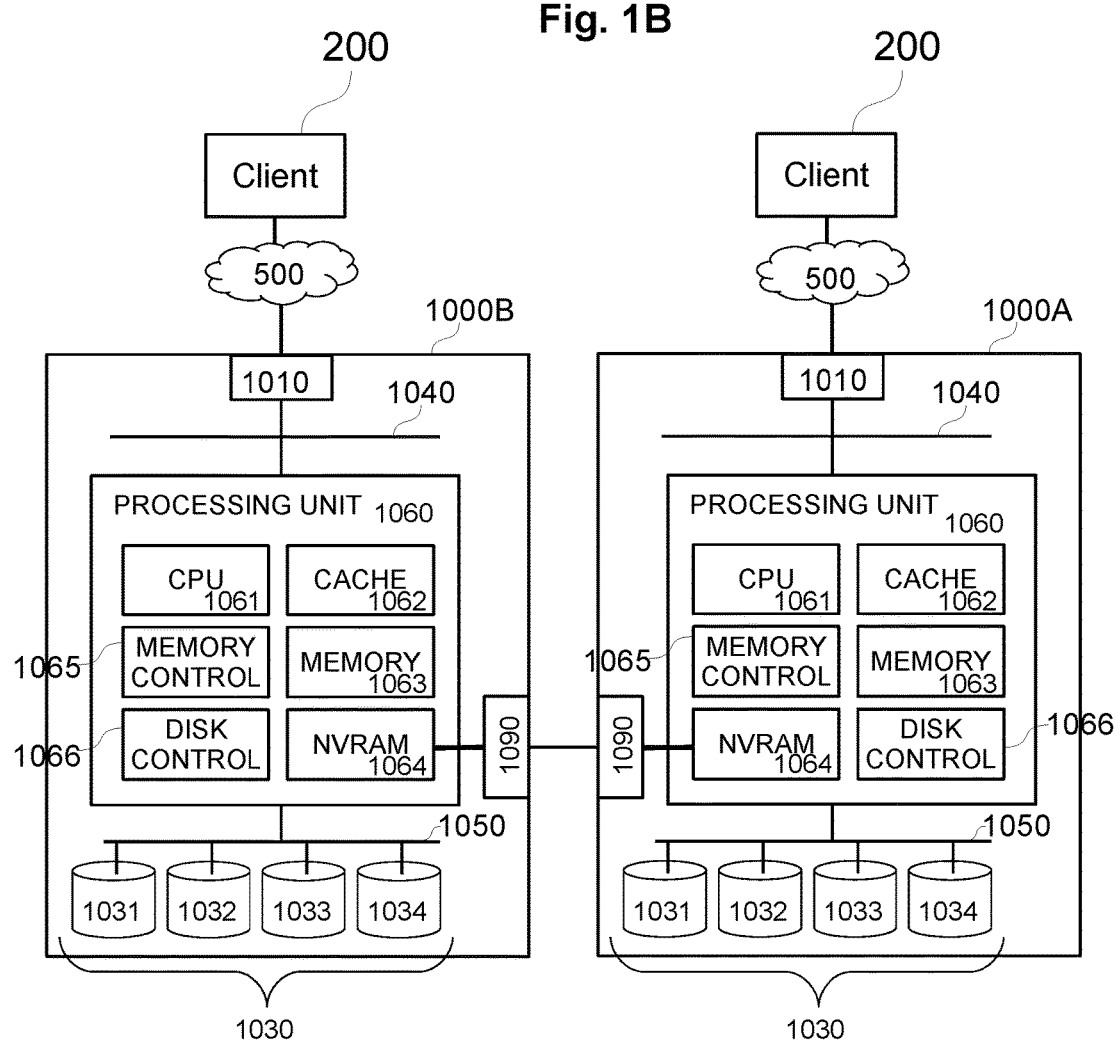
FIG. 1B exemplarily shows a schematic diagram of a data storage system comprising plural data storage apparatuses according to some exemplary embodiments.

FIG. 1B exemplarily shows a schematic diagram of a data storage system comprising plural data storage apparatuses 1000A and 1000B in a data storage system according to further exemplary embodiments.

The data storage apparatuses 1000A and 1000B may be realized as node apparatuses in a storage system cluster of plural node apparatuses, which may be communicably connected with each other via the network interfaces 1010 (or via other front-end or back-end interfaces).

A difference to the data storage apparatus 1000 of FIG. 1A is that the non-volatile memory 1064 (e.g. NVRAM) of the respective processing units 1060 of both data storage apparatuses 1000A and 1000B are connected via a connection between the respective interfaces 1090 of the data storage apparatuses 1000A and 1000B, in particular for mirroring data of the non-volatile memory 1064 (e.g. NVRAM) of the data storage apparatus 1000A in the non-volatile memory 1064 (e.g. NVRAM) of the data storage apparatus 1000B, and vice versa.

Exemplarily, the interfaces 1020 of the data storage apparatuses 1000A and 1000B are not shown in FIG. 1B, but additional interfaces 1020 for connection to external storage devices and/or storage systems may be provided.

Exemplarily, e.g. for mirroring purposes, the NVRAMs 1064 of the processing units 1060 of both data storage apparatuses 1000A and 1000B are exemplarily connected to each other to transfer data between the NVRAMs 1064.

For example, each NVRAM 1064 may be divided into two portions of similar size, and one portion of each NVRAM 1064 is provided to store data and or metadata handled by its respective processing unit 1060 and the other portion of each NVRAM 1064 is provided to store mirrored data from the other NVRAM via the connection, respectively.

FIG. 1C exemplarily shows a schematic diagram of another data storage apparatus 1000 according to exemplary embodiments.

Exemplarily, in FIG. 1C, in addition to the processing units 1060A and 1060B which may be provided similar as in FIG. 1A, the data storage apparatus 1000 includes, for hardware acceleration purposes, further processing units 1070A and 1070B which may be provided with respective programmable logic devices 1071 (e.g. instead or in addition to processors) for processing data movement, data handling or request/response handling in addition to or in support of the processors 1061 of the processing units 1060A and 1060B.

The programmable logic devices 1071 may be realized by one or more integrated circuits such as e.g. including one or more Field Programmable Gate Arrays (FPGAs). The processing units 1070A and 1070B may include own memories 1073 and non-volatile memories 1074 (e.g. NVRAMs), as well as e.g. their own memory controllers 1072. However, the programmable logic devices 1071 may also be responsible for the control of the memories 1073 and 1074.

Exemplarily, e.g. for mirroring purposes, the NVRAMs 1074 of the processing units 1070A and 1070B of the data storage apparatus 1000 are exemplarily connected to each other to transfer data between the NVRAMs 1074.

For example, each NVRAM 1074 may be divided into two portions of similar size, and one portion of each NVRAM 1074 is provided to store data and or metadata handled by its respective processing unit 1070 and the other portion of each NVRAM 1074 is provided to store mirrored data from the other NVRAM via the connection, respectively.

For example, the connection between the non-volatile memories 1074 may be exemplarily realized as a non-transparent bridge connection, e.g. by PCIe connection.

FIG. 1D exemplarily shows a schematic diagram of another data storage apparatus 1000 according to some exemplary embodiments.

Exemplarily, in FIG. 1D, in addition to the processing unit 1060 which may be provided similar as in FIG. 1A, the data storage apparatus 1000 includes, for hardware acceleration purposes, further another processing unit 1070 which may be provided with a respective programmable logic device 1071 (e.g. instead or in addition to processors) for processing data movement, data handling or request/response handling in addition to or in support of the processor 1061 of the processing unit 1060.

The programmable logic device 1071 may be realized by one or more integrated circuits such as e.g. including one or more Field Programmable Gate Arrays (FPGAs). The processing unit 1070 may include its own (cache and/or ROM and/or RAM) memory 1073 and non-volatile memory 1074 (e.g. NVRAM), as well as e.g. its own memory controller 1072. However, the programmable logic device 1071 may also be responsible for the control of the memories 1073 and 1074.

In all of the above configurations, the processing unit/units of the data storage apparatus(es) may be configured, by one or more software programs and/or based on hardware implemented processing (e.g. by support of programmable logic devices), to execute, by themselves or in combination with one or more further processing unit(s), the processing and methods of examples of control and management processes described herein.

III. Exemplary Layer Structures of Data Storage Systems of Exemplary Embodiments The below descriptions relate to some exemplary software layer configurations in exemplary embodiments. However, it is to be noted that the shown layer structures shall not be intended to be interpreted in any limiting way. The ordering or configurations of layers may be different in other exemplary embodiments, and also additional layers can be added or some of the layers do not need to be present in other exemplary embodiments.

Figure 2A:
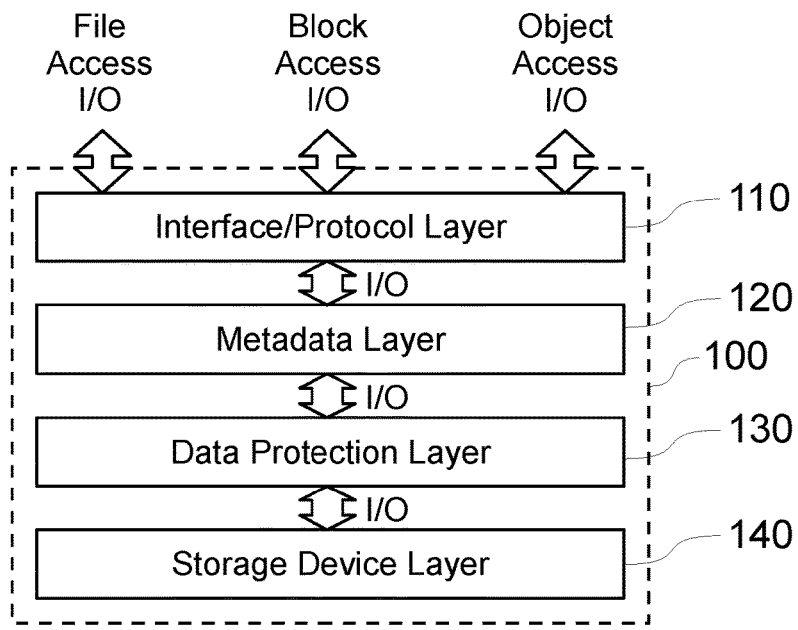
FIG. 2A exemplarily shows a schematic diagram of a data storage system layer architecture according to some exemplary embodiments.

FIG. 2A exemplarily shows a schematic diagram of a data storage system layer architecture 100 according to exemplary embodiments.

Such functional data storage system layer architecture 100 (which may be provided by software, hardware or any combination thereof) can be realized on any one of the data storage apparatuses 1000 (1000A, 1000B) of FIGS. 1A to 1D.

Some or all respective layers may use shared resources (such as sharing processing units, processors, programmable logic devices, memories such as system memories, cache memories and/or non-volatile memories or NVRAMs, controllers and/or storage devices), or some or all layers may be provided on their own respective resources (e.g. having their own dedicated processing units, processors, programmable logic devices, memories such as system memories, cache memories and/or non-volatile memories or NVRAMs, controllers and/or storage devices).

Also the layers may share some resources with other layers for some functions while they own other resources for other functions by themselves.

The data storage system layer architecture 100 exemplarily includes an interface/protocol layer 110, a metadata layer 120, a data protection layer 130 and a storage device layer 140. The data storage system layer architecture 100 may be realized on one or more servers, file servers, computers, storage devices, storage array devices, cluster node apparatuses etc., in particular exemplarily according to configurations of any of FIGS. 1A to 1D.

The interface/protocol layer 110 can exemplarily be communicably connected to client computers 200 and/or an exemplary optional management computer 300, e.g. via physical ports and/or communication networks (e.g. via front-end interfaces 1010 above, such as network interfaces or the like).

The interface/protocol layer 110 may include one or more physical interfaces including one or more physical ports, physical switches, physical connectors, physical interface boards, wireless interfaces etc. for physical connection, network connection and/or wireless connection to one or more networks, computers (clients, hosts, management computers, etc.), servers, or the like.

Also, the interface/protocol layer 110 may include functions, executed on one or more processing units (e.g. processing units of any of FIGS. 1A to 1D), for example, to receive, process, convert, handle, and/or forward messages, requests, instructions, and/or responses in multiple protocols and I/O access types.

Specifically, the interface/protocol layer 110 is preferably configured to receive, process, convert, handle one or more (and preferably all) of:
- file-access I/O messages (including file-access I/O requests directed to files and/or directories of one or more file systems) according to one or file access protocols (such as e.g. one or more of AFP, NFS, e.g. NFSv3, NFSv4 or higher, or SMB/CIFS or SMB2 or higher);
- block-access I/O messages (including block-access I/O requests directed to blocks of virtual, logical or physical block-managed storage areas) according to one or block access protocols (such as e.g. one or more of iSCSI, Fibre Channel and FCoE which means "Fibre Channel over Ethernet"); and
- object-access I/O messages (including object-access I/O requests directed to objects of an object-based storage) according to one or object-based access protocols (such as e.g. 110P, SOAP, or other object-based protocols operating over transport protocols such as e.g. HTTP, SMTP, TCP, UDP, or JMS).

The above connection types and communication functions may include different interfaces and/or protocols, including e.g. one or more of Ethernet interfaces, internet protocol interfaces such as e.g. TCPIP, network protocol interfaces such as e.g. Fibre Channel interfaces, device connection bus interfaces such as e.g. PCI Express interfaces, file system protocol interfaces such as NFS and/or SMB, request/response protocol interfaces such as e.g. HTTP and/or HTTP REST interfaces, system interface protocols such as e.g. iSCSI and related interfaces such as e.g. SCSI interfaces, and NVM Express interfaces.

The interface/protocol layer 110 is exemplarily configured to connect to and communicate with client computers 200 and/or the management computer 300 to receive messages, responses, requests, instructions and/or data, and/or to send messages, requests, responses, instructions and/or data from/to the client computers 200 and/or the management computer 300, preferably according to plural different protocols for file access I/Os, block access I/Os and/or object access I/Os.

Accordingly, in some exemplary embodiments, such requests and responses exchanged between the data storage system layer architecture 100 and the client computers 200 may relate to I/O requests to one or more file systems (e.g.

based on file access protocol I/O messages) and/or to I/O requests to blocks of physical, logical or virtual storage constructs of one or more storage devices (e.g. based on block access protocol I/O messages) of the data storage system 100.

Also, such requests and responses exchanged between the data storage system layer architecture 100 and the client computers 200 may relate to I/O requests to objects of object-based storage (e.g. based on object access protocol I/O messages) provided by the data storage system 100.

The I/O requests on the basis of file access protocols may be including e.g. read requests to read stored data in a file system (including reading file data, reading file system metadata, reading file and/or directory attributes) or write data into a file system (including creating files and/or directories, modifying files, modifying attributes of files and/or directories, etc.).

The I/O requests on the basis of block access protocols may be including e.g. read requests to read stored data in one or more blocks of a block-based storage area (including reading data or metadata from blocks of a virtual, logical or physical storage area divided in blocks based on block addresses such as e.g. logical block addresses LBAs, and/or block number, e.g. reading data blocks of logical units (LUs)) and write data to blocks of a block-based storage area (including writing data blocks to newly allocated blocks of a virtual, logical or physical storage area divided in blocks based on block addresses such as e.g. logical block addresses LBAs, and/or block number, e.g. writing data blocks of logical units (LUs); or modifying data of previously written data blocks in blocks of the block-based storage area).

In the context of block-based storage on virtual, logical and/or physical storage devices organized in one or more storage areas being provided in units of blocks, it is emphasized that the terms "storage block" and "data block" may refer to related aspects, but are generally intended to differentiate between the "storage block" as a construct for storing data as such, e.g. having a certain block size and being configured to store data of an amount according to the block size, and the "data block" shall refer to the unit of data of an amount according to the block size, i.e. to the block sized unit of data that is written to (or can be read from) one "storage block". When using the term "block" as such, this typically may refer to the "storage block" in the sense above.

As mentioned above, the I/O requests/responses exchanged between clients 200 and the interface/protocol layer 110 may include object-related I/O requests/responses relating to data objects of object-based storage (which may also include an object-based managed file system), file-system-related I/O requests/responses relating to files and/or directories of one or more file systems, and/or block-related I/O requests/responses relating to data stored in storage blocks of block-managed storage areas (provided virtually, logically or physically) on storage devices.

The interface/protocol layer 110 communicates with the metadata layer 120, e.g. for sending requests to the metadata layer 120 and receiving responses from the metadata layer 120.

In exemplary embodiments, the communication between interface/protocol layer 110 and metadata layer 120 may occur in an internal protocol which may be file-based, block-based or object-based. However, standard protocols may be used.

The interface/protocol layer 110 may receive messages (such as I/O requests) from the clients in many different protocols, and the interface/protocol layer 110 is configured to convert messages of such protocols, or at least headers thereof, to the messages to be sent to the metadata layer 120 according to the protocol used by the metadata layer 120. In some exemplary embodiments, the metadata layer 120 may be configured to handle object-related I/O requests.

The metadata layer 120 may then preferably be configured to convert object-related I/O requests relating to data objects (which may relate to block-based storage areas managed as data objects, to file-based files and/or directories of one or more file systems managed as file system objects, and/or to data objects or groups of data objects managed as data objects) into corresponding block-related I/O requests (according to a block access protocol) relating to data stored in storage blocks of virtually, logically or physically provided storage areas of storage devices, and vice versa.

In some exemplary embodiments, the metadata layer 120 may be configured to hold and manage metadata on a data object structure and on data objects of the data object structure in a metadata structure and/or metadata tree structure according to later described examples and exemplary embodiments.

The metadata layer 120 preferably communicates with the data protection layer 130, e.g. for sending requests to the data protection layer 130 and receiving responses from the data protection layer 130, preferably as block-related I/O requests (according to a block access protocol).

The data protection layer 130 communicates with the storage device layer 140, e.g. for sending requests to the storage device layer 140 and receiving responses from the storage device layer 140, preferably as block-related I/O requests (according to a block access protocol).

The data protection layer 130 may include processing involved in connection with data protection, e.g. management of data replication and/or data redundancy for data protection. For example, the data protection layer 130 may include data redundancy controllers managing redundant data writes, e.g. on the basis of RAID configurations including mirroring, and redundant striping with parity. The data protection layer 130 could then be configured to calculate parities.

The storage device layer 140 may execute reading data from storage devices and writing data to storage devices based on messages, requests or instructions received from the data protection layer 130, and may forward responses based on and/or including read data to the data protection layer 130.

In general, I/O processing may be realized by the layer architecture such that the interface/protocol layer 110 receives an I/O request (file-access, block-access or object-access) and converts the I/O request (or at least the header thereof) to a corresponding I/O request in the protocol used by the metadata layer 120 (e.g. object-based, object access).

The metadata layer 120 uses address information of the received I/O request and converts the address information to the address information used by the data protection layer 130. Specifically, the metadata layer 120 uses address information of the received I/O request and converts the address information to related block addresses used by the data protection layer 130. Accordingly, the metadata layer 120 converts received I/O requests to block access I/O in a block-based protocol used by the data protection layer 130.

The data protection layer 130 receives the block access I/O from the metadata layer 120, and converts the logical block address information to physical block address information of related data (e.g. taking into account RAID configurations, and parity calculations, or other error-code calculations) and issues corresponding block access I/O requests in a block-based protocol to the storage device layer 140 which applies the block access I/O to the storage device (e.g. by reading or writing data from/to the storage blocks of the storage devices).

For response messages, e.g. based on read requests to read user data, the corresponding response (e.g. with the user data to be read) can be passed the other way around, for example, in that the storage device layer 140 returns the read user data in a block-based protocol to the data protection layer 130, the data protection layer 130 returns the read user data in a block-based protocol to the metadata layer 120, the metadata layer 120 returns the read user data preferably in an object-based protocol to the interface/protocol layer 110, and the interface/protocol layer 110 returns the final read response to the requesting client.

However, for the above processing, the metadata layer 120 may make use of large amounts of metadata (which is managed in metadata tree structures according to the preferred embodiments herein), which is also stored to storage devices (i.e. in addition to the actual user data of the object-based storage, file system based storage or block-based storage shown to the client).

Accordingly, when handling I/O request such as write requests and/or read requests, the metadata layer may need to obtain metadata, which may lead to read and write amplifications in the communications between the metadata layer 120 and the data protection layer 130 (or directly with the storage device layer, in exemplary embodiments which store metadata directly on storage devices without additional data protection schemes). Such read and write amplifications shall preferably be avoided or at least be reduced by storing parts of metadata tree structures in cache memory.

Figure 2B:
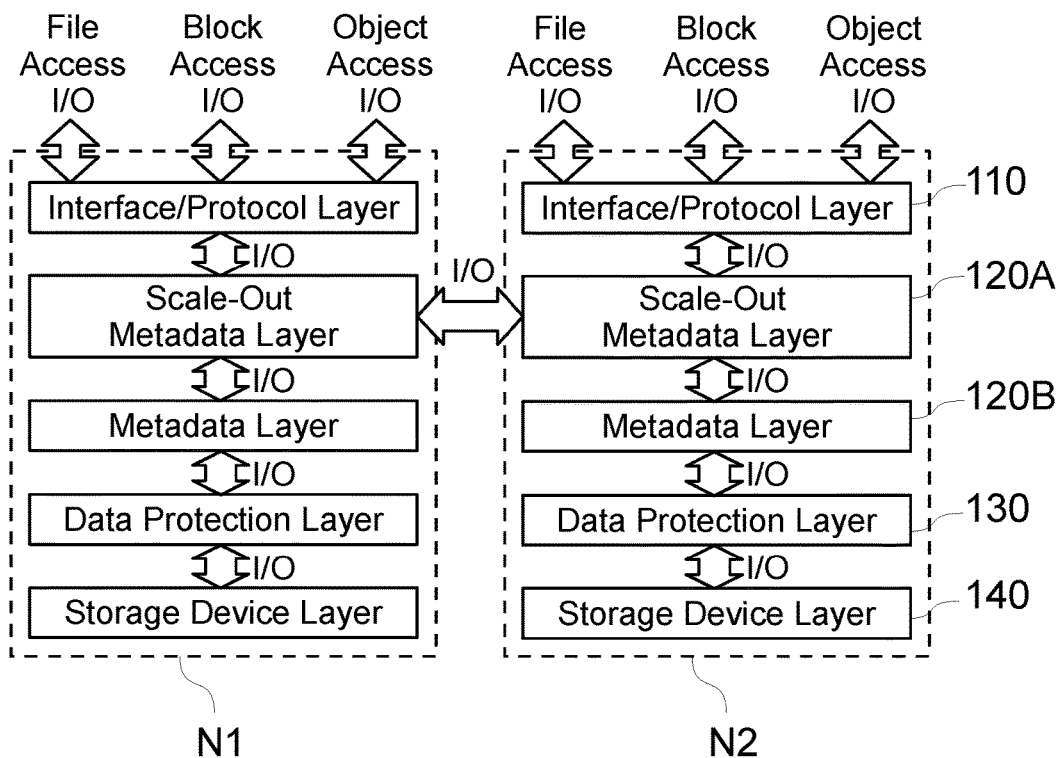
FIG. 2B exemplarily shows a schematic diagram of another data storage system layer architecture according to some exemplary embodiments.

FIG. 2B exemplarily shows a schematic diagram of another data storage system layer architecture 100 according to further exemplary embodiments.

Exemplarily, the data storage system layer architecture 100 of FIG. 2B is proposed for scale-out purposes, in which multiple node apparatuses (which may also operate as single data storage apparatus, preferably) may be connected to form a cluster system which may be extended (scale-out) by adding further node apparatuses, when needed.

In this connection, it is indicated that the term "node apparatus" in the present context refers to a device entity which forms a part of a cluster system of inter-connectable "node apparatuses". This needs to be distinguished from "metadata nodes", (e.g. "root nodes", "direct nodes" or "indirect nodes") as described later, as such "metadata nodes" from data constructs (data elements) which are units of metadata managed in metadata tree structures as described below. Sometimes, "metadata nodes" are also referred to as onodes or inodes.

Exemplarily, FIG. 2B shows two node apparatuses N1 and N2 included in a cluster of two or more node apparatuses (i.e. including at least N1 and N2), each node apparatus having an interface/protocol layer 110, a metadata layer 120B (similar to the metadata layer 120 above), a data protection layer 130 and a storage device layer 140, similar to the exemplary embodiment of FIG. 2A.

However, in order to scale out the request/response handling to the cluster node apparatuses, preferably between the interface/protocol layer 110 of the data storage system layer architecture 100 and the metadata layers 120B of the node apparatuses N1 and N2, the data storage system layer architecture 100 of FIG. 2B further includes a scale-out metadata layer 120A preferably provided between the interface/protocol layer 110 and the metadata layer 120B, to communicate I/O access messages (e.g. I/O requests or responses) between the scale-out metadata layers 120A of the node apparatuses of the cluster.

By such structure, the clients can send I/O requests to each of the node apparatuses (i.e. to which one or more node apparatuses they are connected themselves) independent of which node apparatus actually stores the target data of the I/O access or actually manages the storage device(s) storing the target data, and the scale-out metadata layers 120A respectively handle metadata managing mapping information locating the target data on the cluster.

Accordingly, the client may issue the I/O access request to either one of the cluster node apparatuses, and the scale-out metadata layer 120A of the receiving node apparatus identifies the node apparatus storing the target data based on scale-out metadata (which may also be stored in storage devices), and issues a corresponding I/O access request to the scale-out metadata layer 120A of the identified node apparatus.

The identified node apparatus handles the I/O request and responds to communicate an I/O response to the scale-out metadata layer 120A of the initial receiving node apparatus to return a corresponding response via the interface/protocol layer 110 of the initial receiving node apparatus to the requesting client.

Other layers in FIG. 2B may have functions similar to the corresponding layers of the layer architecture of FIG. 2A.

Figure 2C:
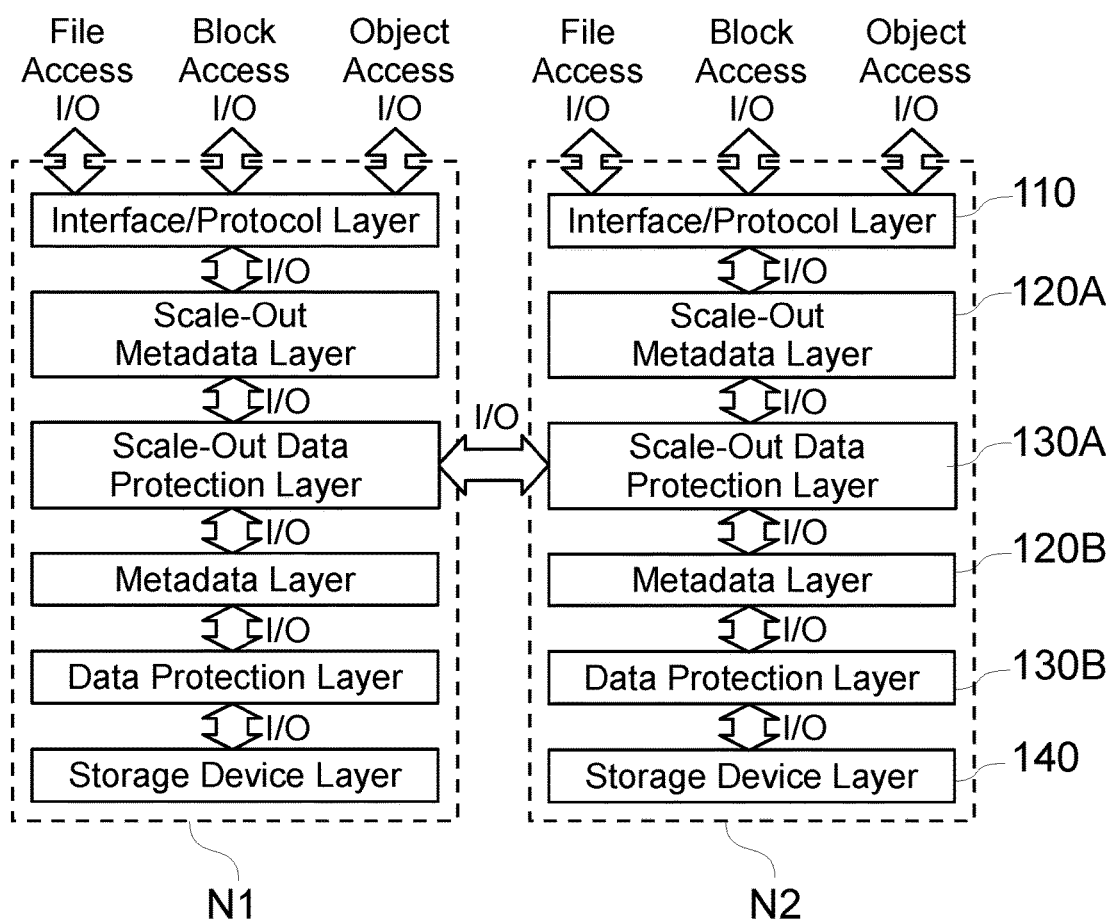
FIG. 2C exemplarily shows a schematic diagram of another data storage system layer architecture according to some exemplary embodiments.

FIG. 2C exemplarily shows a schematic diagram of another data storage system layer architecture 100 according to further exemplary embodiments.

Again, the data storage system layer architecture 100 of FIG. 2C is proposed for scale-out purposes, in which multiple node apparatuses (which may also operate as single data storage apparatus, preferably) may be connected to form a cluster system which may be extended (scale-out) by adding further node apparatuses, when needed.

However, in addition to the layers of FIG. 2B, the layer architecture of FIG. 2C exemplarily further includes another scale-out data protection layer 130A exemplarily between the scale-out metadata layer 120A and the metadata layer 120B (which communicates with the data protection layer 130B), wherein the scale-out data protection layers 130A communicate I/O access messages (e.g. I/O requests or responses) between the scale-out data protection layers 130A of the node apparatuses of the cluster.

This may include another data protection scheme in which data may be redundantly stored on multiple node apparatuses as managed by the data protection layers 130A of the node apparatuses of the cluster, according to data protection schemes.

Figure 2D:
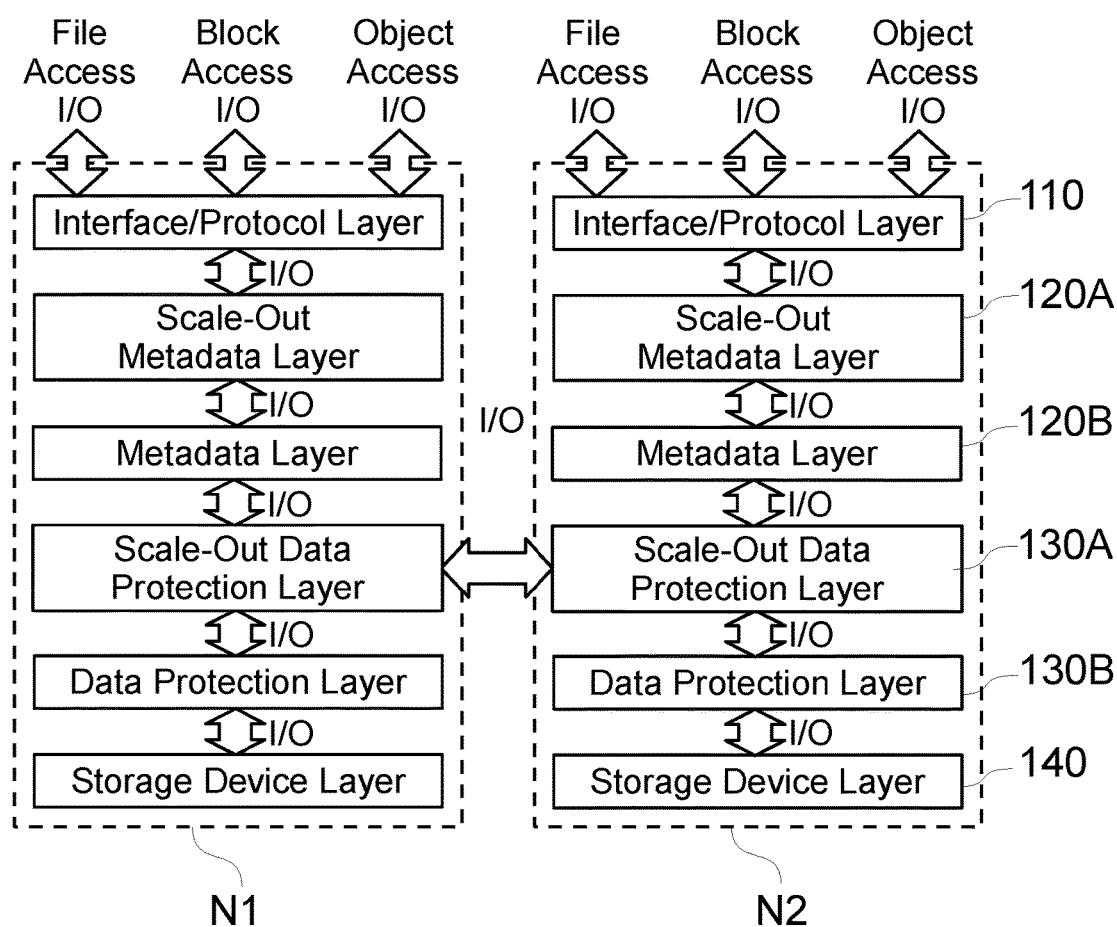
FIG. 2D exemplarily shows a schematic diagram of another data storage system layer architecture according to some exemplary embodiments.

FIG. 2D exemplarily shows a schematic diagram of another data storage system layer architecture 100 according to some exemplary embodiments.

Again, the data storage system layer architecture 100 of FIG. 2D is proposed for scale-out purposes, in which multiple node apparatuses (which may also operate as single data storage apparatus, preferably) may be connected to form a cluster system which may be extended (scale-out) by adding further node apparatuses, when needed.

However, in addition to the layers of FIG. 2B, the layer architecture of FIG. 2D exemplarily further includes another scale-out data protection layer 130A exemplarily between the metadata layer 120B and the data protection layer 130B, wherein the scale-out data protection layers 130A communicate I/O access messages (e.g. I/O requests or responses) between the scale-out data protection layers 130A of the node apparatuses of the cluster.

This may include another data protection scheme in which data may be redundantly stored on multiple node apparatuses as managed by the data protection layers 130A of the node apparatuses of the cluster, according to data protection schemes.

In the above exemplary configurations, the metadata layer 120 (and/or 120B) may make use of large amounts of metadata (which is managed in metadata tree structures according to the preferred embodiments herein), which is also stored to storage devices (i.e. in addition to the actual user data of the object-based storage, file system based storage or block-based storage shown to the client).

Accordingly, when handling I/O request such as write requests and/or read requests, the metadata layer may need to obtain metadata, which may lead to read and write amplifications in the communications between the metadata layer 120 and the data protection layer 130 (or directly with the storage device layer, in exemplary embodiments which store metadata directly on storage devices without additional data protection schemes). Such read and write amplifications shall preferably be avoided or at least be reduced by storing parts of metadata tree structures in cache memory.

IV. Data Object Location Management in Exemplary Embodiments

Figure 3B:
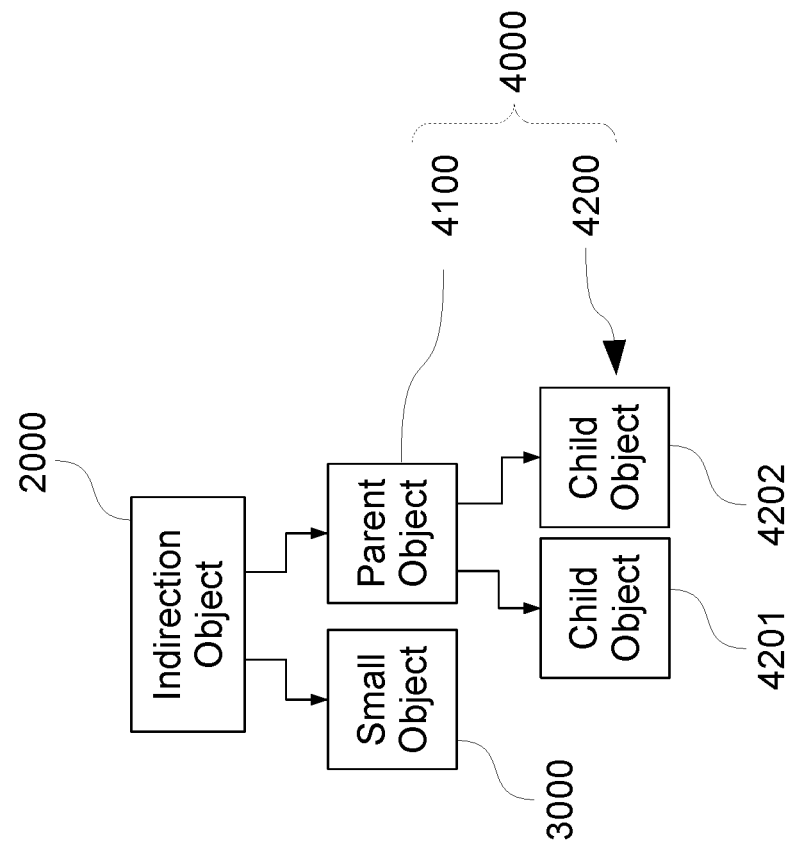
FIGS. 3A and 3B exemplarily show a metadata tree hierarchy of small and large data objects according to some exemplary embodiments.
Figure 3A:
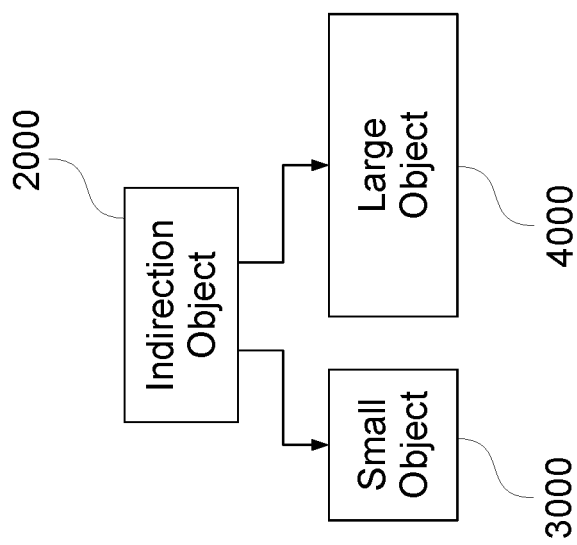

FIGS. 3A and 3B exemplarily show a metadata tree hierarchy of small and large data objects according to some exemplary embodiments.

IV.1 Data Objects and Data Object Metadata Tree Structures

Exemplarily, data objects are managed based on metadata structures, wherein, in principle, a data object can be managed based on an associated metadata tree structure including a root metadata node of the data object pointing directly and/or indirectly (e.g. via one or more direct and/or indirect metadata nodes) to data blocks or optionally pointing directly and/or indirectly (e.g. via one or more indirect metadata nodes) to plural direct metadata nodes which may include references to data blocks and/or references to other data objects, and optionally further including plural indirect metadata nodes being pointed to by the root metadata node of the data object or by other indirect metadata nodes and pointing directly and/or indirectly (via one or more other indirect metadata nodes) to plural direct metadata nodes.

IV.1.1 Indirection Object

On a higher level, an indirection object 2000, which has a metadata tree structure similar to other data objects, is provided, and the indirection object 2000 exemplarily points to other data objects. For example, the indirection object 2000 may be provided on each node apparatus of the cluster system, and the indirection object 2000 on each node apparatus may preferably point to the respective data objects on the respective node apparatus.

IV.1.2 Data Objects

In exemplary embodiments, the data objects may be provided as two types, including small data objects 3000 and large data objects 4000. The indirection object 2000 exemplarily points to small data objects 3000 as well as large data objects 4000, see e.g. FIG. 3A.

IV.1.2.1 Small Data Objects

Exemplarily, small data objects 3000 may be of a size that is smaller than a threshold size, referred to e.g. as distribution size, and such small data objects 3000 may be stored on one particular node apparatus, and such small data objects 3000 can be moved to another node apparatus of the cluster system as a whole.

IV.1.2.2 Large Data Objects

Further exemplarily, large data objects 4000 may be of a size that is larger than the threshold size, referred to e.g. as distribution size, and such large data objects 4000 may be stored in a distributed manner on plural node apparatuses, and such large data objects 4000 can be partially moved to other node apparatuses of the cluster system in units of the distribution size.

In exemplary embodiments, the large data objects 4000 are managed such that the data thereof is managed in segments of the distribution size. That is, each large data object 4000 is divided in plural data segments of the distribution size.

For example, if the size of a large data object 4000 is N times the distribution size (or more precisely larger than N−1 times but smaller than or equal to N times the distribution size), the data of the large data object 4000 will be stored in N distinct segments, which may be distributed to plural node apparatuses. In some exemplary embodiments, the respective data segments are managed as child objects 4200 of a certain parent object 4100.

IV.1.3 Exemplary Metadata Structures

In FIG. 3B, the indirection object 2000 exemplarily points to a small data object 3000 and a parent object 4100 of a large data object 4000, and the parent object 4100 points to two exemplary child objects 4200, exemplarily individually referred to as 4201 and 4202, of the large data object 4000.

In this example, the large data object 4000 has two data segments of the distribution size, each being managed by a respective child object.

Similar to the indirection object 2000, the parent object 4100 may be managed by an associated metadata tree structure including a root metadata node of the data object pointing directly to data blocks or optionally pointing directly and/or indirectly (via one or more indirect metadata nodes) to plural direct metadata nodes which may include references to data blocks and/or references to other data objects, and optionally further including plural indirect metadata nodes being pointed to by the root metadata node of the data object or by other indirect metadata nodes and pointing directly and/or indirectly (via one or more other indirect metadata nodes) to plural direct metadata nodes.

The number of tree levels in the indirection object 2000 as well as the parent object 4100 may be unlimited, so that the number of data objects pointed to by the indirection object 2000 as well as the number of child objects 4200 pointed to by the parent object 4100 is generally unlimited.

Moreover, the metadata tree structures of data objects can be dynamically extended by adding further metadata nodes or even further metadata tree levels so as to increase the manageable data. For example, by extending the metadata tree structure of the indirection object 2000, the number of data objects managed (manageable) by the indirection object 2000 can be increased, and by extending the metadata tree structure of the parent object 4100, the number of child objects 4200 managed (manageable) by the parent object 4100 can be increased.

However, the size of small data objects 3000 as well as child objects 4200 is exemplarily limited and is smaller or equal to the distribution size. Accordingly, the number of tree levels in the small data object 3000 as well as the child object 4200 may be limited to a maximal number of tree levels.

In some exemplary embodiments, the small data object 3000 as well as the child object 4200 may be managed by an associated metadata tree structure including a root metadata node of the respective object pointing directly to plural direct metadata nodes which may include references to data blocks and/or references to other data objects. Then, the number of tree levels may be limited, for example, to two tree levels, including the first tree level of the root metadata node and the next tree level of the direct metadata nodes.

This is, however, not limiting, and the number of tree levels of small data objects and/or child data objects may be limited also to three or more tree level, i.e. including one or more intermediate levels of indirect metadata nodes.

Accordingly, in other exemplary embodiments, the small data object 3000 as well as the child object 4200 may be managed by an associated metadata tree structure including a root metadata node of the data object pointing directly to data blocks or optionally pointing directly and/or indirectly (via one or more indirect metadata nodes) to plural direct metadata nodes which may include references to data blocks and/or references to other data objects, and optionally including plural indirect metadata nodes being pointed to by the root metadata node of the data object or by other indirect metadata nodes and pointing directly and/or indirectly (via one or more other indirect metadata nodes) to plural direct metadata nodes, wherein the number of tree levels of indirect metadata nodes between the first tree level of the root metadata node and the last tree level of the direct metadata nodes is fixed to a maximum number (being one or an integer larger than one).

Figure 6A:
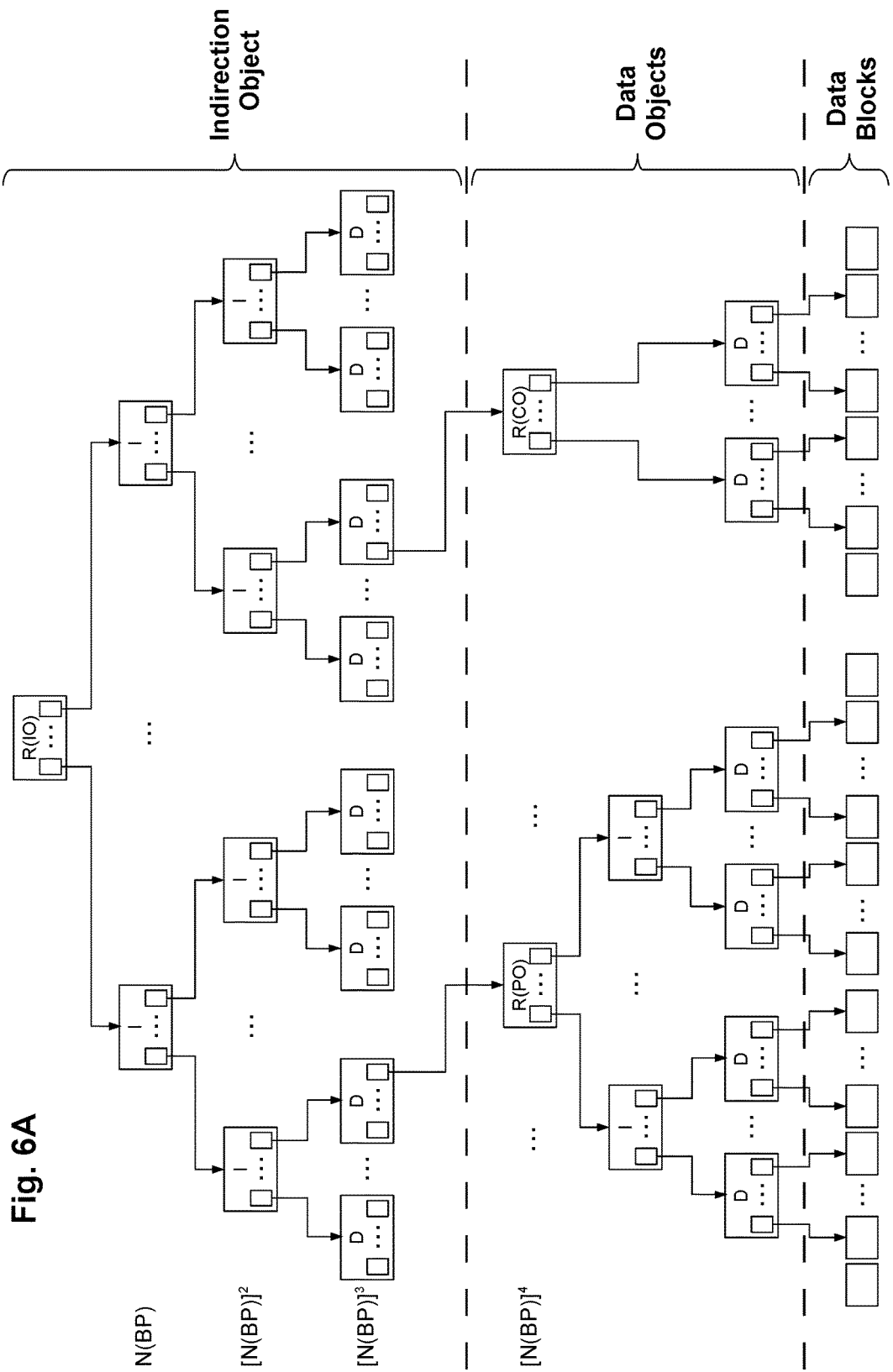
FIG. 6A exemplarily shows a schematic diagram of an exemplary metadata tree structure on a node apparatus according to some exemplary embodiments.

For example, FIG. 6A exemplarily shows a schematic diagram of an exemplary metadata tree structure on a node apparatus according to some exemplary embodiments. Exemplarily, the indirection object in FIG. 6A includes four tree levels including a first tree level of the root metadata node R(IO) of the indirection object, two tree levels of intermediate indirect metadata nodes and a last tree level of the direct metadata nodes.

Assuming exemplarily that the number of pointers N(BP) per metadata node are fixed and equal for root metadata nodes, direct metadata nodes and indirect metadata nodes, the root metadata node R(IO) of the indirection object points to up to N(BP) intermediate indirect metadata nodes of the second metadata tree level of the indirection object.

On the other hand, each of the second tree level indirect metadata nodes may also point to up to another N(BP) intermediate indirect metadata nodes of the third metadata tree level of the indirection object, and each of the third tree level indirect metadata nodes may also point to up to another N(BP) direct metadata nodes of the fourth metadata tree level of the indirection object.

Accordingly, the maximum number of direct metadata nodes in the indirection object of four tree levels is the number N(BP) of pointers per metadata node to the third power (i.e. $[N(BP)]^3$), and, since each of the direct nodes in the indirection object may point to a respective root metadata node of another data object (e.g. small object, parent object or child object), the indirection object of four tree levels can manage a number of up to the number of pointers N(BP) per metadata node to the fourth power (i.e. $[N(BP)]^4$) of data objects.

For example, if the number N(BP) of pointers per metadata node is, for example, 128, then the indirection object of one single tree level can manage up to 128 data objects, the indirection object of two tree levels can manage up to 16384 data objects (more than 16 thousand data objects), the indirection object of three tree levels can manage up to 2097152 data objects (more than 2 million data objects), and the indirection object of four tree levels can manage up to 268435456 data objects (more than 268 million data objects), etc.

For example, in other exemplary embodiments, if the number N(BP) of pointers per metadata node is, for example, 256, then the indirection object of one single tree level can manage up to 256 data objects, the indirection object of two tree levels can manage up to 65536 data objects (more than 65 thousand data objects), the indirection object of three tree levels can manage up to 16777216 data objects (more than 16 million data objects), and the indirection object of four tree levels can manage up to 4294967296 data objects (more than 4 billion data objects), etc.

However, if further data objects are added, additional layers/levels of indirect nodes may be added to the indirection object to enable management of the additional data objects.

Furthermore, in FIG. 6A exemplarily the indirection object points (more specifically a pointer of a direct node thereof) to the root metadata node R(PO) of a parent object, and the parent object metadata tree structure exemplarily has three tree levels, including a tree level of intermediate indirect metadata nodes and a last tree level of direct metadata nodes.

However, if further data is added to the parent object, additional layers/levels of indirect nodes may be added to the parent object to enable management of the additional added data.

In that pointers of direct metadata nodes of the parent object respectively include a respective reference pointing/leading to a root metadata node of a respective child object, the maximum number of child objects manageable by a parent object is equal to the number of direct nodes of the parent object times the number N(BP) of pointers per metadata node.

Accordingly, the maximum number of direct metadata nodes in the parent object of three tree levels is the number of pointers N(BP) per metadata node to the second power, or squared, (i.e. $[N(BP)]^2$), and, the maximum number of child objects manageable by the parent object is the number of pointers N(BP) per metadata node to the third power (i.e. $[N(BP)]^3$).

For example, if the number of pointers per metadata node is, for example, 128, then the parent object of one single tree level can manage up to 128 child objects, the parent object of two tree levels can manage up to 16384 child objects (more than 16 thousand child objects), the parent object of three tree levels can manage up to 2097152 child objects (more than 2 million child objects), and the parent object of four tree levels can manage up to 268435456 child objects (more than 268 million child objects), etc.

For example, in other exemplary embodiments, if the number N(BP) of pointers per metadata node is, for example, 256, then the parent object of one single tree level can manage up to 256 child objects, the parent object of two tree levels can manage up to 65536 child objects (more than 65 thousand child objects), the parent object of three tree levels can manage up to 16777216 child objects (more than 16 million child objects), and the parent object of four tree levels can manage up to 4294967296 child objects (more than 4 billion child objects), etc.

As previously mentioned, pointers of direct metadata nodes of the indirection object respectively point to root metadata nodes of other data objects (e.g. small objects, parent objects or child objects) and pointers of direct metadata nodes of a parent object respectively point to root metadata nodes of child objects (either by direct pointer reference or by indirect object reference, as discussed further below).

On the other hand, pointers of direct metadata nodes of a child object (or pointers of direct metadata nodes of a small object) point to data blocks storing the actual data of the data object.

The block size BS of data blocks is exemplarily fixed, e.g. to 4 kilobytes in exemplary embodiments, and therefore the size of data that can be stored in a child object (or small object) is equal to the number of direct metadata nodes thereof times the number of pointers N(BP) per metadata node.

That is, if the number of tree levels of a child object (or small object) is limited to a level threshold LT (e.g. maximally two tree levels at LT=2, or maximally three tree levels at LT=3), the maximal size of a child object (or small object) is the block size BS times the number of pointers N(BP) per metadata node to the power of (LT), i.e. the maximal size of a child object (or small object) is $BS \times [N(BP)]^{LT}$.

For example, if the number of pointers per metadata node is, for example, 128 and the block size BS of data blocks is exemplarily fixed to 4 kB in exemplary embodiments, the maximal size of a child object (or small object) at a maximum of one tree level per child object (or small object) is 512 kB, the maximal size of a child object (or small object) at a maximum of two tree levels per child object (or small object) is 64 MB, and the maximal size of a child object (or small object) at a maximum of three tree levels per child object (or small object) is 8 GB.

For example, in other exemplary embodiments, if the number of pointers per metadata node is, for example, 256 and the block size BS of data blocks is exemplarily fixed to 4 kB in exemplary embodiments, the maximal size of a child object (or small object) at a maximum of one tree level per child object (or small object) is 1024 kB (1 MB), the maximal size of a child object (or small object) at a maximum of two tree levels per child object (or small object) is 256 MB, and the maximal size of a child object (or small object) at a maximum of three tree levels per child object (or small object) is 64 GB.

In a preferred exemplary embodiment, the number of metadata node pointers is 256 and the maximum tree level of child objects is 2 (i.e. the child objects would not include any indirect metadata nodes).

Then, the maximum data (maximal size) of a child object (or small object) is exemplarily determined as 256 MB.

This means that if a data object (small object) at a size smaller or equal to 1 MB (1024 kB) is written or created, exemplarily the data object only includes the root metadata node, and the up to 256 pointers of the root metadata node of that object directly point to the up to 256 data blocks of 4 kB size each.

As soon as at least another 257th data block is accumulatively written to the data object or such data object larger than 1 MB is created (at up to 256 MB), such small object is extended or created to include at least one direct metadata node and up to 256 direct metadata nodes. Such (small) data objects would cover the data object sizes between more than 1 MB (1024 kB) and up to 256 MB.

As soon as more than 256 MB of data is accumulatively written to the data object or the created data object includes more than 256 MB, the data object would be created or would become a large data object. Such large object would include a parent object having at least a root metadata node, and at least two child objects. Specifically, for data object sizes between more than 256 MB and up to 64 GB (256 child objects of 256 MB each), the data object would include a parent object including only the root metadata node (but no direct or indirect nodes), and such root metadata node would point to two or more and up to 256 root metadata nodes of the respective two or more and up to 256 child objects.

For objects larger than 64 GB, the parent object of the large object would include at least one or more direct metadata nodes, and optionally being further extended by one or more indirect metadata nodes.

The size of large data objects is practically unlimited, and already for three node tree levels in a parent object (i.e. one root metadata node, up to 256 indirect metadata nodes and therefore up to 65536 direct metadata nodes), the parent object can point to up to 16777216 child objects, which translates to up to 4096 TB (i.e. 4 PB).

In view of the above, it should become clear that the respective metadata tree structure of each object, including the indirection object, the small data object, the parent object and the child object includes at least the respective root metadata node and being extendible optionally and on requirement by one or more direct metadata nodes and optionally further extended by one or more indirect metadata nodes.

Only for small data objects or child data objects, the tree structure may be limited to only a root metadata node, to a root metadata node and direct metadata nodes, or to a root metadata node, direct metadata nodes and a limited number of one or more tree levels of indirect metadata nodes, depending on the maximum size of small/child data objects.

In exemplary embodiments, the maximum size of small/child data objects may be configurable.

In FIG. 6A exemplarily the indirection object (more specifically a pointer of a direct node thereof) points to the root metadata node R(CO) of a child object, and the child object metadata tree structure exemplarily has two tree levels, including a tree level of the root node a second/last tree level of direct metadata nodes.

Accordingly, the size of the child object is exemplarily limited to the block size BS times the square of the number of pointers N(BP) per metadata node. If further data is written to a large data object, since the size of child objects is fixed, additional child objects may be created when new data is written to the large data object.

In FIG. 6A exemplarily pointers of direct metadata nodes of parent objects may point to data blocks indicating locations of root metadata nodes of its respective child objects.

However, in preferred exemplary embodiments, the pointers of direct metadata nodes of parent objects may directly point to root metadata nodes of root metadata nodes of its respective child objects. Then, only direct metadata nodes of small data objects and child objects actually point to data blocks.

In such exemplary embodiments, parent object may support and/or have metadata nodes including two types of pointers, such as e.g. a local pointer type (e.g. using a disk or storage device reference) that points to a location of a root metadata node of a child object on the local node apparatus, and a non-local pointer type (e.g. using an object reference) that points to a location of a child object or the root metadata node of the data object on another node apparatus.

In any case, only direct metadata nodes of small data objects and child objects actually point to data blocks storing actual user data of the respective associated data object.

Figure 6B:
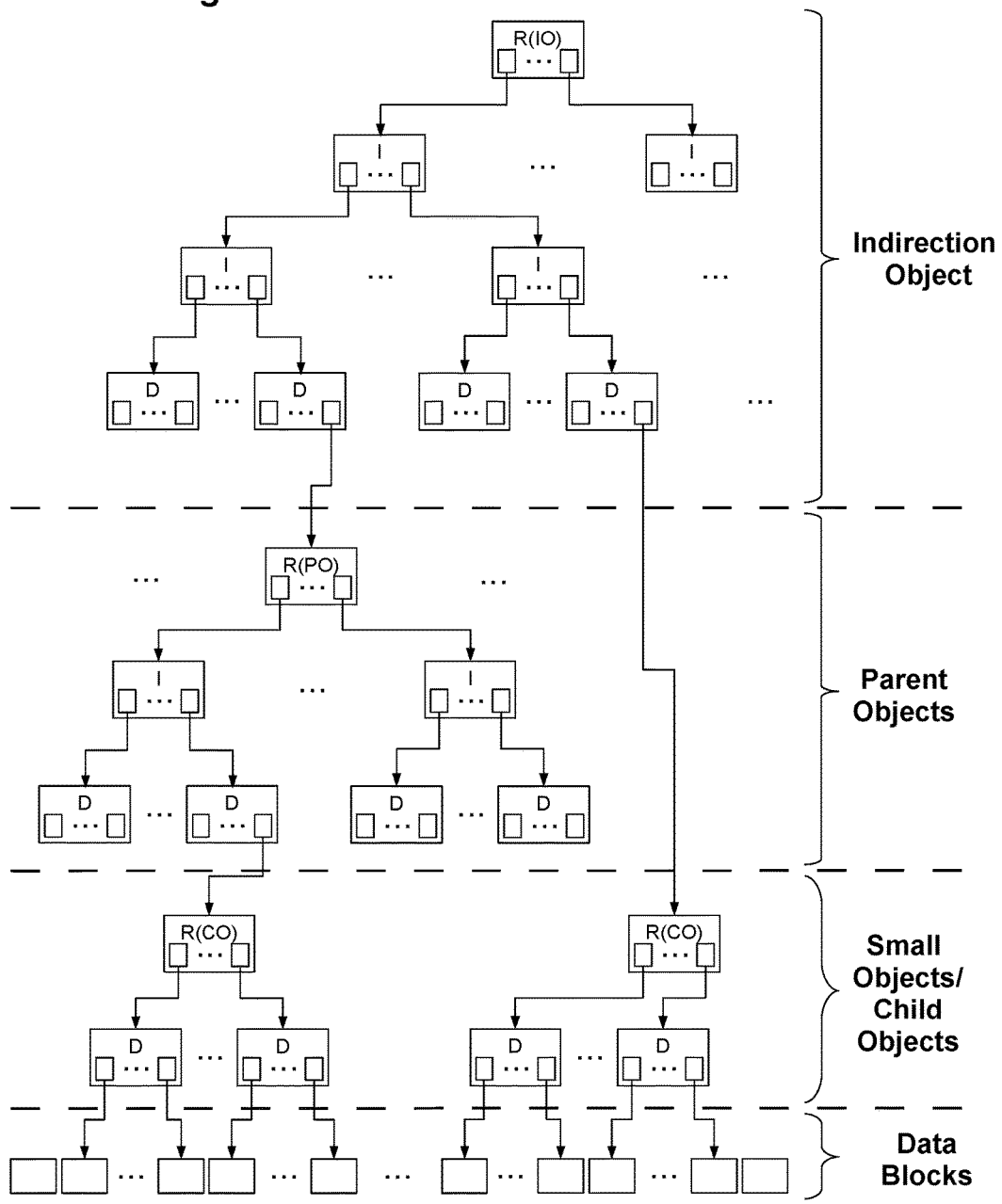
FIG. 6B exemplarily shows a schematic diagram of an exemplary metadata tree structure on a node apparatus according to some exemplary embodiments.

FIG. 6B exemplarily shows a schematic diagram of an exemplary metadata tree structure on a node apparatus according to some exemplary embodiments.

While most features of FIG. 6B are similar to FIG. 6A, in FIG. 6B, the pointers of direct metadata nodes of the parent object PO point to the root metadata nodes R(CO) of its associated respective child objects (local pointer or local object reference). The indirection object's direct metadata node pointers respectively point either to root metadata nodes of small objects or child objects which have been moved to this particular node apparatus, such as the other child object CO in FIG. 6B, e.g. such as child objects being referenced by a non-local pointer or non-local object reference from another node apparatus.

V. Data Object Distribution in Exemplary Embodiments

V.1.1 Stateless Distribution Approach

In a stateless scale-out approach, the data segments of the large data object are stored as independent child objects on the respective node apparatuses 1000, and each of the child objects points to the respective data blocks storing the respective data segment(s) of the large data object. However, exemplarily, no additional parent objects are provided.

Accordingly, when an I/O access request to the large data object is received at one of the node apparatuses 1000, the receiving node apparatus 1000 (i.e. the node apparatus 1000 receiving the I/O access request), e.g. to read or modify data of a data segment of the large data object, the receiving node apparatus 1000 may need to forward the received I/O access request (or a corresponding I/O access request) to the node apparatus 1000 having the child object pointing to the target data of the data segment addressed by the received I/O access request.

For example, the location of data segments and/or child objects in the cluster system may be determined based on a deterministic algorithm. The deterministic algorithm may be used to determine intended locations of data segments of a large data object at the time of distributing the data segments thereof across the node apparatuses of the cluster system, and may be used to determine locations of data segments of a large data object when receiving I/O requests. Locations of child objects on node apparatuses may be managed by respective indirection objects.

For example, the I/O access request may include a reference to an offset of the target data in the large data object (or to another type of ID of the target data segment of the I/O access request), and the location of the respective target data/target data segment in the cluster may then be determined on the basis of the deterministic approach, which was already used at the time of distributing the data segments thereof across the node apparatuses of the cluster system. Such deterministic distribution approach may use a pre-determined distribution map or calculate distribution maps by use of known distribution algorithms such as e.g. the known CRUSH (Controlled Replication Under Scalable Hashing) algorithm.

Basically, such deterministic algorithm may take input information and/or an input parameter relating to an identifier of the respective data segment (e.g. as an identifier identifying the large data object combined with a second identifier identifying the respective data segment in the respective data object, such as e.g. a segment number or an offset in the data object; or a single identifier identifying the respective data segment) and output location information as a function of the input information and/or an input parameter such that the output location information indicates the target node apparatus storing (or designated to store) the respective data segment.

Accordingly, when the receiving node apparatus 1000 receives an I/O access request to a data segment of the large data object, the receiving node apparatus 1000 (e.g. the scale-out layer thereof) determines the location of the target data segment based on information included in the I/O access request (e.g. input information or input parameter for the deterministic algorithm included in the I/O access request or determined based on information included in the I/O access request) and the defined deterministic algorithm to determine the node apparatus 1000 being responsible for the target data segment (i.e. the node apparatus 1000 storing the child object associated with the target data segment).

Then, upon determining the node apparatus 1000 being responsible for the target data segment, the receiving node apparatus 1000 may send the (or a corresponding) I/O access request to the identified node apparatus 1000 handling the respective target data segment. Upon processing the I/O request on the identified node apparatus 1000, a respective I/O response can be returned to the receiving node apparatus 1000 to issue an I/O response to the requesting client from the receiving node apparatus 1000.

A benefit of such stateless approach is that the number of message hops between node apparatuses of the cluster system in the handling/processing of I/O access requests is low, and typically only two hops are required (i.e. one message hop from the receiving node apparatus to the target node apparatus having the child object of the respective target data segment for forwarding the I/O request, and one message hop from the target node apparatus back to the receiving node apparatus returning the I/O response).

That is, handling of I/O access requests can be efficiently handled across the node apparatuses with low numbers of message hops, although the target data may be stored on any node apparatus and the I/O access request from the client may be received on and handled by any of the node apparatuses of the cluster system. However, since the distribution of data segments of a large data object is done based on a deterministic approach, hot spot data (such as data segments of storage devices being accessed frequently, or data segments stored on frequently accessed node apparatuses) cannot be re-distributed due to the deterministic approach.

Accordingly, the stateless approach advantageously allows for efficient communication across node apparatuses in the handling of I/O requests but has the disadvantage that hot spot data (such as frequently accessed data segments, or data segments stored on a frequently accessed storage device or node apparatus) cannot be moved to another node apparatus for rebalancing the system if needed or desired.

V.1.2 Stateful Distribution Approach

In a stateful scale-out approach, the data segments of the large data object are also stored as child objects on the respective node apparatuses 1000, and each of the child objects points to the respective data blocks storing the respective data segment(s) of the large data object.

Further exemplarily, one single parent object is provided for the large data object on one node apparatus, and the parent object points to all of the distributed child objects of the large data object, including the one or more child objects on the same node apparatus as the parent object and the other child objects on other node apparatuses. Therefore, no deterministic algorithm needs to be used in the handling of I/O access requests for finding the respective child object of the target data segment, however, a deterministic algorithm may still be used at the time of distribution of data segments.

Accordingly, when an I/O access request to the large data object is received at one of the node apparatuses 1000, the receiving node apparatus 1000 (i.e. the node apparatus 1000 receiving the I/O access request), e.g. to read or modify data of a data segment of the large data object, the receiving node apparatus 1000 may need to forward the received I/O access request (or a corresponding I/O access request) to the node apparatus 1000 having the parent object of the respective data object and that (parent) node apparatus 1000 may need to forward the received I/O access request (or a corresponding I/O access request) to yet another node apparatus 1000 having the respective child object pointing to the target data of the data segment addressed by the received I/O access request.

For example, in the stateful scale-out approach, the location of data segments and/or child objects in the cluster system may be determined based on pointers of the associated parent object and, in particular, the pointers of the parent object to respective child objects on the same or on other node apparatuses may be used to determine locations of data segments of a large data object on the same or on other node apparatuses as the parent object.

For example, the I/O access request may include a reference to the parent object (such as an identifier of the parent object, or location information indicating the location of the parent object) and a reference to an offset of the target data in the large data object (or to another type of ID of the target data segment of the I/O access request), and the location of the respective target data/target data segment in the cluster may then be determined by first finding the parent object and then determining the location of the respective child object based on a pointer of the parent object identified based on the offset of the target data segment.

For example, the location of the parent object can be selected/determined by a simple function using the parent object ID (e.g. a parent object number) as input, e.g. a modulo function (such as the parent object number modulo a number of node apparatuses in the cluster system). Locations of parent and child objects on node apparatuses may be managed by respective indirection objects.

Accordingly, when the receiving node apparatus 1000 receives an I/O access request to a data segment of the large data object, the receiving node apparatus 1000 (e.g. the scale-out layer thereof) determines the location of the respective parent object of the large data object based on information included in the I/O access request (such as e.g. location information on the parent object and/or an identifier of the parent object) and sends the (or a corresponding) I/O access request to the identified node apparatus 1000 handling the respective parent object so that the identified node apparatus 1000 further handles the I/O request to be sent to the node apparatus 1000 having the respective child object pointing to the target data segment.

Alternatively, the receiving node 1000 may communicate with the identified node apparatus 1000 handling the respective parent object so as to determine the location of the respective child object and to send the I/O access request (or corresponding request) to the node apparatus 1000 having the respective child object pointing to the target data segment.

Then, upon determining the node apparatus 1000 being responsible for the target data segment, the receiving node 1000 or the parent object's node apparatus 1000 may send the (or a corresponding) I/O access request to the identified node apparatus 1000 handling the respective child object and target data segment.

Upon processing the I/O request on the identified node apparatus 1000, a respective I/O response can be returned to the receiving node apparatus 1000 directly or indirectly via the parent object's node apparatus 1000 to issue an I/O response to the requesting client from the receiving node apparatus 1000.

A benefit of such stateful approach is that hot spot data (such as data segments of storage devices being accessed frequently, or data segments stored on frequently accessed node apparatuses) can be re-distributed and moved to other nodes easily. This only requires to move the child object to another node apparatus 1000 and update the respective pointer to the child object in the responsible parent node.

Accordingly, the stateful approach advantageously allows for efficient handling of hot spot data and easy re-distribution of child objects across node apparatuses of the cluster system, and easily provides the advantage that hot spot data (such as frequently accessed data segments, or data segments stored on a frequently accessed storage device or node apparatus) can be moved to another node apparatus for rebalancing the system if needed or desired.

However, the number of message hops between node apparatuses of the cluster system in the handling/processing of I/O access requests is higher, and typically at least three or even four hops are required (i.e. one message hop from the receiving node apparatus to the parent node apparatus having the parent node for forwarding the I/O request, one message hop from the parent object's node apparatus to target node apparatus having the child object of the respective target data segment for forwarding the I/O request, and one or more message hops from the target node apparatus back to the receiving node apparatus returning the I/O response).

That is, as a disadvantage, handling of I/O access requests can be handled across the node apparatuses with higher numbers of message hops.

Accordingly, the stateful approach has the disadvantage of less efficient communication across node apparatuses in the handling of I/O requests but has the advantage that hot spot data (such as frequently accessed data segments, or data segments stored on a frequently accessed storage device or node apparatus) can be moved easily to another node apparatus for rebalancing the system if needed or desired.

V.1.3 Hybrid Distribution Approach According to Exemplary Embodiments

In a hybrid scale-out approach, the data segments of the large data object are stored as plural child objects on the respective node apparatuses 1000, and each of the child objects points to the respective data blocks storing the respective data segment(s) of the large data object.

Further exemplarily, a parent object is provided for the large data object on each of the node apparatuses, and the parent object on each node apparatus points to all or at least some child objects of the large data object, including some or all of the child objects being held on the same node apparatus as the parent object.

In some embodiments, the parent object can be fully stored on each node apparatus 1000 so that each parent object on each node apparatus 1000 points to all of the child objects, and any child object may be located by observing an arbitrary one of the parent objects thereof. However, in preferred exemplary embodiments, each node apparatus 1000 may store only part of the parent object, each respective part of the parent object managing locations of a certain group of child objects, such that each child object is pointed to by one of the parts of the parent object. For example, upon creation of the data object (including creation of the parent object and the plural child objects), the child objects may be distributed across the plural node apparatuses of the cluster system, and each node apparatus may have the part of the parent object managing the locations of child objects initially created on the same node apparatus.

For example, in the hybrid scale-out approach, the intended location of data segments and/or child objects in the cluster system may be determined based on a deterministic algorithm.

The deterministic algorithm may be used to determine intended locations of data segments of a large data object at the time of distributing the data segments thereof across the node apparatuses of the cluster system, and may be used to determine the locations of respective parent object parts managing the locations of the data segments of a large data object when receiving I/O requests.

Locations of child objects and parent objects or parent object parts on node apparatuses may be managed by respective indirection objects.

Accordingly, when an I/O access request to the large data object is received at one of the node apparatuses 1000, the receiving node apparatus 1000 (i.e. the node apparatus 1000 receiving the I/O access request), e.g. to read or modify data of a data segment of the large data object, the receiving node apparatus 1000 may need to forward the received I/O access request (or a corresponding I/O access request) to the node apparatus 1000 having the part of the parent object or parent object pointing to the respective child object pointing to the target data of the data segment addressed by the received I/O access request.

For example, the I/O access request may include a reference to an offset of the target data in the large data object (or to another type of ID of the target data segment of the I/O access request), and the intended location of the respective target data/target data segment in the cluster may then be determined on the basis of the deterministic approach, which was already used at the time of distributing the data segments thereof across the node apparatuses of the cluster system. Such deterministic distribution approach may use a pre-determined distribution map or calculate distribution maps by use of known distribution algorithms such as e.g. the known CRUSH (Controlled Replication Under Scalable Hashing) algorithm.

Basically, such deterministic algorithm may take input information and/or an input parameter relating to an identifier of the respective data segment (e.g. as an identifier identifying the large data object combined with a second identifier identifying the respective data segment in the respective data object, such as e.g. a segment number or an offset in the data object; or a single identifier identifying the respective data segment) and output location information as a function of the input information and/or an input parameter such that the output location information indicates the target node apparatus storing (or designated to store) the respective parent object or parent object part managing the location of the targeted child object or data segment.

Typically, on the time of creation, the child objects will be created on the same node apparatus 1000 which also stores the parent object or parent object part managing/indicating the location of the respective child object, so that typically the parent object or parent object part on a node apparatus 1000 points to child objects created/stored on the same node apparatus 1000, unless moved exceptionally to another node apparatus 1000 for purposes of load balancing.

Accordingly, when the receiving node apparatus 1000 receives an I/O access request to a data segment of the large data object, the receiving node apparatus 1000 (e.g. the scale-out layer thereof) determines the intended location of the target data segment based on a determination of the location of the parent object or parent object part based on information included in the I/O access request (e.g. input information or input parameter for the deterministic algorithm included in the I/O access request or determined based on information included in the I/O access request) and the defined deterministic algorithm to determine the node apparatus 1000 being responsible for the parent object or parent object part responsible for the target child object or target data segment (i.e. the node apparatus 1000 storing the parent object or parent object part associated with the child object associated with the target data segment).

Then, upon determining the node apparatus 1000 being responsible for the parent object or parent object part responsible for the target data segment, the receiving node apparatus 1000 may send the (or a corresponding) I/O access request to the identified node apparatus 1000 handling the parent object or parent object part responsible for the respective target child object/data segment.

On that node apparatus 1000 the location of the child object pointing to the target data segment may be determined, which may typically be on the same node apparatus 1000 but also on another node apparatus 1000 (e.g. in case the respective child object has been moved to another node apparatus 1000 since creation thereof).

If the respective child object is on the same node apparatus 1000, the I/O access request may be processed locally on that node apparatus 1000. On the other hand, if the parent object or parent object part on that node apparatus 1000 has a pointer relating to the target child object that points to another node apparatus 1000, the (or a corresponding) I/O access request may be sent to the other node apparatus 1000 to process the I/O access request.

Upon processing the I/O request on the identified node apparatus 1000, a respective I/O response can be returned directly or indirectly to the receiving node apparatus 1000 to issue an I/O response to the requesting client from the receiving node apparatus 1000.

Accordingly, in principle, the child object will be on the same node apparatus as the parent object or parent object part pointing to that respective child object, and the number of required hop messages in I/O request processing may be as low as in the above stateless approach.

However, as a benefit of the hybrid approach it is easily possible to move one or more child objects to other node apparatuses 1000 if required for purposes of load balancing, e.g. by moving hot spot data.

A further benefit of such hybrid approach is that the number of message hops between node apparatuses of the cluster system in the handling/processing of I/O access requests is low, and typically only two hops are required (i.e. one message hop from the receiving node apparatus to the target node apparatus having the parent object or parent object part pointing to the respective target data segment for forwarding the I/O request, and one message hop from the target node apparatus back to the receiving node apparatus returning the I/O response).

That is, handling of I/O access requests can be efficiently handled across the node apparatuses with low numbers of message hops, although the target data may be stored on any node apparatus and the I/O access request from the client may be received on and handled by any of the node apparatuses of the cluster system.

As previously mentioned, another benefit of such hybrid approach is that hot spot data (such as data segments of storage devices being accessed frequently, or data segments stored on frequently accessed node apparatuses) can be re-distributed and moved to other nodes easily. This only requires to move the child object to another node apparatus 1000 and update the respective pointer to the child object in the responsible parent node or parent node part.

Accordingly, the hybrid approach advantageously allows for efficient handling of hot spot data and easy re-distribution of child objects across node apparatuses of the cluster system for purposes of load balancing, and easily provides the advantage that hot spot data (such as frequently accessed data segments, or data segments stored on a frequently accessed storage device or node apparatus) can be moved to another node apparatus for rebalancing the system if needed or desired.

Summarizing, the hybrid approach on the one hand advantageously allows for efficient communication across node apparatuses in the handling of I/O requests, similar to the benefits of the above stateless approach, and, on the other hand, also has the advantage that hot spot data (such as frequently accessed data segments, or data segments stored on a frequently accessed storage device or node apparatus) can be moved to another node apparatus for rebalancing the system if needed or desired, similar to the benefits of the above stateful approach.

As a consequence, the hybrid approach combines the benefits of both of the above stateful and stateless approaches.

V.2 Distribution of Data Objects According to Exemplary Embodiments

As discussed above, the data objects may be managed either as small data objects, if the size thereof is equal to or smaller than the distribution size, or large data objects which include a parent node pointing to two or more child objects, each child object being of a size equal to or smaller than the distribution size while the size of the large data object is larger as the distribution size.

V.2.1 Distribution of Small Data Objects

FIG. 4A exemplarily shows a distribution of plural small data objects across a plurality of node apparatuses 1000 of a cluster system according to a hybrid scale-out approach according to some exemplary embodiments.

Exemplarily, the cluster system includes four node apparatuses 1000, and on each node apparatus 1000 there is provided a respective indirection object 2000 for managing locations of data objects (including small object, parent and/or child objects, or system objects storing metadata on the system) on that particular respective node apparatus 1000.

Further exemplarily, the twelve small data objects SO1 to SO12 (each of a size equal or smaller than a predetermined distribution size) are stored in a distributed manner across the node apparatuses 1000 (numbered #1 to #4), and exemplarily the small data objects SO1 to SO12 are distributed across the cluster system in accordance with a deterministic algorithm.

That is, based on an identifier (such as e.g. an object ID or object number) of the respective small data object, the deterministic algorithm allows to determine a location of the respective small data object.

Still, for load balancing purposes, the small data objects can be moved to other node apparatuses.

In some exemplary embodiments, such movement of a small object may involve to assign another identifier (such as e.g. an object ID or object number) to the respective small data object corresponding to the new location, i.e. such that the deterministic algorithm outputs the new location of the respective small data object after movement thereof based on the new assigned identifier.

However, in other preferred exemplary embodiments, if the identifier object such as an object ID or object number of the object shall preferably not be changed despite the data movement, thereby making object management easier, the indirection object may be updated such as to indicate the location of the moved small data object.

For example, upon movement of a small data object from one node apparatus to another node apparatus, the indirection object may be updated so that the respective block pointer in the direct node of the indirection object pointing to the respective small data object is updated so as to point to the new location on the other node apparatus instead of the previous location on the local node apparatus.

For such purpose, in some exemplary embodiments, the indirection object may support and/or have metadata nodes including two types of pointers, such as e.g. a local pointer type (e.g. using a disk or storage device reference) that points to a location of a root metadata node of a data object on the local node apparatus, and a non-local pointer type (e.g. using an object reference) that points to a location of a data object or the root metadata node of the data object on another node apparatus.

For a similar purpose, in some exemplary embodiments, the parent object may support and/or have metadata nodes including two types of pointers, such as e.g. a local pointer type (e.g. using a disk or storage device reference) that points to a location of a root metadata node of a child object on the local node apparatus, and a non-local pointer type (e.g. using an object reference) that points to a location of a child object or the root metadata node of the data object on another node apparatus. Such aspects will be described for some exemplary embodiments in more detail below.

V.2.2 Distribution of Large Data Objects

FIG. 4B exemplarily shows a distribution of a large data object including the parent object and child objects across a plurality of node apparatuses 1000 of a cluster system according to a hybrid scale-out approach according to some exemplary embodiments.

Exemplarily, the cluster system includes four node apparatuses 1000, and on each node apparatus 1000 there is provided a respective indirection object 2000 for managing locations of data objects (including small object, parent and/or child objects, or system objects storing metadata on the system) on that particular respective node apparatus 1000, and each node apparatus 1000 stores a group of child objects of the child objects CO1 to CO12 of the respective large data object.

Further exemplarily, each of the node apparatuses 1000 storing a group of child objects of the child objects CO1 to CO12 of the respective large data object additionally stores an associated parent object 4100 (or parent object part) which exemplarily points to the locations of the respective child objects stored on the particular node apparatus 1000.

Accordingly, while the node apparatus 1000 labeled with #1 in FIG. 4B stores the child objects CO1, CO5 and CO9 of the respective large data object, the respective associated parent object 4100 (or parent object part) of the large data object on the node apparatus 1000 labeled with #1 in FIG. 4B points to these child objects CO1, CO5 and CO9.

So, generally the parent object 4100 (or parent object part) on a node apparatus 1000 points to the child objects stored on the same node apparatus 1000 (but it may also point to all other child objects on other node apparatuses in further exemplary embodiments).

Further exemplarily, the twelve child objects CO1 to CO12 (each of a size equal or smaller than a predetermined distribution size) are stored in a distributed manner across the node apparatuses 1000 (numbered #1 to #4), and exemplarily the child objects CO1 to CO12 are distributed across the cluster system in accordance with a deterministic algorithm, at least at the time of creation of the large data object in the cluster system.

Accordingly, based on an identifier of the respective child objects and based on the deterministic algorithm, the intended location of each child object may be determined, and the respective child object may then be accessed through the parent object 4100 (or parent object part) stored in the node apparatus 1000 of the intended location according to the deterministic algorithm.

Still, the child object can be moved to another node apparatus 1000 (contrary to the stateless approach discussed above) in that the child object is moved to another node apparatus and the pointer to that child object in the parent object or parent object part on the node apparatus of the former location is adjusted or updated based on the new location.

Then, the location of the responsible parent object or parent object part may be determined still on the basis of the same deterministic approach but the location of the respective child object on another node apparatus 1000 may be dynamically determined by reading the respective pointers or references in that parent object or parent object part.

While FIG. 4B exemplarily shows that each node apparatus 1000 of the cluster system has child objects and a parent object of the same large data object, distributed according to a distribution map (1,2,3,4), other distribution schemes are possible. Specifically, it is possible that child objects of a certain large data object are distributed across a subset of node apparatuses 1000 of the cluster system, and e.g. that child objects of different large data objects are distributed across different subsets of node apparatuses 1000 of the cluster system, e.g. based on different cluster maps.

For example, in the below example of FIG. 5A, two large data objects, and child objects thereof, are distributed on different subsets of three node apparatuses 1000 in a cluster system including four node apparatuses 1000 labelled #1 to #4.

FIG. 5A exemplarily shows a distribution of plural large data object across a plurality of node apparatuses of a cluster system according to a hybrid scale-out approach according to exemplary embodiments, and FIGS. 5B to 5D show a distribution of plural large data object across a plurality of node apparatuses of a cluster system according to a hybrid scale-out approach according to some exemplary embodiments after moving a data object segment to another node apparatus.

Exemplarily, in FIG. 5A, the cluster system includes four node apparatuses 1000, and on each node apparatus 1000 there is provided a respective indirection object 2000 for managing locations of data objects (including small object, parent and/or child objects, or system objects storing metadata on the system) on that particular respective node apparatus 1000.

A first large object associated with the parent object PO1 is distributed across the node apparatuses #1, #3 and #4 based on a distribution map (1,3,4), and a second large object associated with the parent object PO2 is distributed across the node apparatuses #1, #2 and #3 based on a distribution map (2,3,1).

For example, in the above denotation, a cluster map (#a,#b,#c) would indicate that node apparatuses #a, #b and #c store data segments or child objects of a certain large data object in that the data segments or child objects are stored in a distributed manner on these node apparatuses #a, #b and #c, while, exemplarily, a first data segment/child object of the respective large object is stored on node apparatus #a, a second data segment/child object of the respective large object is stored on node apparatus #b, a third data segment/child object of the respective large object is stored on node apparatus #c, a fourth data segment/child object of the respective large object is stored on node apparatus #a again, a fifth data segment/child object of the respective large object is stored on node apparatus #b again, etc.

That is, if data segments or child objects are distributed across a number of N node apparatuses, the (N+1)-th data segment or child object may be stored initially on the same node apparatus as the 1st data segment or child object, and the M-th data segment or child object (M being larger than N) may be stored initially on the same node apparatus as the (M−N)-th data segment or child object, wherein the node apparatuses (and/or the order thereof) storing the first N data segments or child objects may be indicated by the distribution map.

It is to be emphasized that different distribution maps may be used for distribution of different large data objects in some embodiments. However, it is further emphasized that the format of distribution maps is not limited to the above denotation, and plural different formats may be used.

In connection with distribution maps in the sense of the present disclosure, it is mentioned that a distribution map is generally indicative of the node apparatuses 1000 among which the large data object is stored in a distributed manner, and the distribution map may generally be further indicative of a particular node apparatus 1000 storing a particular data segment or child object of a large object.

In the example of FIG. 5A, the indirection objects 2000 point to the respective parent objects PO1 and/or PO2 on the respective node apparatus 1000, and the parent objects PO1 and PO2 respectively point to the child objects of the respective large data object on the respective node apparatus 1000, i.e. parent object PO1 on node #1 points to child object CO11 and parent object PO2 on node #1 points to child object CO23, parent object PO2 on node #2 points to child object CO21, parent object PO1 on node #3 points to child object CO12 and parent object PO2 on node #3 points to child object CO22, and parent object PO1 on node #4 points to child object CO13.

For example, if an I/O access request to the large data object into a data segment pointed to by child object CO13 is received on node apparatus 1000 labeled as #2, the location of child object CO13 is determined based on the deterministic algorithm.

For example, it is determined that the I/O access request is directed to the third segment of the respective large data object which is distributed according to the distribution map (1,3,4), and that, therefore, the child object 13, which stores the third segment of the respective large data object, is typically stored on node #4 based on such distribution map.

The node apparatus #2, as receiving node apparatus, therefore forwards the I/O access request (or a corresponding access request) to node apparatus #4, and the location of the child object 13 is determined based on the metadata structures of the indirection object 2000 on node apparatus #4 to identify the location of the parent object PO1 on node apparatus #4 and based on the metadata structure of the respective parent object PO1 on node apparatus #4 which points to the child object 13 on node apparatus #4.

Then, node apparatus #4 may continue to process the I/O access request in connection with the data of the data segment of child object 13 on node apparatus #4, and a response may be sent back to the initial receiving node apparatus #2 which may then issue a corresponding I/O access response to the requesting client.

V.3 Child Object Movement in Exemplary Embodiments

In the above, the parent object location of a parent object or parent object part pointing to the accessed child object is determined based on a deterministic algorithm. Still, as mentioned above, the hybrid approach allows to move child objects to other node apparatuses for purposes of load balancing.

For example, in FIGS. 5B to 5C, the child object CO23 is exemplarily moved to the fourth node apparatus 1000 (#4). Exemplarily, the pointers of the parent object PO2 on node apparatus 1000 (#1) are adjusted accordingly to reflect the new location of the moved child object CO23, but the location of the child object CO23 is still managed by the parent object PO2 (or parent object part) on node apparatus 1000 (#1).

For example, if an I/O access request to the large data object into a data segment pointed to by child object CO23 is received on node apparatus 1000 labeled as #2, the designated (intended) location of child object CO23 is determined based on the deterministic algorithm.

For example, it is determined that the I/O access request is directed to the third segment of the respective large data object which is distributed according to the distribution map (2,3,1), and that, therefore, the child object CO23, which stores the third segment of the respective large data object, is typically stored on node #1 based on such distribution map.

The node apparatus #2, as receiving node apparatus, therefore forwards the I/O access request (or a corresponding access request) to node apparatus #1, and the location of the child object CO23 is determined based on the metadata structures of the indirection object 2000 on node apparatus #1 to identify the location of the parent object PO2 on node apparatus #1 and based on the metadata structure of the respective parent object PO2 on node apparatus #1 which points to the child object CO23 on the other node apparatus #4.

Then, node apparatus #1 may forward the I/O access request (or a corresponding access request) to node apparatus #4, and node apparatus #4 may continue to process the I/O access request in connection with the data of the data segment of child object CO23 on node apparatus #4, and a response may be sent back directly or indirectly (via node apparatus #1) to the initial receiving node apparatus #2 which may then issue a corresponding I/O access response to the requesting client.

In the above, by referring to the metadata structure of the parent object PO2 on node apparatus #1, the location of child object CO23 may be determined even though the child object CO23 is not stored anymore on node apparatus #1 as was indicated by the determination based on the deterministic algorithm, in that the location of child object CO23 is determined based on a pointer of parent object PO2 on node apparatus #1 including a pointing reference to the child object CO23 in the new location of node apparatus #4.

Plural possible embodiments of pointers to child objects on other node apparatuses are possible, and the present invention is not limited to a certain embodiment thereof.

For example, in FIG. 5B, the parent object PO2 on node apparatus #1 exemplarily includes a direct pointer to the child object CO23 on node apparatus #4 (e.g. by including a reference information indicative of a storage location of a root metadata node of the child object CO23 on storage devices of the node apparatus #4), so that the child object CO23 on node apparatus #4 can be accessed without the requirement to reference the indirection object 2000 of node apparatus #4 for identifying the location of the child object CO23 on node apparatus #4.

Further exemplarily, in FIG. 5C, the parent object PO2 on node apparatus #1 exemplarily includes a direct pointer to the indirection object 2000 on node apparatus #4 (e.g. by including a reference information indicative of a storage location of a root metadata node of the indirection object 2000 on storage devices of the node apparatus #4), so that the indirection object 2000 of node apparatus #4 can be accessed to identify the location of the child object CO23 on node apparatus #4.

Further exemplarily, in FIG. 5D, the parent object PO2 on node apparatus #1 exemplarily includes a block pointer pointing to a data block on storage devices of the node apparatus #1 in which location information is stored that allows to identify the node apparatus on which the child object CO23 is newly stored after movement thereof. This is exemplarily indicated in FIG. 5D by the data block indicating the node apparatus #4 on which the child object CO23 is newly stored after movement thereof.

However in further embodiments as described in more detail below the location information may store an identifier of the child object CO23 (such as an object ID or object number) that can be used as input to the same deterministic algorithm as used for distribution of small data objects, to determine the new location of the respective child object CO23 based on the identifier stored in the data block pointed to by the parent object PO2 on node apparatus #1 and the deterministic algorithm underlying the data distribution in the cluster system.

In some exemplary embodiments, child objects can be pointed to by an indirection object similar to small data objects and parent objects being pointed to by the indirection object. Such metadata structure is exemplarily illustrated in FIG. 6A, which exemplarily shows a schematic diagram of an exemplary metadata tree structure on a node apparatus according to some exemplary embodiments.

For example, in FIG. 6A, the metadata tree structure of a parent object on a node apparatus is pointed to by the metadata tree structure of the indirection object (rooted in a root metadata node R(IO)) in that a pointer of a direct metadata node of the indirection object points to the root metadata node R(PO) of the parent object PO.

In the same way, the metadata tree structure of a child object on the node apparatus is pointed to by the metadata tree structure of the indirection object (rooted in a root metadata node R(IO)) in that a pointer of a direct metadata node of the indirection object points to the root metadata node R(CO) of the child object CO.

In this sense, the parent and child objects, and small data objects, may exist in parallel metadata tree structures at a data object level below the metadata tree structure of the indirection object level, in that all root metadata nodes of data objects (parent objects, child objects, small data object, system objects) may be directly pointed to by pointers of a direct metadata node tree level of the indirection object on a particular node apparatus.

In FIG. 6A exemplarily pointers of direct metadata nodes of parent objects may point to data blocks indicating locations of root metadata nodes of its respective child objects.

However, in preferred exemplary embodiments, the pointers of direct metadata nodes of parent objects may directly point to root metadata nodes of root metadata nodes of its respective child objects, at least the ones locally managed on the same node apparatus; see e.g. FIG. 6B. Then, only direct metadata nodes of small data objects and child objects actually point to data blocks.

In such exemplary embodiments, parent object may support and/or have metadata nodes including two types of pointers, such as e.g. a local pointer type (e.g. using a disk or storage device reference) that points to a location of a root metadata node of a child object on the local node apparatus, and a non-local pointer type (e.g. using an object reference) that points to a location of a child object or the root metadata node of the data object on another node apparatus.

In any case, only direct metadata nodes of small data objects and child objects actually point to data blocks storing actual user data of the respective associated data object.

VI. Object Number Allocation in Exemplary Embodiments

In exemplary embodiments, a deterministic approach may be used to distribute data segments of large data objects. The size of such data segments is limited according to a so-called distribution size.

For example, if a large data object shall be stored on M node apparatuses of a cluster of N node apparatuses (N≥M), the large data object shall be stored in a distributed manner by distributing its K data segments on M node apparatuses. For example, if the large data object is of a data size being K times the distribution size, the K data segments are distributed on K node apparatuses if K<M or the K data segments are distributed on M node apparatuses if K≥M.

In the management of data objects in the cluster system, in order to uniquely identify data objects, each data object is assigned with a unique object identifier such as e.g. a unique object number in exemplary embodiments.

In the cluster system, each data object is assigned the unique object identifier, preferably independent of whether it is a small data object, a large data object, a parent object or a child object, in exemplary embodiments. In the following, exemplary embodiments will be described with reference to object numbers as object identifiers. This is however not intended to be interpreted as limiting the present invention, and other object identifiers may be used.

Exemplarily, each node apparatus is assigned another range in the object number space, and a deterministic algorithm is used to provide a mapping function uniquely (and optionally surjectively) mapping object numbers of an object number space to node apparatus IDs.

Such mapping function takes, for example, an object number as input parameter and returns an output parameter indicative of a particular node apparatus ID (e.g. a unique node apparatus identifier or unique node apparatus ID number). Such mapping function may be used to determine a responsible node apparatus based on a deterministic algorithm.

Furthermore, such mapping function may be provided as (or be combined with) a distribution map providing function which takes an object number as input parameter and returns a distribution map for a distribution of M data segments on different node apparatuses of a cluster of N node apparatuses (with M≤N), wherein M and N may be further input parameters of the distribution map providing function or may be pre-determined.

As previously mentioned, the (M+1)-th data segment shall be distributed/stored to the same node apparatus as the $1^{st}$ data segment and the (M+j)-th data segment shall be distributed/stored to the same apparatus as the j-th data segment. Therefore, any distribution map, independent of the parameter M, can be used to distribute an arbitrary number of one or more data segments.

For example, in a cluster system with N=3 nodes and for distribution of M=3 data segments on different nodes, the available distribution maps are: (1,2,3), (2,3,1), (3,1,2), (1,3,2), (2,1,3), and (3,2,1). For example, for a distribution map (1,2,3), the first data segment of a large data object (i.e. a child object associated with the first data segment) would, according to the deterministic algorithm, be stored to the first node apparatus (#1).

In the same way, a small object (which has a total data size smaller or equal to the distribution size and therefore is smaller or equal than a data segment) would, according to the deterministic algorithm and based on the distribution map (1,2,3), be stored to the first node apparatus (#1).

On the other hand, for a distribution map (1,2,3), the second data segment of a large data object (i.e. a child object associated with the second data segment) would, according to the deterministic algorithm, be stored to the second node apparatus (#2), the third data segment of a large data object (i.e. a child object associated with the third data segment) would, according to the deterministic algorithm, be stored to the third node apparatus (#3), and further data segments would be sequentially stored again to the first to third node apparatuses.

It is to be noted that the invention is not limited to any specific deterministic algorithm used to provide a deterministic mapping function for determining a distribution map in the cluster.

In general, a deterministic mapping function algorithm may take one or more input values, including e.g. a total number of nodes of the cluster (which may change by adding or removal of one or more node apparatuses), a number of a subset of nodes used to distribute data segments of parent objects (e.g. if in a cluster of N node apparatuses, the data segments/child objects of certain parent objects shall not be distributed across all N nodes but to respective subsets of M node apparatuses with M<N), an object identifier or a parameter deterministically determined based on such object identifier (e.g. an object number or parameter determined based on the object number), and/or a data segment number.

As output value(s), e.g. if the deterministic algorithm takes the object identifier or a parameter deterministically determined based on such object identifier (e.g. an object number or parameter determined based on the object number) as input value, the deterministic algorithm may directly output a distribution map indicating the respective main node apparatus to store the small data object or first data segment of a parent object being associated with the input value object identifier and optionally additionally indicating the one or more other node apparatuses to store the other data segments of the associated parent object in a distributed manner.

In other exemplary embodiments, the e.g. if the deterministic algorithm takes the object identifier or a parameter deterministically determined based on such object identifier (e.g. an object number or parameter determined based on the object number) as one input value and a data segment number as another input value, the deterministic algorithm may directly output information identifying a certain specific node apparatus to store a certain data segment of a certain object. Then, locations of small data objects and locations of a first data segment of a parent object being associated with the input value object identifier would be output if the other input value would indicate the first data segment (such as e.g. being the lowest data segment number, such as e.g. data segment number 0).

VI.1 Object Number Lists in Exemplary Embodiments

Generally, object numbers can be managed in such a way that each node apparatus of the cluster system stores a respective object number list of object numbers handled by itself, i.e. a list indicative of plural object numbers which map, when using the mapping function of the deterministic algorithm, to the node apparatus itself.

That is, each object number of an object number list stored at a certain node apparatus includes those (and preferably only those) object numbers that map, when being used an input parameter in the mapping function, to the certain node apparatus.

When using a deterministic algorithm that provides a distribution map on the basis of an object number as input parameter, each object number of an object number list stored at a certain node apparatus includes those (and preferably only those) object numbers that map, when being used an input parameter in the distribution map providing function, to distribution maps that indicate that a first data segment of a large data object is to be stored to the certain node apparatus.

For example, in a cluster system with N=3 nodes and for distribution of M=3 data segments on different nodes, in which the available distribution maps are, (1,2,3), (2,3,1), (3,1,2), (1,3,2), (2,1,3), and (3,2,1), the object number list stored on the first node apparatus (#1) would be indicative of the object numbers (and preferably only those object numbers) that map to the distribution maps (1,2,3) and (1,3,2); or more generally to one or more or all distribution maps (1,2), (1,3), (1,2,3), and (1,3,2) (if M is 1, 2 or 3).

Furthermore, in the object number list on each node apparatus, the node apparatus preferably tracks whether the respective object number is used or not used on the particular node apparatus.

Accordingly, when a new object is created on a node apparatus, the node apparatus can allocate/assign a free (non-used) object number from the object number list to the newly created object. Then, the respective object number may be indicated to be used in the object number list by updating the object number list upon creation of a new object.

Accordingly, each node can autonomously assign unique object numbers to newly created objects, and still if another node apparatus, which has no knowledge about creation of the newly created object, receives a request to access the newly created object by an I/O request including the object number thereof as object reference, such receiving node apparatus can determine the location of the newly created based on the deterministic algorithm.

For example, in a cluster system with N=3 nodes and for distribution of M=3 data segments on different nodes, in which the available distribution maps are, (1,2,3), (2,3,1), (3,1,2), (1,3,2), (2,1,3), and (3,2,1), if the first node apparatus (#1) receives an I/O access request to a data object having the object number 14 and the deterministic algorithm using the input of the object number 14 returns an identifier of the second node apparatus (#2) or any of the distribution maps (2,3,1), (2,1,3), (2,1), or (2,3), then the first node apparatus (#1) is able to determine that a location of the respective object is on the second node apparatus (#2).

VI.2 Child Object Numbers in Exemplary Embodiments

Object numbers of child objects may not be communicated to upper layers (above the metadata layer or above the scale-out layer) and only object numbers of the large data object may be communicated to such upper layers, in exemplary embodiments, such that upper layers issue access requests to large data object by the object number of the large data object and an offset in the large data object, e.g. in that an object reference may include a segment number as an indicator of an offset.

Then, a first data segment of a large data object having the object number R may be addressed as R:0, a second data segment of a large data object having the object number R may be addressed as R:1, etc.

Then, the deterministic algorithm still allows to determine, by any node apparatus, the (intended) location of a respective child object based on a distribution map associated with the respective object number of the large data object, and the actual location of the child object may be indicated by the parent object stored on the node apparatus of the (intended) location of the respective child object.

For example, in a cluster system with N=3 nodes and for distribution of M=3 data segments on different nodes, in which the available distribution maps are, (1,2,3), (2,3,1), (3,1,2), (1,3,2), (2,1,3), and (3,2,1), if the first node apparatus (#1) receives an I/O access request to a large data object having the object number 14 at an offset 5 (14:5), indicating the sixth data segment of the large data object with object number 14, and the deterministic algorithm using the input of the object number 14 returns a distribution map (1,2,3), then the first node apparatus (#1) is able to determine that a (intended) location of the respective child object is on the third node apparatus (#3).

VII. Deterministic Distribution Algorithm in Exemplary Embodiments

In exemplary embodiments, a deterministic approach may be used to distribute data segments of large data objects. The size of such data segments is limited according to a so-called distribution size.

For example, if a large data object shall be stored on M node apparatuses of a cluster of N node apparatuses (N≥M), the large data object shall be stored in a distributed manner by distributing its K data segments on M node apparatuses. For example, if the large data object is of a data size being K times the distribution size, the K data segments are distributed on K node apparatuses if K<M or the K data segments are distributed on M node apparatuses if K≥M.

In the management of data objects in the cluster system, in order to uniquely identify data objects, each data object is assigned with a unique object identifier such as e.g. a unique object number in exemplary embodiments.

In the cluster system, each data object is assigned the unique object identifier, preferably independent of whether it is a small data object, a large data object, a parent object or a child object, in exemplary embodiments. In the following, exemplary embodiments will be described with reference to object numbers as object identifiers. This is however not intended to be interpreted as limiting the present invention, and other object identifiers may be used.

As previously mentioned, exemplarily, each node apparatus is assigned another range in the object number space, and a deterministic algorithm is used to provide a mapping function uniquely (and optionally surjectively) mapping object numbers of an object number space to node apparatus IDs.

Such mapping function takes, for example, an object number as input parameter and returns an output parameter indicative of a particular node apparatus ID (e.g. a unique node apparatus identifier or unique node apparatus ID number). Such mapping function may be used to determine a responsible node apparatus based on a deterministic algorithm.

Furthermore, such mapping function may be provided as (or be combined with) a distribution map providing function which takes an object number as input parameter and returns a distribution map for a distribution of M data segments on different node apparatuses of a cluster of N node apparatuses (with M≤N), wherein M and N may be further input parameters of the distribution map providing function or may be pre-determined.

As previously mentioned, the (M+1)-th data segment shall be distributed/stored to the same node apparatus as the $1^{st}$ data segment and the (M+j)-th data segment shall be distributed/stored to the same node apparatus as the j-th data segment. Therefore, any distribution map, independent of the parameter M, can be used to distribute an arbitrary number of one or more data segments.

For example, in a cluster system with N=3 nodes and for distribution of M=3 data segments on different nodes, the available distribution maps are: (1,2,3), (2,3,1), (3,1,2), (1,3,2), (2,1,3), and (3,2,1). For example, for a distribution map (1,2,3), the first data segment of a large data object (i.e. a child object associated with the first data segment) would, according to the deterministic algorithm, be stored to the first node apparatus (#1). In the same way, a small object (which has a total data size smaller or equal to the distribution size and therefore is smaller or equal than a data segment) would, according to the deterministic algorithm and based on the distribution map (1,2,3), be stored to the first node apparatus (#1).

On the other hand, for a distribution map (1,2,3), the second data segment of a large data object (i.e. a child object associated with the second data segment) would, according to the deterministic algorithm, be stored to the second node apparatus (#2), the third data segment of a large data object (i.e. a child object associated with the third data segment) would, according to the deterministic algorithm, be stored to the third node apparatus (#3), and further data segments would be sequentially stored again to the first to third node apparatuses.

For example, according to object number grouping described above, if the number of pointers of a metadata node of the indirection object is N(BP), the input parameter of the mapping function (or distribution map providing function) may be taken as the quotient of the object number (or the object number minus one, if the object number counting starting at 1) for divisor $N(BP)^L$ (L being an integer of one, two or three or more) by neglecting the remainder, such that each group of $N(BP)^L$ subsequent object numbers leads to a same input parameter and thus to a same mapped node apparatus or same distribution map.

In some examples, a known algorithm such as the CRUSH (Controlled Replication Under Scalable Hashing) algorithm may be used to realize a mapping function and a distribution map providing function. Also, modified mapping algorithms based on the CRUSH algorithm may be used.

The deterministic algorithm according to some exemplary embodiments may include a pseudo-random number generator which takes the input value combined with a node number (node ID) as a seed and returns a pseudo-random number which is however returned each time the same seed is used. Accordingly, each seed is associated with a fixed pseudo-random number. Accordingly, each combination of an input value being determined based on the object number and node ID (node number) is associated with a fixed pseudo-random number.

Further exemplarily, for each object number of the range of object numbers 1 to N and for each node apparatus, a respective seed is determined and used to determine an associated pseudo-random number.

For a given object number, the main node apparatus (e.g. a node apparatus intended to store a small data object of the given object number or a first segment of a large data object of the given object number) can be determined for example as the node apparatus which is associated with the largest pseudo-random number (or the smallest pseudo-random object number) among the pseudo-random numbers returned for the node apparatuses for the given object numbers.

Furthermore, in order to determine a distribution map based on the above algorithm using pseudo-random numbers, a distribution sequence of node apparatuses storing further data segments of large data objects may be determined based on the ordering of the pseudo-random numbers returned for the node apparatuses for the given object numbers.

Also, only a subset of node apparatuses may be selected for the distribution of data segments, i.e. by taking only the node apparatuses having the M largest (or smallest) pseudo-random numbers among all pseudo-random numbers. In the example, the distribution maps are exemplarily determined to select four node apparatuses among the six node apparatuses by exemplarily taking the four largest pseudo-random numbers among all pseudo-random numbers returned for the node apparatuses for the given object numbers.

It is emphasized that the algorithm can be extended to be used for an arbitrary number of object numbers, an arbitrary total number of node apparatuses in the cluster system, as well as to an arbitrary number of node apparatuses (between two and the total number of node apparatuses in the cluster system) being used for a certain distribution map.

It is to be noted that the invention is not limited to any specific deterministic algorithm used to provide a deterministic mapping function for determining a distribution map in the cluster.

In general, a deterministic mapping function algorithm may take one or more input values, including e.g. a total number of nodes of the cluster (which may change by adding or removal of one or more node apparatuses), a number of a subset of nodes used to distribute data segments of parent objects (e.g. if in a cluster of N node apparatuses, the data segments/child objects of certain parent objects shall not be distributed across all N nodes but to respective subsets of M node apparatuses with M<N), an object identifier or a parameter deterministically determined based on such object identifier (e.g. an object number or parameter determined based on the object number), and/or a data segment number.

As output value(s), e.g. if the deterministic algorithm takes the object identifier or a parameter deterministically determined based on such object identifier (e.g. an object number or parameter determined based on the object number) as input value, the deterministic algorithm may directly output a distribution map indicating the respective main node apparatus to store the small data object or first data segment of a parent object being associated with the input value object identifier and optionally additionally indicating the one or more other node apparatuses to store the other data segments of the associated parent object in a distributed manner.

In other exemplary embodiments, the e.g. if the deterministic algorithm takes the object identifier or a parameter deterministically determined based on such object identifier (e.g. an object number or parameter determined based on the object number) as one input value and a data segment number as another input value, the deterministic algorithm may directly output information identifying a certain specific node apparatus to store a certain data segment of a certain object. Then, locations of small data objects and locations of a first data segment of a parent object being associated with the input value object identifier would be output if the other input value would indicate the first data segment (such as e.g. being the lowest data segment number, such as e.g. data segment number 0).

VIII. Data De-Duplication in Exemplary Embodiments

According to preferred exemplary embodiments, the data storage system is controlled so as to perform data de-duplication. In principle, data de-duplication could be executed as disclosed in the patent application "SYSTEM AND METHOD FOR MANAGING DE-DUPLICATION USING CHECKPOINTS IN A FILE STORAGE SYSTEM" filed on Sep. 19, 2012 as application No. PCT/US2012/056032 A1, published as WO 2014/046650 A1, which is incorporated herein by reference.

In such examples, data objects are managed as metadata tree structures and direct metadata nodes of such data objects include block pointers (block references) pointing to data blocks storing the data. This is similar to some exemplary embodiments in that direct metadata nodes of data objects, and in particular small data objects and child data objects of large data objects, include block pointers (block references) pointing to data blocks storing the data.

When it is determined that data blocks associated with different data objects contain the same data ("duplicate data block"), the metadata direct node of one of the data objects is updated in that its block pointer is updated to point to the same data block, so that two block pointers of two direct metadata node associated with different data objects point to the same data block (i.e. the data block is shared between the data objects). Then, the other data block can be freed and only one data block containing the duplicate data is referenced by two data objects. However, the data is stored only once in a single data block, and thus data storage capacity can be saved efficiently.

Such process is referred to as "de-duplication" in that duplicate data being associated with two or more data objects only needs to be physically stored once, and also only takes one logical block address in the logic block address space. The number of direct metadata nodes pointing to the same data block is unlimited.

However, in contrast to the above process of de-duplication as known from WO 2014/046650 A1, in some exemplary embodiments the duplicate data in a data storage system is managed by storing and managing a specific data object, referred to as "de-duplication object". The de-duplication object can be managed similar as the other data objects in the data system, in particular in connection with data distribution of and I/O access to data objects.

VIII.1 De-Duplication Object in Exemplary Embodiments

Accordingly, in some exemplary embodiments, the de-duplication object may be managed by a metadata tree structure similar to other data objects, e.g. in that a root metadata node of the de-duplication object is referenced by the indirection object (e.g. a pointer of a direct metadata node of the indirection object points to the root metadata node of the de-duplication object).

The root metadata node of the de-duplication object may include plural pointers (metadata node references) pointing to indirect and/or direct metadata nodes of the de-duplication object, and pointers (block references) of the direct metadata nodes of the de-duplication object may point to data blocks (e.g. similar to the direct metadata nodes of small and child data objects).

In principle the number of tree levels of the metadata tree structure of the de-duplication object may be unlimited, however, in preferred exemplary embodiments the de-duplication object is managed similar to other data objects as either a small data object, if the size of the de-duplication object is smaller than or equal to the distribution size being the unit of data distribution across the node apparatuses of the cluster system, or as a plurality of independent small data objects or even preferably as a large data object, if the size of the de-duplication object is larger than the distribution size.

In the latter case, the de-duplication object includes a parent object and plural child objects as described for regular data objects discussed above. Then, the de-duplication object is distributed across the node apparatuses of the cluster system in that the data of the de-duplication object is divided into plural data segments of the distribution size and each data segment is managed by a respective child object, and the child objects are stored in a distributed manner across the node apparatuses in accordance with above-described exemplary embodiments.

On the other hand, each of the child objects of the de-duplication object may be referenced by a respective object reference of a parent object (or parent object part) of the de-duplication object, and the parent object (or parent object parts) of the de-duplication object is distributed across the node apparatuses of the cluster system, and typically a parent object (or parent object part) of the de-duplication object on one of the node apparatuses points to child objects of the de-duplication object on the same node apparatus (e.g. unless the respective child object has been moved to another node apparatus for load balancing purposes).

In some exemplary embodiments, pointer portions in direct metadata nodes of metadata tree structures may include either block pointers indicating logical block addresses (e.g. logical block numbers) of data blocks (e.g. in direct metadata nodes of the small data objects, child objects and the de-duplication object) or object references indicating object identifiers (e.g. object numbers) and optionally including block/offset identifiers (e.g. offsets) indicating a target portion in the referenced object. Such object references may be used by parent objects for pointing to their child objects or by small data objects and child objects for referencing the de-duplicated data managed by the de-duplication object.

As an advantage of the above, while the de-duplication object may manage de-duplicated data in the data storage system, the de-duplication object may be distributed across the node apparatuses in a same efficient and reliable manner as other data objects, and de-duplicated data can be moved for load balancing purposes (and can be re-distributed by node apparatus addition or node apparatus removal) in the same way as other objects. On the other hand, the de-duplication object can be accessed within the whole data storage system, and efficiently allows de-duplication of duplicate data on all node apparatuses in contrast to only on the respective node apparatuses individually and separately.

VIII.2 General De-Duplication Procedure in Exemplary Embodiments

In general, according to exemplary embodiments, the direct metadata nodes of the de-duplication object (or of child objects thereof) include block pointers pointing to data blocks storing user data that has been de-duplicated (i.e.

which may relate to multiple other data objects or at least different data blocks of the same or different data objects).

The direct metadata nodes of data objects (such as small data objects or child objects of large data objects) may include block pointers pointing to data blocks storing user data or may include object references to the de-duplication object in connection with de-duplicated data blocks.

For example, if the data of a first data block of a first data object is a duplicate of another second data block of a second data object, a previously non-used block pointer of a direct metadata node of the duplication object may be updated to point to the first (or second) data block (or to another data block to which the same duplicate data is copied). Instead of including block pointers to the first and second data blocks, the respective direct metadata nodes of the first and second data object can be updated to include object references to the de-duplication object to indirectly reference the duplicate data block.

Figure 7A:
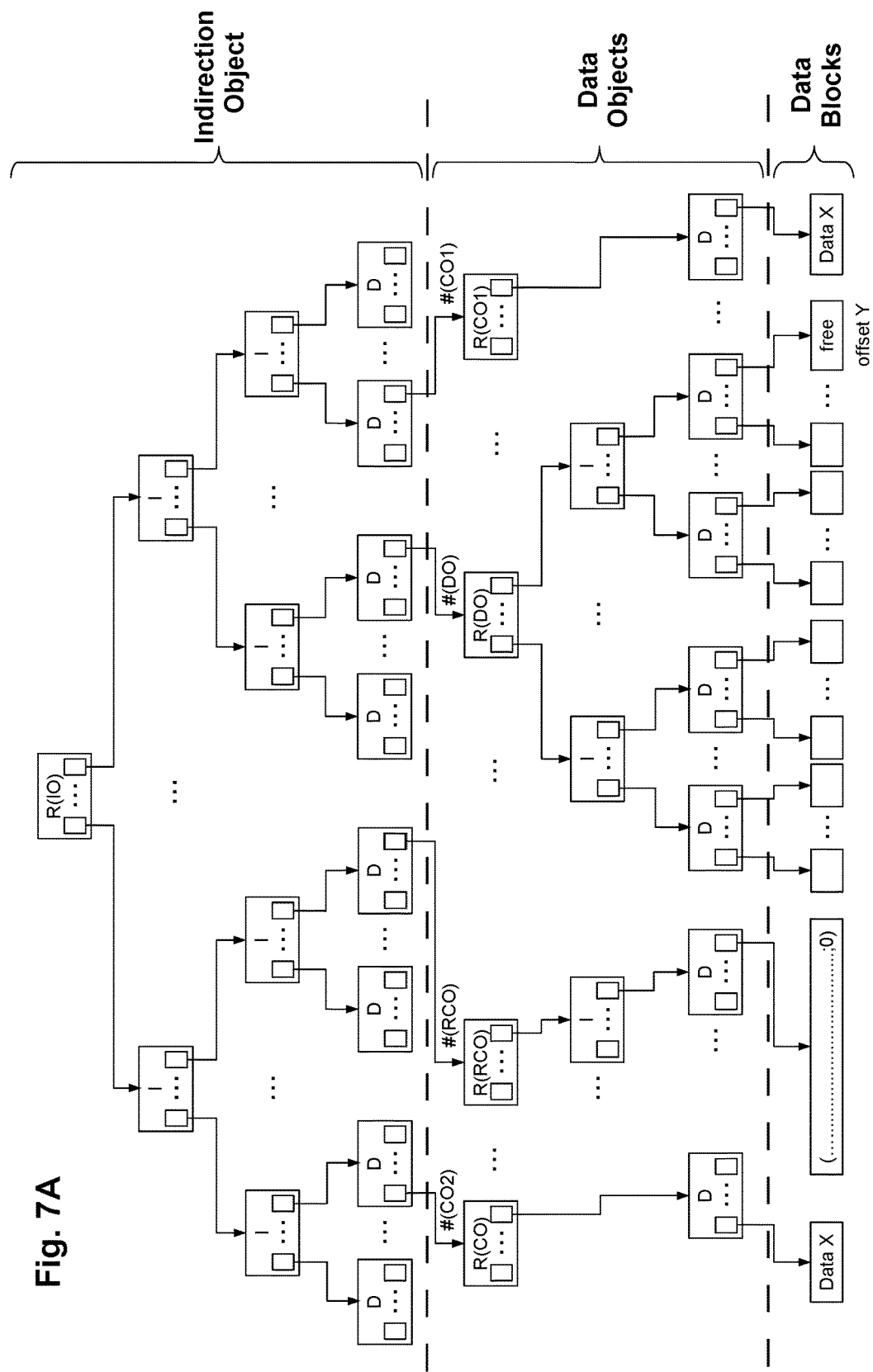
FIGS. 7A and 7B exemplarily show schematic diagrams of an exemplary metadata tree structure on a node apparatus exemplarily illustrating de-duplication of data according to some exemplary embodiments.
Figure 7B:
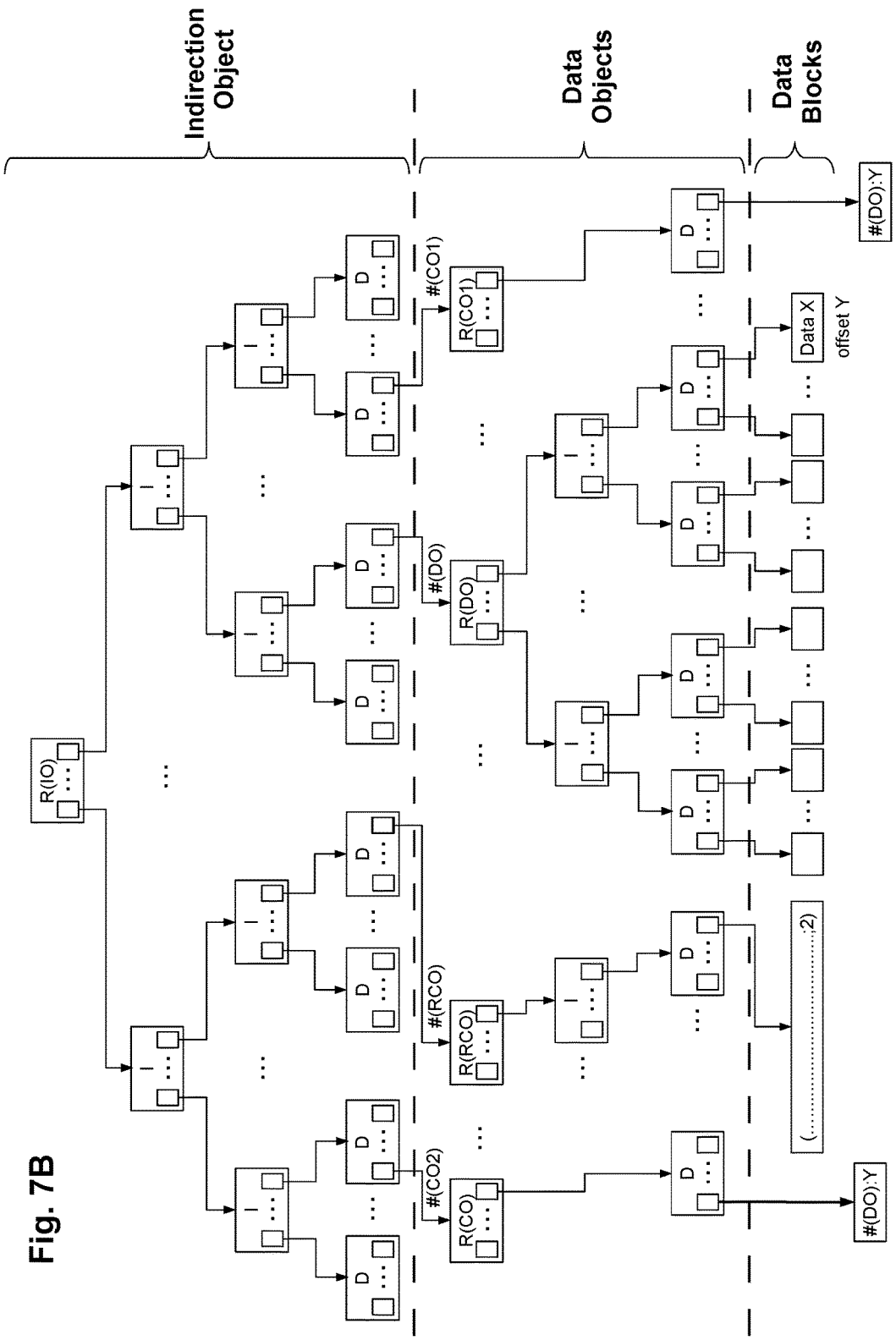

For example, FIGS. 7A and 7B exemplarily show schematic diagrams of an exemplary metadata tree structure on a node apparatus exemplarily illustrating de-duplication of data according to some exemplary embodiments.

In FIG. 7A, e.g. based upon the general metadata tree structure of FIG. 6, a metadata structure exemplarily includes the metadata tree structure of the indirection object.

Exemplarily, the direct metadata nodes of the indirection objects include pointers to root metadata nodes of two different child objects CO1 and CO2 (which may be child objects of the same large data object of different data objects, and/or which may be stored to storage devices on the same or different node apparatuses of the cluster system).

Exemplarily, the object numbers (object identifiers) of the child objects are given as #(CO1) and #(CO2), and may be allocated as discussed above (e.g. based on a deterministic algorithm). The object numbers (object identifiers) of the child objects may additionally refer to offsets of the respective root metadata nodes of the child objects in the indirection object.

Exemplarily, a data block pointed to by a block pointer of a direct metadata node of the first child object CO1 stores data referred to as "DATA X", and a data block pointed to by a block pointer of a direct metadata node of the second child object CO2 stores the same (duplicate) data referred to as "DATA X" (e.g. determined based on a comparison of a hash value determined on the basis of the DATA X, or determined based on a binary bit-by-bit comparison thereof).

FIG. 7A further exemplarily shows the metadata structure of the de-duplication object including a root metadata node R(DO) of the de-duplication object. Exemplarily, the object number (object identifier) of the de-duplication object is given as #(DO), and may be allocated as discussed above (e.g. based on a deterministic algorithm). The object number (object identifier) of the de-duplication object may additionally refer to an offset of the respective root metadata node of the de-duplication object (or of a parent object thereof) in the indirection object.

Only exemplarily, the de-duplication object is a data object having three tree levels in FIG. 7A. In preferred embodiments, the de-duplication object may be separated into a parent object (of unlimited tree level number) and plural child objects (of a pre-determined tree level number, depending on the distribution size). Then, child objects of the de-duplication object would have the same tree level number as child objects of regular large data objects or as small data objects, in some exemplary embodiments.

Exemplary, at an offset Y of the de-duplication object, the de-duplication object references a free (non-used) data block in FIG. 7A. According to de-duplication according to some exemplary embodiments, the duplicate data DATA X can be copied to the free data block at offset Y of the de-duplication object, and instead of block pointers pointing to the data block(s) storing the data DATA X in the child objects CO1 and CO2, the respective direct metadata nodes of the child objects CO1 and CO2 are adapted (updated) to include (or indicate locations) of object references to the de-duplication object at offset Y, i.e. object references #(DO):Y indicating the object identifier (e.g. object number #(DO) of the de-duplication object) and the offset of the respective de-duplicated data block. A result can be exemplarily seen in FIG. 7B.

In some exemplary embodiments, in FIG. 7A, de-duplication may be achieved without copying the duplicate data DATA X but by adapting (updating) an unused block pointer of a direct node metadata of the de-duplication object to point to the data block previously pointed to by the first or second child object's direct metadata nodes' block pointers, and freeing the other data block.

VIII.3 Reference Count Object in Exemplary Embodiments

In the above de-dude-duplication process, it may be desired to keep track of a reference count to data blocks of the de-duplication object, e.g. in order to know when a data block used by the de-duplication object can be freed again and a block pointer of a direct metadata node of the de-duplication object could be re-used in de-duplication.

For example, each direct metadata node of the de-duplication object could store the respective associated reference count of the data blocks associated with the respective direct metadata node, and/or each block pointer of the direct metadata nodes of the de-duplication object could store the respective associated reference count of the data block associated with the respective block pointer.

However, in some exemplary embodiments, there can be provided another data object, referred to as reference count object storing data indicative of a reference count of data blocks used (referenced by) the de-duplication object. For example, the data of the reference count object could be a reference count list storing entries, each entry indicating a reference count of a data block used by the de-duplication object, or the data of the reference count object could be a reference count bit map indicating references counts of the data block used by the de-duplication object (e.g. similar to a free space bitmap used for allocation of data blocks).

The reference count object can be managed similar as the other data objects in the data system, in particular in connection with data distribution of and I/O access to data objects.

Accordingly, in some exemplary embodiments, the reference count object may be managed by a metadata tree structure similar to other data objects, e.g. in that a root metadata node of the reference count object is referenced by the indirection object (e.g. a pointer of a direct metadata node of the indirection object points to the root metadata node of the reference count object).

The root metadata node of the reference count object may include plural pointers (metadata node references) pointing to indirect and/or direct metadata nodes of the reference count object, and pointers (block references) of the direct metadata nodes of the reference count object may point to data blocks (e.g. similar to the direct metadata nodes of small and child data objects).

In principle the number of tree levels of the metadata tree structure of the reference count object may be unlimited, however, in preferred exemplary embodiments the reference count object is managed similar to other data objects as either a small data object, if the size of the reference count object is smaller than or equal to the distribution size being the unit of data distribution across the node apparatuses of the cluster system, or as a plurality of independent small data objects or even preferably as a large data object, if the size of the reference count object is larger than the distribution size.

In the latter case, the reference count object includes a parent object and plural child objects as described for regular data objects discussed above. Then, the reference count object is distributed across the node apparatuses of the cluster system in that the data of the reference count object is divided into plural data segments of the distribution size and each data segment is managed by a respective child object, and the child objects are stored in a distributed manner across the node apparatuses in accordance with above-described exemplary embodiments.

On the other hand, each of the child objects of the reference count object may be referenced by a respective object reference of a parent object (or parent object part) of the reference count object, and the parent object (or parent object parts) of the reference count object is distributed across the node apparatuses of the cluster system, and typically a parent object (or parent object part) of the reference count object on one of the node apparatuses points to child objects of the reference count object on the same node apparatus (e.g. unless the respective child object has been moved to another node apparatus for load balancing purposes).

Furthermore, since the reference count object is closely related to the de-duplication object, the distribution thereof across the node apparatuses is preferably synchronized and/or executed in accordance with each other. Preferably, the child objects of the reference count object are stored on and managed by the same node apparatus as the node apparatus storing and managing the associated child objects of the de-duplication object.

For example, a child object of the reference count object pointing to a data block including an indicator being indicative of a reference count of a certain data block of the de-duplication object is preferably stored on a same node apparatus as the respective child object of the de-duplication object pointing to the certain data block.

However, it is emphasized that a data block of the reference count object may include plural indicators being indicative of reference counts of plural data blocks of the de-duplication object.

For example, if the number of pointers per metadata node is, for example, 128 and the block size BS of data blocks is exemplarily fixed to 4 kB in exemplary embodiments, the maximal size of a child object (or small object) at a maximum of two tree levels per child object (or small object) is 64 MB. This amounts exemplarily to a number 16382 of data blocks of size 4 kB per child object.

Then, assuming that the reference count object indicates a bitmap of 1 byte per reference count of a data block of the de-duplication object, this would require a data of 16 kB in total to indicate the reference counts of all data blocks of a child object of the de-duplication object. Therefore, a child object of the same number of blocks of the reference count object could be associated with more than 4000 de-duplication object's child objects.

For example, if the number of pointers per metadata node is, for example, 256 and the block size BS of data blocks is exemplarily fixed to 4 kB in exemplary embodiments, the maximal size of a child object (or small object) at a maximum of two tree levels per child object (or small object) is 256 MB. This amounts exemplarily to a number 65536 of data blocks of size 4 kB per child object.

Then, assuming that the reference count object indicates a bitmap of 1 byte per reference count of a data block of the de-duplication object, this would require a data of 64 kB in total to indicate the reference counts of all data blocks of a child object of the de-duplication object. Therefore, a child object of the same number of blocks of the reference count object could be associated with more than 4000 de-duplication object's child objects.

In the above examples there would be one-to-one correspondence of each byte of the reference count object being associated with a respective data block of the de-duplication object.

In order to reduce the number, it is possible in some exemplary embodiments to make the size of the child objects of the reference count object smaller, and reduce the distribution size. For example, the distribution size (child object size) of the reference count object could be made such that the data thereof indicates reference counts for a number of blocks that is equal to (or two, three, four or more times) the number of bocks of a child object of the de-duplication object.

For example, in the above example, the distribution size (child object size) of a reference count object could be selected as 16 kB while the distribution size for regular child objects is 64 MB, exemplarily, or could be selected as 64 kB while the distribution size for regular child objects is 256 MB. Such correspondence may be used to translate offsets in the de-duplication object to offsets in the reference count object (e.g. the reference count object offset N×1B corresponds to the de-duplication object offset N×4K).

Reducing the distribution size (child object size) of the reference count object can be achieved by reducing the maximum number of tree levels of the reference count object's child object compared to regular child objects, by reducing the number of pointers per metadata node of the reference count object' child object compared to the regular number of pointers per metadata node of other objects, and/or by reducing the block size.

Referring again to FIG. 7A and FIG. 7B, these also exemplarily show that a direct metadata node of the indirection object points to a root metadata node R(RCO) of the reference count object, referenced by the object identifier/object number #(RCO).

In a data block pointed to by a pointer of a direct metadata node of the reference count object includes a list of reference counts including the reference count "0" for the free (non-used) data block of the de-duplication object in FIG. 7A.

On the other hand, in FIG. 7B, after the duplicate data DATA X after de-duplication thereof is stored in the data block with offset Y in the duplication object, and since the data block is referenced by the two child objects CO1 and CO2 and therefore has a reference count 2, the respective data block pointed to by the pointer of the direct metadata node of the reference count object includes the list of reference counts including the updated reference count "2" for the now used data block of the de-duplication object in FIG. 7B.

Of course, if another data block of the same data (duplicate data) is identified, the respective data object can be modified as well to include an object reference to the de-duplication object at the respective offset thereof, and the corresponding reference count in the reference count object can be incremented.

On the hand, if the data is deleted in one of the data objects including an object reference to the de-duplication object at the respective offset thereof the corresponding reference count in the reference count object can be decremented.

In exemplary embodiments, when the reference count in the reference count object is decremented and reaches zero, indicating that the associated data block of the de-duplication object (or holding object) is not referenced anymore by any data object (e.g. small or child object), then the corresponding data block can be considered "free" to be re-used for new data block allocation in case of a holding object in exemplary embodiments for newly written data blocks or at least to be re-used in the de-duplication object in other exemplary embodiments when newly de-duplicating another previously written data block and its one or more detected duplicate(s), so as to be re-usable for new data writes or new de-duplication data.

Also, it is to be noted that such decrementing and incrementing processing performed on the reference count object as discussed above for exemplary embodiments may lead to multiple and highly frequent random updates (which may include not only random writes but also random reads for reading metadata of the tree structure of the reference count object).

In preferred exemplary embodiments, the reference count object may be divided into plural regions and a respective change list or update list may be managed for each region so that the updates of the reference count object can be done by region based on accumulated updates according to the respective change lists or update lists.

Preferably, processing of updates of the reference count object may be done in a similar way as update processing performed in connection with updates of a free space object indicating free and used blocks for allocation purposes. Also, in other embodiments the reference count object may be used also for allocation purposes, specifically in connection with embodiments such as those using a holding object.

The reference count object may exemplarily be managed as a bit map, and the above processing of updates of the reference count object may be performed such as described for exemplary embodiments of bitmap processing or free space allocation object update processing as exemplarily disclosed in international patent application PCT/US16/31811 (PCT/US2016/031811) which was filed on May 11, 2016 with the title "DATA STORAGE SYSTEM, PROCESS AND COMPUTER PROGRAM FOR SUCH DATA STORAGE SYSTEM FOR REDUCING READ AND WRITE AMPLIFICATIONS", and which is incorporated herein by reference.

Figure 8:
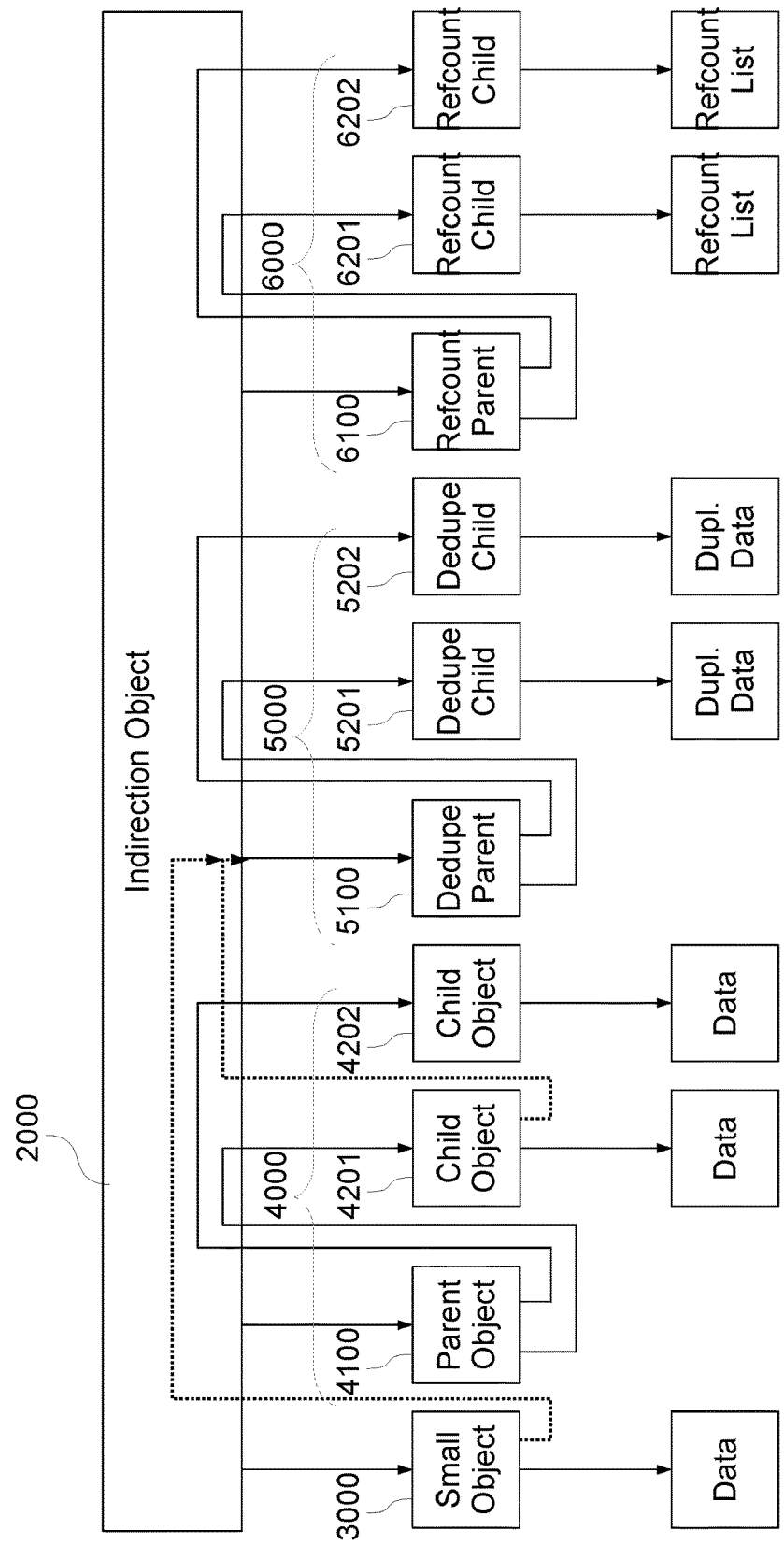
FIG. 8 exemplarily shows a schematic diagram of an exemplary metadata tree structure on a node apparatus including a de-duplication object and a reference count object according to some exemplary embodiments.

VIII.4 De-Duplication Object and Reference Count Object in Exemplary Embodiments FIG. 8 exemplarily shows a schematic diagram of an exemplary metadata tree structure on a node apparatus including a de-duplication object and a reference count object according to some exemplary embodiments.

FIG. 8 exemplarily shows a small data object 3000, a large data object 4000 including the parent object 4100 and child objects 4201 and 4202, as well as the de-duplication object 5000 and the reference count object 6000 being pointed to by the indirection object 2000.

Exemplarily, the de-duplication object 5000 includes a parent object 5100 of the de-duplication object 5000 as well as child objects 5201 and 5202 of the de-duplication object 5000, and the reference count object 6000 includes a parent object 6100 of the reference count object 6000 as well as child objects 6201 and 6202 of the reference count object 6000.

The parent objects 4100, 5100 and 6100 respectively point to their respective child objects via object references through the indirection object 2000.

Exemplarily, the small data object 3000 as well as the child objects 4201 and 4202 of the large data object 4000 point to data (in units of blocks by respective block pointers). Similarly, the child objects 5201 and 5202 of the de-duplication object 5000 point to de-duplicated data (in units of blocks by respective block pointers), and the child objects 6201 and 6202 of the reference count object 6000 point to data (in units of blocks by respective block pointers) indicative of reference counts of the de-duplicated data blocks of the de-duplication object 5000, e.g. as reference count lists or bitmap information indicative of reference counts.

Exemplarily, the small data object 3000 and the child object 4201 of the large data object 4000 include additional object references (dotted arrows) through the indirection object 2000 to the de-duplication object 5000 to reference duplicate data shared with other objects after de-duplication thereof.

VIII.5 Holding Object in Exemplary Embodiments

In the above exemplary embodiments, direct metadata nodes of small data objects or of child objects of large data objects included block pointers to regular data in data blocks and optionally object references to the de-duplication object for indirectly pointing to de-duplicated data blocks shared with other objects (duplicate data).

However, in some exemplary alternative embodiments, it is possible to manage all data in a new object, exemplarily referred to as holding object. Then, all direct metadata nodes of small data objects or of child objects of large data objects include no direct block pointers to data in data blocks but only object references to the holding object for indirectly pointing to all data blocks independent of whether these are shared with other objects.

Accordingly, in some exemplary embodiments, the holding object may be managed by a metadata tree structure similar to other data objects, e.g. in that a root metadata node of the holding object is referenced by the indirection object (e.g. a pointer of a direct metadata node of the indirection object points to the root metadata node of the holding object).

The root metadata node of the holding object may include plural pointers (metadata node references) pointing to indirect and/or direct metadata nodes of the holding object, and pointers (block references) of the direct metadata nodes of the holding object may point to data blocks (e.g. similar to the direct metadata nodes of small and child data objects).

In principle the number of tree levels of the metadata tree structure of the holding object may be unlimited, however, in preferred exemplary embodiments the holding object is managed similar to other data objects as either a small data object, if the size of the holding object is smaller than or equal to the distribution size being the unit of data distribution across the node apparatuses of the cluster system, or as a plurality of independent small data objects or even preferably as a large data object, if the size of the holding object is larger than the distribution size.

In the latter case, the holding object includes a parent object and plural child objects as described for regular data objects discussed above. Then, the holding object is distributed across the node apparatuses of the cluster system in that the data of the holding object is divided into plural data segments of the distribution size and each data segment is managed by a respective child object, and the child objects are stored in a distributed manner across the node apparatuses in accordance with above-described exemplary embodiments.

On the other hand, each of the child objects of the holding object may be referenced by a respective object reference of a parent object (or parent object part) of the holding object, and the parent object (or parent object parts) of the holding object is distributed across the node apparatuses of the cluster system, and typically a parent object (or parent object part) of the holding object on one of the node apparatuses points to child objects of the holding object on the same node apparatus (e.g. unless the respective child object has been moved to another node apparatus for load balancing purposes).

As an advantage of the above, while the holding object may manage all data including non-duplicate data and de-duplicated data in the data storage system, the holding object may be distributed across the node apparatuses in a same efficient and reliable manner as other data objects, and the data can be moved for load balancing purposes (and can be re-distributed by node apparatus addition or node apparatus removal) in the same way as other objects. On the other hand, the holding object can be accessed within the whole data storage system, and efficiently allows data management and de-duplication of duplicate data on all node apparatuses in contrast to only on the respective node apparatuses individually and separately.

In general, according to exemplary embodiments, the direct metadata nodes of the holding object (or of child objects thereof) include block pointers pointing to regular (non-duplicate) data as wells as block pointers pointing to data blocks storing user data that has been de-duplicated (i.e. which may relate to multiple other data objects or at least different data blocks of the same or different data objects).

The direct metadata nodes of data objects (such as small data objects or child objects of large data objects) may include block pointers pointing to data blocks storing user data or may include object references to the holding object in connection with regular data blocks and de-duplicated data blocks.

Figure 9:
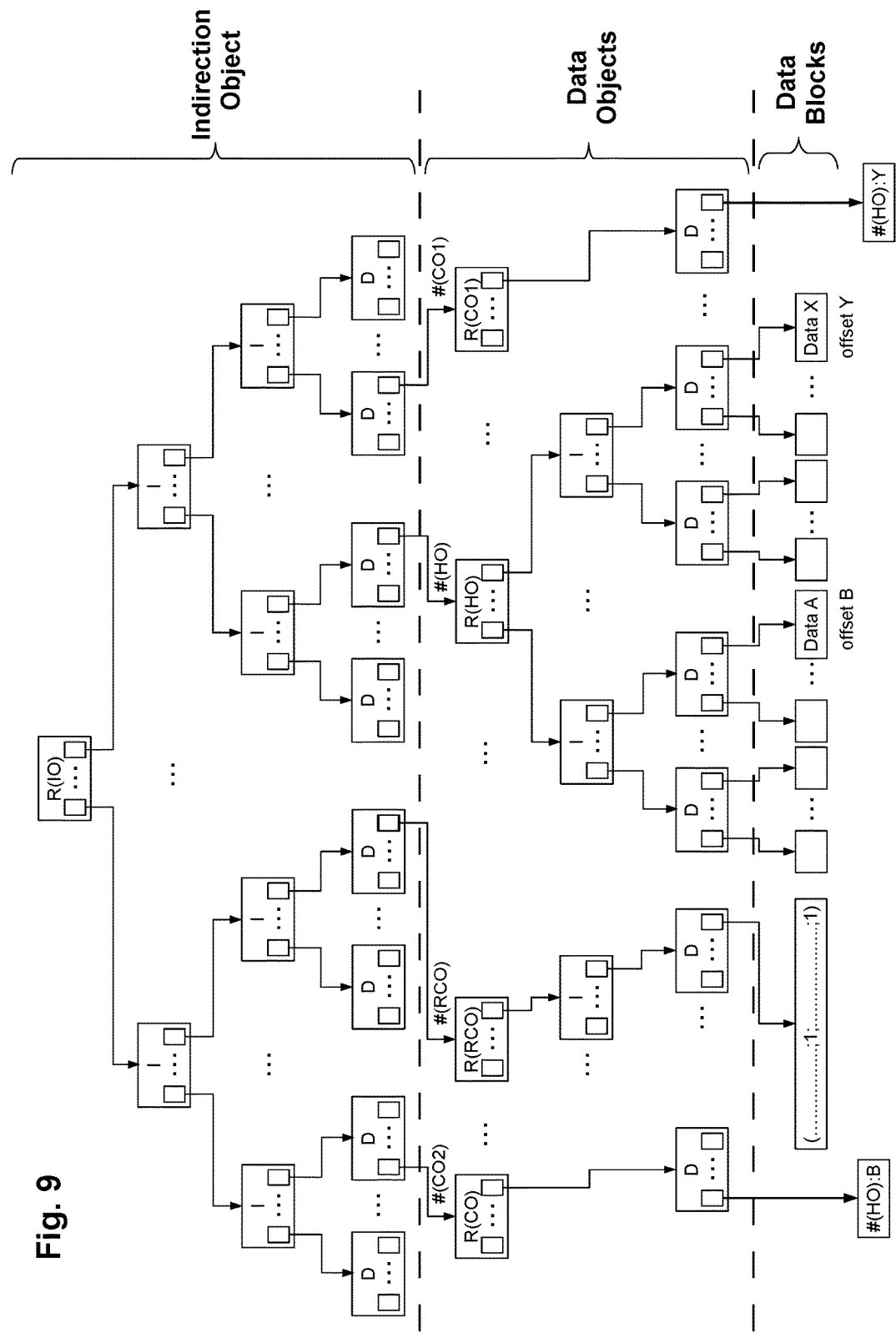
FIG. 9 exemplarily shows a schematic diagram of an exemplary metadata tree structure on a node apparatus exemplarily illustrating object-based data holding according to some exemplary embodiments.

For example, FIG. 9 exemplarily shows a schematic diagram of an exemplary metadata tree structure on a node apparatus exemplarily illustrating object-based data holding according to some exemplary embodiments.

In FIG. 9, e.g. based upon the general metadata tree structure of FIG. 6, a metadata structure exemplarily includes the metadata tree structure of the indirection object.

Exemplarily, the direct metadata nodes of the indirection objects include pointers to root metadata nodes of two different child objects CO1 and CO2 (which may be child objects of the same large data object of different data objects, and/or which may be stored to storage devices on the same or different node apparatuses of the cluster system).

Exemplarily, the object numbers (object identifiers) of the child objects are given as #(CO1) and #(CO2), and may be allocated as discussed above (e.g. based on a deterministic algorithm). The object numbers (object identifiers) of the child objects may additionally refer to offsets of the respective root metadata nodes of the child objects in the indirection object.

FIG. 9 further exemplarily shows the metadata structure of the holding object including a root metadata node R(HO) of the holding object. Exemplarily, the object number (object identifier) of the holding object is given as #(HO), and may be allocated as discussed above (e.g. based on a deterministic algorithm). The object number (object identifier) of the holding object may additionally refer to an offset of the respective root metadata node of the holding object (or of a parent object thereof) in the indirection object.

Only exemplarily, the holding object is a data object having three tree levels in FIG. 9. In preferred embodiments, the holding object may be separated into a parent object (of unlimited tree level number) and plural child objects (of a pre-determined tree level number, depending on the distribution size). Then, child objects of the holding object would have the same tree level number as child objects of regular large data objects or as small data objects, in some exemplary embodiments.

Exemplary, at an offset Y of the holding object, a block pointer of a direct metadata node of the holding object points to a data block storing the data referred to as DATA X. At the same time, since this data is associated with a data block of the child object CO1, a direct metadata node of the child object CO1 has an object reference pointing to the offset Y in the object identified by the object identifier (object number) #(HO), i.e. in the holding object. At an offset B of the holding object, a block pointer of a direct metadata node of the holding object points to a data block storing the data referred to as DATA A. At the same time, since this data is associated with a data block of the child object CO2, a direct metadata node of the child object CO2 has an object reference pointing to the offset B in the object identified by the object identifier (object number) #(HO), i.e. in the holding object.

Accordingly, by such object references, all data objects can indirectly point to data which is managed by the holding object, including regular (non-duplicated) data as well as de-duplicated data, the latter analogously to the above de-duplication object.

Here, it may also be desired to keep track of a reference count to data blocks of the holding object, e.g. in order to know how many objects share a certain data block and when a data block used by the holding object can be freed again and a block pointer of a direct metadata node of the holding object could be re-used.

For example, each direct metadata node of the holding object could store the respective associated reference count of the data blocks associated with the respective direct metadata node, and/or each block pointer of the direct metadata nodes of the holding object could store the respective associated reference count of the data block associated with the respective block pointer.

However, in some exemplary embodiments, there can be provided another data object, referred to as reference count object storing data indicative of a reference count of data blocks used (referenced by) the holding object, similar to the reference count object described above. For example, the data of the reference count object could be a reference count list storing entries, each entry indicating a reference count of a data block used by the holding object, or the data of the reference count object could be a reference count bit map indicating references counts of the data block used by the holding object (e.g. similar to a free space bitmap used for allocation of data blocks).

The reference count object can be managed similar as the other data objects in the data system, in particular in connection with data distribution of and I/O access to data objects, as already discussed above.

Referring again to FIG. 9, it also exemplarily shows that a direct metadata node of the indirection object points to a root metadata node R(RCO) of the reference count object, referenced by the object identifier/object number #(RCO).

In a data block pointed to by a pointer of a direct metadata node of the reference count object includes a list of reference counts including the reference count "1" for the data block at offset B in the holding object storing the data of DATA A as referenced (exemplarily only) by the child object CO2 and further including the reference count "1" for the data block at offset Y in the holding object storing the data of DATA X as referenced (exemplarily only) by the child object CO1.

Of course, if another data block of the same data (duplicate data) is identified, the respective data object can be modified as well to include an object reference to the holding object at the respective offset thereof, and the corresponding reference count in the reference count object can be incremented.

On the hand, if the data is deleted in one of the data objects including an object reference to the holding object at the respective offset thereof the corresponding reference count in the reference count object can be decremented.

Figure 10:
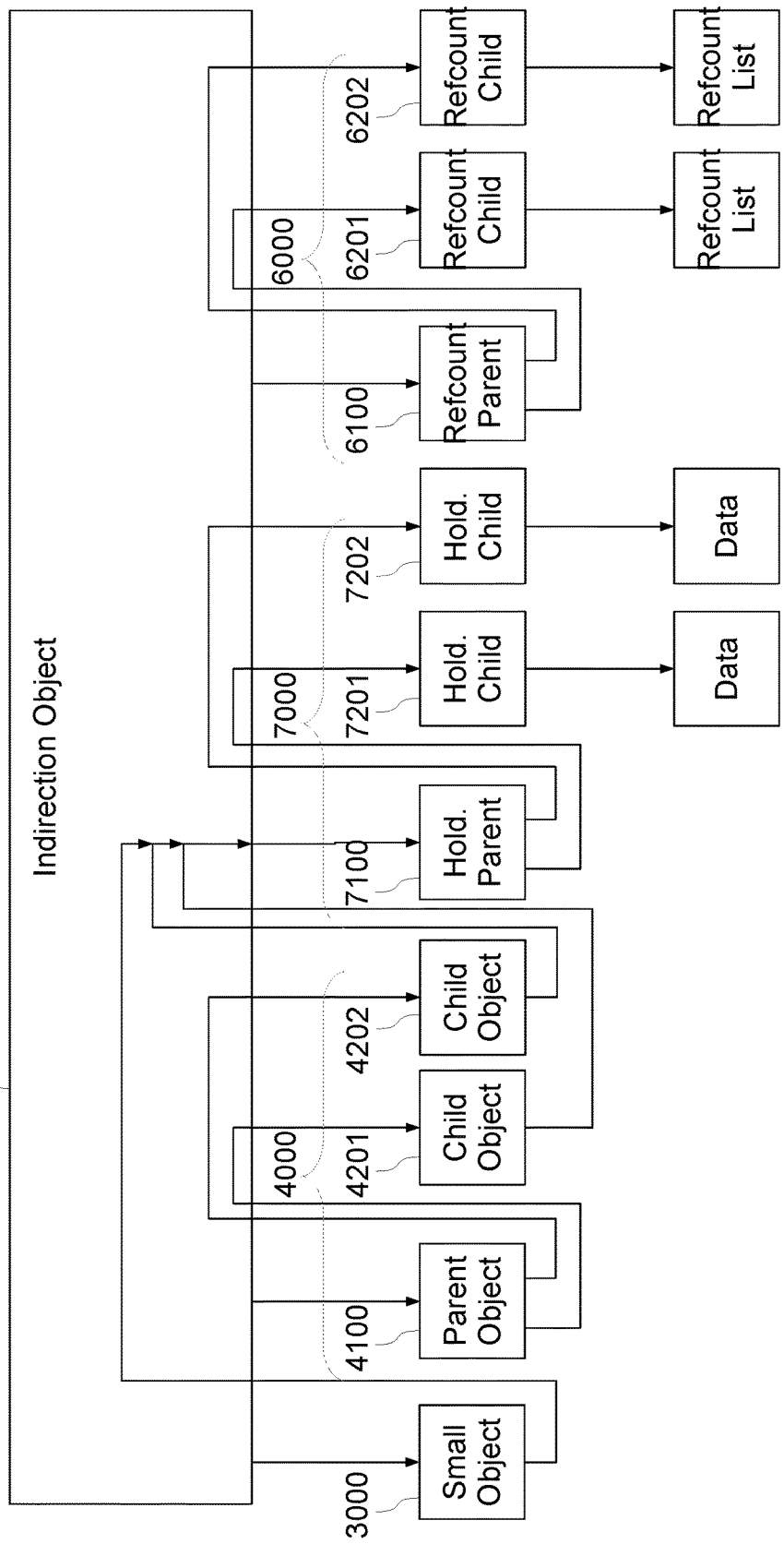
FIG. 10 exemplarily shows a schematic diagram of an exemplary metadata tree structure on a node apparatus including a holding object and a reference count object according to some exemplary embodiments.

FIG. 10 exemplarily shows a schematic diagram of an exemplary metadata tree structure on a node apparatus including a holding object and a reference count object according to some exemplary embodiments.

FIG. 10 exemplarily shows a small data object 3000, a large data object 4000 including the parent object 4100 and child objects 4201 and 4202, as well as the holding object 7000 and the reference count object 6000 being pointed to by the indirection object 2000.

Exemplarily, the holding object 7000 includes a parent object 7100 of the holding object 7000 as well as child objects 7201 and 7202 of the holding object 7000, and the reference count object 6000 includes a parent object 6100 of the reference count object 6000 as well as child objects 6201 and 6202 of the reference count object 6000.

The parent objects 4100, 7100 and 6100 respectively point to their respective child objects via object references through the indirection object 2000.

Exemplarily, the small data object 3000 as well as the child objects 4201 and 4202 of the large data object 4000 indirectly point to data (in units of blocks) by including object references through the indirection object 2000 to the holding object 7000 to reference all data including regular data as well as duplicate data shared with other objects after de-duplication thereof The child objects 7201 and 7202 of the holding object 7000 point to data (in units of blocks by respective block pointers), and the child objects 6201 and 6202 of the reference count object 6000 point to data (in units of blocks by respective block pointers) indicative of reference counts of the data blocks of the holding object 7000, e.g. as reference count lists or bitmap information indicative of reference counts.

Accordingly, in the example, none of the small data objects or child objects of large data objects directly point to data blocks by block pointers but only include object references to the holding object, and the holding object holds and manages all data referenced by all small data objects or child objects of large data objects in the data storage system.

The relationship between the reference count object and the holding object may be similar to a relationship between the reference count object and the de-duplication object in the above description of exemplary embodiments.

An advantage of the holding object is that de-duplication of a first duplicate block can be performed more efficiently than in the case of a de-duplication object, since upon detecting the first duplicate data block (second write of duplicate date), the data block does not need to be written and only the pointer of its object needs to be updated to point to the associated data block in the holding object, and it (and/or rather the originally written data block) does not have to be moved into the de-duplication object.

This will be described in more detail below for some exemplary embodiments. However, upon writing the second duplicate (third write of the same duplicate data), the processing of the holding object and the de-duplication object may be very similar or identical in exemplary embodiments.

Regarding compression of the de-duplication object (or holding object) may be executed in a similar way as discussed for a general data object below. However, the data thereof is compressed the number of blocks storing the compressed de-duplication object (or compressed holding object) will be smaller than the original number of blocks of the uncompressed de-duplication object (or uncompressed holding object). However, the blocks of the uncompressed de-duplication object (or uncompressed holding object) will be the de-duplicated blocks that are referenced by two or more objects (i.e. having reference count of two or more), or the blocks referenced by one or more objects in case of the holding objects (i.e. having reference count of one or more).

Accordingly, if the reference count would be stored with the blocks, such reference counts could not be easily retrieved from the compressed de-duplication object (or holding object). Also, if a bitmap object (block allocation object) would efficiently store reference counts for blocks, this would suffer from the mismatch of M blocks of the compressed de-duplication object (or compressed holding object) being actually allocated thereto (and therefore being the M blocks indicated in the bitmap object/block allocation object), and the N (with N>M) blocks managed by the uncompressed de-duplication object (or uncompressed holding object).

Based on the above, it is another benefit that the above reference count object was introduced, since this allows to manage reference count metadata in another object parallel to the de-duplication object (or holding object) which conveniently allows to accurately store reference counts for the N blocks of the uncompressed de-duplication object (or uncompressed holding object) as needed, while at the same time efficiently and reliably allowing for compression of the de-duplication object (or holding object) to improve compression efficiency in the system.

IX. Data Compression

In the following, exemplary aspects of data compression for data objects are discussed. Each data object may have a metadata structure according to any of the above aspects. Such object may be a large object, a small object, a child object of a large object, a system object, a de-duplication object, a holding object, or any other object which stores data in blocks and has a metadata structure in which each direct metadata node includes at least one block pointer pointing to a block.

Herein, data objects may relate to file systems, e.g. in the sense that each file system object (e.g. each file and/or directory, but also system data) may be stored as an individual data object. Also, a data object may relate to block storage, e.g. in that each data object may relate to a logical unit (e.g. LUN) or logical volume. Furthermore, data objects may relate to any type of object-related storage.

Many known compression techniques may be utilized, however, the present disclosure typically relates to lossless data compression. The exemplary embodiments may be embodied by using any potential data compression technique based on a compression algorithm (compression processing) which takes a data input portion (preferably of arbitrary size) and outputs a data output portion which is a compressed version of the data input portion, e.g., in the sense that the size of the data output portion is smaller (or at least "smaller or equal to") than the size of the data input portion, and by a corresponding decompression algorithm (decompression processing) the original data input portion can be retrieved in a loss-less way from the data output portion.

Accordingly, while lossy data compression may typically not be suitable for the exemplary embodiments, because compressed data may need to be returned to clients in uncompressed format in response to read requests or the like, the present disclosure is not particularly limited to a specific compression algorithm or group of specific compression algorithms, as long as an underlying compression algorithm is loss-less. Loss-less compression is a class of data compression algorithms that allows the original data to be perfectly reconstructed from the compressed data. By contrast, lossy compression permits reconstruction only of an approximation of the original data.

For example, the present disclosure allows for exemplary embodiments in which data compression is based on compression algorithms of the families of LZ77 and LZ78 which are two lossless data compression algorithms, such as e.g. LZ4 of the LZ77 family. Other lossless compression algorithms may be used or utilized as well.

It is to be further noted that any of the below compression techniques may be provided such as that an administrator or system administrating user may enable or disable compression for certain data objects, groups of data objects, or all data objects managed by an apparatus or cluster, e.g. by changing settings via a management computer.

IX.1 Data Objects—Compression Units/Compression Regions

Figure 11:
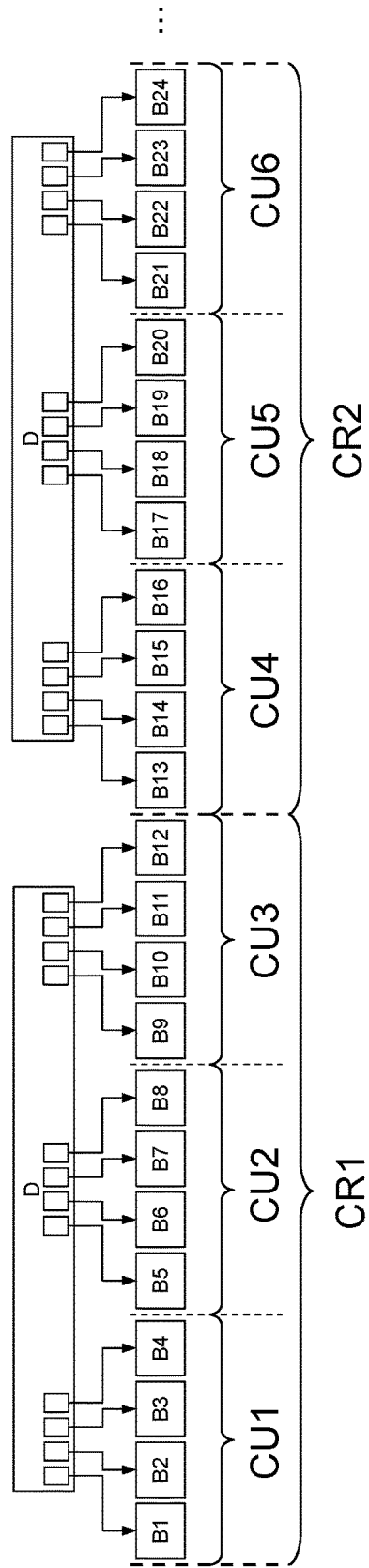
FIG. 11 exemplarily shows a schematic diagram of an exemplary direct node level of a metadata tree structure of a data object to be compressed according to some exemplary embodiments.

FIG. 11 exemplarily shows a schematic diagram of an exemplary direct node level of a metadata tree structure of a data object to be compressed according to some exemplary embodiments.

Exemplarily, the data object of FIG. 11 has at least the data that is written to blocks B1 to B24, and, exemplarily, each direct metadata node of the data object has plural (exemplarily four) block pointers, and each block pointer exemplarily references (points to) a respective data block among the blocks B1 to B24 of the data object.

In FIG. 11, exemplarily, it is assumed that each direct metadata node has four block pointers, but this is not meant to limit the present disclosure, and in the exemplary embodiments the number of block pointers per direct metadata node may be also less than four or, more typically, may be more than four. In general, each direct metadata node has plural block pointers, each block pointer pointing to (referencing) a respective data block among the plural blocks of the data object.

Exemplarily, for data compression purposes, the data object (more specifically the data of the data object) is divided (grouped) into plural "compression units". For purposes of compression, in exemplary embodiments, data of different compression units is preferably compressed independently from each other. For example, each compression unit of data is preferably compressed independently from the other compression units, such that each compressed compression unit can preferably be decompressed (uncompressed) independent of the other compressed compression units, e.g. if needed to service a read request. In this sense, a "compression unit" is, exemplarily, the smallest data unit in terms of data on which the compression algorithm is applied.

For example, the data object of FIG. 11 is exemplarily divided so as to include the compression units CU1 to CU6. In general, each data object may be grouped/divided into plural compression units. A "compression unit" in a most general sense may refer to a region of contiguous data of the corresponding data object.

The compression units may preferably be disjoint, e.g. preferably such that each portion of data of the data object is included in a compression unit. While the compression units in the exemplary embodiments are preferably disjoint so as to not be overlapping, the compression units may have small overlaps in other exemplary embodiments, however, such overlaps would make decompression less efficient, because some data portions would be associated with two (adjacent) compression units.

Returning to FIG. 11, exemplarily, the size of the compression units is of a same compression unit size for the multiple compression units, each of which, exemplarily, encompasses the data of four data blocks. Accordingly, in FIG. 11, the size of the compression units is, exemplarily, four times of the block size. Accordingly, e.g., if the block size is 4 kB, then the size of the compression unit in FIG. 11 exemplarily is 16 kB for the compression units CU1 to CU6.

It is to be noted that the size of the compression unit (compression unit size) is larger than the block size in the present exemplary embodiment. In other exemplary embodiments, the compression unit size may also be equal to the block size or, if it is larger than the block size, the compression unit size may preferably be an integer (n>1) multiple of the block size (such as in FIG. 11 with an integer multiple of n=4), such that the compression unit size is n times the block size. However, the compression size may also be another size, preferably larger than the block size, or also possibly smaller than the block size (e.g. if the block size is taken to be rather large).

In general, it may be assumed that a larger compression unit size may lead to a better compression efficiency (compression ratio), but a smaller compression unit size may be more beneficial for handling of random read operations.

Furthermore, most compression algorithms have a quite good compression ratio already at smaller compression units, so the compression unit size may typically be selected as smaller or equal to 512 kB, or more preferably as smaller or equal to 128 kB or even smaller or equal to 64 kB. Furthermore, compression unit size may be as small as 16 kB or even 4 kB (which may be the block size, in exemplary embodiments).

As previously mentioned, in FIG. 11, the block size may exemplarily be 4 kB, and exemplarily a compression unit includes four blocks of data of the uncompressed data of the data object, so the compression unit size may be 16 kB in FIG. 11, exemplarily.

Furthermore, the data object may be divided (grouped) into plural compression regions, wherein each "compression region" exemplarily includes plural compression units.

It is to be noted that the use of compression regions may enable a more efficient use of storage space after compression, but the present disclosure is not limited to the use of compression regions, and other exemplary embodiments make use of compression units without compression regions. Such exemplary embodiments may be encompassed by the below description by assuming that each compression region corresponds to a respective compression unit (e.g. one single compression unit per compression region).

In other words, having no compression regions may be regarded as being equivalent to having compression regions such that each compression region includes and corresponds to only a single compression unit. In that sense one may note that the present disclosure includes exemplary embodiments in which the data object may be divided (grouped) into plural compression regions, wherein each "compression region" exemplarily includes and corresponds to one compression unit, and generally the compression region may include one or more compression units.

For example, in FIG. 11, the data object (exemplarily including blocks B1 to B24) is exemplarily divided into the plural compression units CU1 to CU6, and each compression unit exemplarily includes four blocks, and the compression regions CR1 and CR2 are exemplarily made such that the first compression region CR1 exemplarily includes the compression units CU1 to CU3 and the second compression region CR2 exemplarily includes the compression units CU4 to CU6.

While each compression unit will exemplarily be compressed independently in exemplary embodiments, the compressed data of the (one or more) compression units of a certain compression unit will exemplarily be stored contiguously in blocks of the compressed data object, as will be explained in more detail in the following.

Accordingly, for the data object of FIG. 11, as discussed below, the compressed data of the first compression region CR1 (i.e. of compression units C1 to C3) will be stored in a common unit of a compressed region, and the compressed data of the second compression region CR2 (i.e. of compression units C4 to C6) will be stored in another common unit of another compressed region.

As previously mentioned, the present disclosure is however not limited to the usage of compression regions, and the other exemplary embodiments may only make use of compression units without compression regions. However, with compression regions (each having plural compression units), a more efficient compression having a higher overall compression ratio of the compressed data object may advantageously be achieved.

In general, for compression purposes, data of a data object is divided into plural compression units, so that each data object (at least data objects being larger than the compression unit size) include plural compression units.

Furthermore, (optionally) in preferred exemplary embodiments, data of a data object is divided into plural compression regions, so that each data object (at least data objects being larger than the compression region size) include plural compression regions, each compression region including (one or) plural compression units.

A "compression unit" is a unit of data that is compressed as a single data portion, independently of compression of other compression units. Accordingly, a "compressed unit" being the compressed data of a corresponding compression unit can be decompressed independently of other compressed units. A "compression region" relates to a group of one or more "compression units" for which their "compressed units" are stored together (e.g. in a contiguous way or contiguous with optional padding units in between). A "compressed region" may relate to the one or more "compressed units" that are stored together, e.g. as a concatenation of compressed units (compressed compression units) or as a concatenation of compressed units (compressed compression units) and optional padding units inbetween.

IX.2 Exemplary Aspect of Data Compression
IX.2.1 Compressed Data Object (Exemplarily without Unit Padding)

Figure 12A:
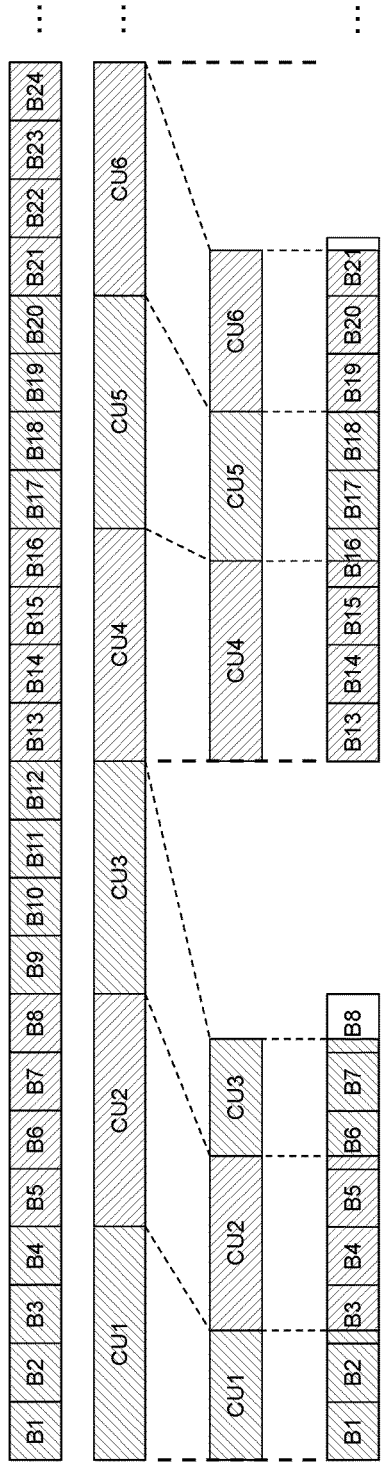
FIG. 12A exemplarily shows a schematic diagram of data compressed compression units of the object of FIG. 11 according to some exemplary embodiments, and FIG. 12B exemplarily shows a schematic diagram of the exemplary direct node level of the metadata tree structure of the corresponding compressed data object.
Figure 12B:
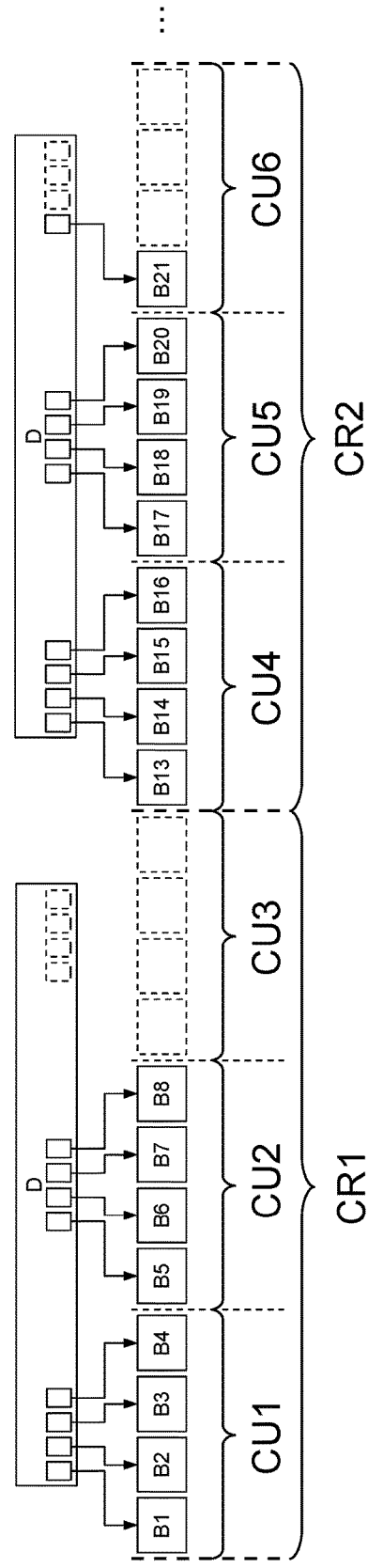

FIG. 12A exemplarily shows a schematic diagram of data compressed compression units of the object of FIG. 11 according to some exemplary embodiments. FIG. 12B exemplarily shows a schematic diagram of the exemplary direct node level of the metadata tree structure of the corresponding compressed data object (i.e. after compression and having unallocated block pointers since the number of actual blocks required to store the data of the compressed object is reduced compared to the uncompressed data object).

Exemplarily, FIG. 12A illustrates the data of the data objects being stored contiguously in the data blocks B1 to B24.

Assuming that the block size exemplarily is 4 kB, the data stored in blocks B1 to B24 would span 96 kB of data. If the data object is larger than that size, additional data thereof would be stored in further blocks (e.g. starting with a block B25, not shown).

Furthermore, FIG. 12A exemplarily shows the data of the compression units CU1 to CU6. Since exemplarily each compression unit includes data of four blocks, the compression unit size exemplarily is 16 kB (4 times 4 kB).

Then, each of the compression units CU1 to CU6 is preferably compressed independently from each other. The compressed data of each of the compression units CU1 to CU6 will typically be smaller than the compression unit size before compression. However, since the compression efficiency may be different for different compression units (depending on the actual data thereof), the size of the compressed data of the respective compression units (may be referred to as "compressed unit") may be different.

Exemplarily, in FIG. 12A, it is assumed the uncompressed compression unit CU1 compresses from originally 16 kB to a compressed size of 9 kB, the uncompressed compression unit CU2 compresses from originally 16 kB to a compressed size of 12 kB, and the uncompressed compression unit CU3 compresses from originally 16 kB to a compressed size of 8 kB.

Exemplarily, the compression region CR1 includes the compression units CU1 to CU3, exemplarily, and the compression region CR1 therefore exemplarily compresses from originally 48 kB (3 times 16 kB) to 29 kB (9 kB+12 kB+8 kB=29 kB).

Accordingly, as exemplarily shown in FIG. 12A, after compression, the data of the compression region CR1 (of compression units CU1 to CU3) can be stored in only eight blocks of block size 4 kB instead of 12 blocks as in the uncompressed state, since the total size of eight blocks is 32 kB and the compressed size of the compressed data of the compression region CR1 (of compression units CU1 to CU3) is 29 kB as discussed above.

Exemplarily, in FIG. 12A, it is assumed the uncompressed compression unit CU4 compresses from originally 16 kB to a compressed size of 14 kB, the uncompressed compression unit CU5 compresses from originally 16 kB to a compressed size of 10 kB, and the uncompressed compression unit CU6 compresses from originally 16 kB to a compressed size of 11 kB. The compression region CR2 includes the compression units CU4 to CU6, exemplarily, and the compression region CR2 compresses from originally 48 kB (3 times 16 kB) to 35 kB (14 kB+10 kB+11 kB=35 kB).

Accordingly, as exemplarily shown in FIG. 12A, after compression the data of the compression region CR2 (of compression units CU4 to CU6) can be stored in only nine blocks of block size 4 kB instead of 12 blocks as in the uncompressed state, since the total size of nine blocks is 36 kB and the compressed size of the compressed data of the compression region CR2 (of compression units CU4 to CU6) is 35 kB as discussed above.

Accordingly, instead of a number of 24 blocks of size 96 kB (24 times 4 kB) for the data of the data object in the compression regions CR1 and CR2 (compression units CU1 to CU6), the compressed size exemplarily reduces to 29 kB+35 kB=64 kB by the compression processing.

In general, exemplarily, each compression unit may be compressed independently, and the resulting compressed units (compressed data of the compression units) may be stored contiguously to new blocks (or to the same blocks by overwriting), preferably independently for each compression region, exemplarily such that compressed compression units of each respective compression region are stored contiguously to a plurality of blocks (with or without a padding unit therebetween).

It is to be noted that in the case that the compression of compression units of a compression region would result in a compressed size associated with a compression region (size of a compressed region) which is smaller than its corresponding compression region only by less than one block size (e.g. if the compressed region size of compression regions CR1 or CR2 in FIG. 12A would be larger than 44 kB), then storing the data in the compressed format would not save any block space, and in such cases the data of the respective compression region would preferably be kept stored in the uncompressed state to keep the best I/O access handling efficiency (i.e. so that I/O requests can be handled without decompression processing).

In the above example of FIG. 12A, exemplarily, the compressed data of the compression units CU1 to CU3 (compression region CR1) can be stored to only eight blocks, e.g. B1 to B8, instead of the previous blocks B1 to B12 (twelve blocks) and the compressed data of the compression units CU4 to CU6 (compression region CR2) can be stored to only nine blocks, e.g. B13 to B21, instead of the previous blocks B13 to B24 (twelve blocks), so the compressed data of the compressed data object (corresponding to compression regions CR1 and CR2) can be stored to only 17 blocks, in total, thereby exemplarily saving seven blocks that can be used for new data or other data objects, and may remain unallocated for the compressed object.

Accordingly, in FIG. 12B, exemplarily the compressed object is shown with some block pointers remaining unallocated, exemplarily with the block pointers of previously allocated blocks B9 to B12 and B22 to B24 remaining unallocated (unallocated blocks being illustrated by dashed lines in FIG. 12B).

In the above, it is to be noted that the compression regions exemplarily do not cross direct metadata node boundaries. Accordingly, blocks within a compression region are exemplarily references by the same direct metadata node.

This has the advantage that the I/O handling for compressed data objects may be performed on a basis of the single direct metadata node loaded based on a requested offset to the uncompressed object, and other direct metadata nodes do not need to be loaded.

On the other hand, while FIG. 11 exemplarily shows one direct metadata node per compression region, this is not meant to limit the present disclosure, and multiple compression regions per direct metadata node can be provided in other exemplary embodiments.

Furthermore, in the above, it is exemplarily assumed that the compression regions include plural compression units of similar size (prior to compression), but in other exemplary embodiments the compression unit size of different compression units may be different.

Specifically, in other exemplary the compression unit size may be different for different compression regions and/or the compression unit size may be different within a compression region.

Also, the number of compression units per compression region may be different for different compression regions.

In general, the size of the compression unit may be unlimited, and is not limited to any specific value, but the practical maximum compression unit size may be set, e.g. based on a compression algorithm, or based on arbitrary limitations to a preferred maximum compressed data length (which is bound by the maximum compression unit size).

For example, in below examples, a compressed length of a compression unit after compression will exemplarily be indicated in block pointers of direct metadata nodes, and to avoid large block pointers above a predetermined number of bits (or bytes), the size of a compression unit can be limited by a maximum compression unit size value, which may be preset or may be tunable by an administrator who may set a maximum compression unit size by using a management computer or administrator console.

Also, the compression unit size and/or compression region size may be set and kept fixed, or it may be tunable in the sense that an administrator may set values of the compression unit size and/or compression region size based on preferences, or the compression unit size and/or compression region size may be changed dynamically and/or automatically, e.g. based on an observed host I/O size, based on storage device performance of underlying storage devices, and I/O frequency observed for data objects.

IX.2.2 Modified Block Pointers for I/O Request Handling

In order to service I/O requests to the data object, in exemplary embodiments there are proposed adapted/modified block pointers of the direct metadata nodes of the data object as will be discussed in the following.

At first, with unmodified block pointers, in the uncompressed data object of FIG. 11, the block pointers may have been associated with logical and/or data offsets in the data object, for example, according to Table 1:

TABLE 1

| Logical Offset | Data Offset | Block Pointer |
|---|---|---|
| 0 | 0 kB | B1 |
| 1 | 4 kB | B2 |
| 2 | 8 kB | B3 |
| 3 | 12 kB | B4 |
| 4 | 16 kB | B5 |
| 5 | 20 kB | B6 |
| 6 | 24 kB | B7 |
| 7 | 28 kB | B8 |
| 8 | 32 kB | B9 |
| 9 | 36 kB | B10 |
| 10 | 40 kB | B11 |
| 11 | 44 kB | B12 |
| 12 | 48 kB | B13 |
| 13 | 52 kB | B14 |
| 14 | 56 kB | B15 |
| 15 | 60 kB | B16 |
| 16 | 64 kB | B17 |
| 17 | 68 kB | B18 |
| 18 | 72 kB | B19 |
| 19 | 76 kB | B20 |
| 20 | 80 kB | B21 |
| 21 | 84 kB | B22 |
| 22 | 88 kB | B23 |
| 23 | 92 kB | B24 |

Accordingly, if a read request is received for a logical offset 9 in the data object (e.g. a data offset of equal or larger than 36 kB but smaller than 40 kB, e.g. a read request to read 2 kB at a data offset of 37 kB), the requested offset will be used to traverse (walk) the metadata tree of the data object down to the direct node level and the block pointer (of a respective direct metadata node) corresponding to the respective offset will exemplarily point to the block B10 storing the data of offsets of 36 kB up to 40 kB, in the uncompressed data object.

Using the block pointer, the uncompressed data of block B10 may be read to return the requested data to the client for servicing the read request.

On the other hand, in the compressed data object of FIG. 12B, the block pointers may be adapted to include more "pointer metadata", by using modified block pointers including, in addition to an optional pointer to a data block, a pointer type and a compressed length (compressed "compression unit" length), e.g. according to Table 2:

TABLE 2

| Logical Offset | Data Offset | Pointer Type | Compr. Length | Block Pointer |
|---|---|---|---|---|
| 0 | 0 kB | CRS | 9 kB | B1 |
| 1 | 4 kB | CUM | | B2 |
| 2 | 8 kB | CUM | | B3 |
| 3 | 12 kB | CUE | | B4 |
| 4 | 16 kB | CUS | 12 kB | B5 |
| 5 | 20 kB | CUM | | B6 |
| 6 | 24 kB | CUM | | B7 |
| 7 | 28 kB | CUE | | B8 |
| 8 | 32 kB | CUS | 8 kB | unall. |
| 9 | 36 kB | CUM | | unall. |
| 10 | 40 kB | CUM | | unall. |
| 11 | 44 kB | CRE | | unall. |
| 12 | 48 kB | CRS | 14 kB | B13 |
| 13 | 52 kB | CUM | | B14 |
| 14 | 56 kB | CUM | | B15 |
| 15 | 60 kB | CUE | | B16 |
| 16 | 64 kB | CUS | 10 kB | B17 |
| 17 | 68 kB | CUM | | B18 |
| 18 | 72 kB | CUM | | B19 |
| 19 | 76 kB | CUE | | B20 |
| 20 | 80 kB | CUS | 11 kB | B21 |
| 21 | 84 kB | CUM | | unall. |
| 22 | 88 kB | CUM | | unall. |
| 23 | 92 kB | CRE | | unall. |

In the above, the block pointers associated with logical offsets 8 to 11 and 21 to 23 (previously associated with the block pointers to blocks B9 to B12 and B22 to B24 of the uncompressed object) are now exemplarily unallocated, since such blocks are not used for the compressed data object, as e.g. illustrated in FIG. 12B.

However, since the offsets of the uncompressed data object may still efficiently and advantageously be used for I/O request processing based on the uncompressed data (e.g. because the clients cannot know about the compression or compression efficiency and efficiently address offsets in the uncompressed data object), the metadata structure of the respective data object (e.g. large data object, small data object, child data object) may be kept unchanged in preferred exemplary embodiments, with the exception of the updating of the respective block pointers in the affected direct metadata nodes, e.g. based on the block pointers according to Table 2 above.

Accordingly, (modified) block pointers of direct metadata nodes of the compressed data object may additionally include a metadata area indicative of a block pointer type and a compressed length of a respective corresponding compressed data unit (i.e. a length of the compressed data after compression of the respective compression unit).

Exemplarily, the block pointer types in Table 2 exemplarily include:
a first block pointer type "CUS" indicating a start of a compression unit (Compression Unit Start),
a second block pointer type "CUM" indicating a middle of a compression unit (Compression Unit Middle), and
a third block pointer type "CUE" indicating an end of a compression unit (Compression Unit End).

Furthermore, the block pointer types in Table 2 exemplarily (optionally) include:
a fourth block pointer type "CRS" indicating a start of a compression region (Compression Region Start), which also indicates a start of a compression unit (i.e. the start of a compression region is also the start of a first compression unit of the respective compression region), and
a fifth block pointer type "CRE" indicating an end of a compression region (Compression Region End), which also indicates an end of a compression unit (i.e. the end of a compression region is also the end of a last compression unit of the respective compression region).

In addition, the block pointers associated with a start of a compression unit (i.e. exemplarily the block pointers of the type CRS or CUS) may store a compressed length of the compressed data of the respective associated compression unit. While the block pointers associated with a middle or an end of a compression unit (i.e. exemplarily the block pointers of the type CUM, CUE or CRE) may not store the compressed length of the compressed data of the respective associated compression unit as e.g. in Table 2 above, alternatively, the block pointers associated with a middle or an end of a compression unit (i.e. exemplarily the block pointers of the type CUM, CUE or CRE) can also store the respective compressed length of the corresponding compression unit in other exemplary embodiments.

Another (optional) block pointer type may be a type "CUL" (Compression Unit Lone) which may be a single block including both the start and end of the same compression unit (e.g. if the compression unit size is equal or smaller than the block size).

Yet another (optional) block pointer type may be a type "DED" (DE-Duplicated block) which may indicate that the data of the corresponding block is de-duplicated and is not stored with the particular data object but is stored in a de-duplication object, e.g. as described in the above aspects. It is to be noted that the above-mentioned de-duplication object, as well as an optional holding object, may be compressed in a similar way as described herein, e.g. by dividing the de-duplication object (or holding object) into compression regions and/or compression units in a similar way as described for exemplary embodiments herein for a general data object. For the block pointers having the type "DED", the block pointer may point to (reference) a respective block of the de-duplication object (or holding object).

Yet another (optional) block pointer type may be a type "ZFD" (Zero-FilleD block) which may indicate that the data of the corresponding block contains only zeros. Then, no actual block needs to be allocated for the respective block, and when a read request is directed to the block or data thereof, the I/O processing may return only zeros based on observing the block pointer type "ZFD".

By the above aspects of adapted/modified block pointers storing a block pointer type and a compressed length of the respective associated compression unit (e.g. in the block pointers associated with a start of a compression unit), a reconstructable mapping between the offset of data in the uncompressed data object and the position of the compressed data of the respective compression unit is provided, e.g. for handling I/O requests issued on the basis of the offset of data in the uncompressed data object and based on using the metadata tree of the uncompressed data object.

IX.2.3 Exemplary Read Request Handling

The present read request example is based on the compressed object of FIG. 12B and the modified block pointers according to the example of Table 2 above.

For example, if a read request is received for a logical offset 9 (e.g. a data offset of equal or larger than 36 kB but smaller than 40 kB) in the uncompressed data object, the requested offset can be used to traverse (walk) the metadata tree of the data object down to the direct node level, and the block pointer (of a respective direct metadata node) corresponding to the respective requested offset can exemplarily be observed.

In Table 2, the block pointer corresponding to the logical offset 9 in the uncompressed data object (e.g. a data offset of equal or larger than 36 kB but smaller than 40 kB) is exemplarily indicated to be a block pointer type CUM (i.e. relating to a middle of a compression unit).

By reading the respective direct metadata node(s) for observing the block pointers in the vicinity of the respective requested offset 9 (specifically towards preceding offsets or smaller offsets), the I/O processing may determine the relative position of the respective requested offset 9 in the compressed data object by observing (searching) the block pointers indicating the start of the corresponding compression region and the start (and ends) of preceding compression units.

For example, by reading the respective direct metadata node(s) for observing the block pointers in the vicinity of the respective requested offset 9 (specifically towards preceding offsets), the I/O processing may determine that the requested offset 9 is included in the first compression region CR1, or, more specifically, it may determine that the respective compression region of the requested offset 9 is included in the compression region that starts with offset 0, in the uncompressed object, having the pointer type "CRS" indicating the compression region start of the respective corresponding compression region.

In other words, the corresponding compression region of the requested offset can be determined by observing the block pointers and identifying the block pointer being the closest preceding block pointer indicating a start of a compression region by its respective block pointer type "CRS".

Furthermore, by reading the respective direct metadata node(s) for observing the block pointers in the vicinity of the respective requested offset 9 (specifically towards smaller/preceding offsets), the I/O processing may determine that the respective requested offset 9 is included in the third compression unit CU3 of the respective compression region CR1, e.g. due to the two preceding block pointer types CUE (indicating an end of a preceding compression unit) in the block pointers of logical offsets 3 and 7.

In other words, the corresponding compression unit of the requested offset can be determined by observing the block pointers and identifying the number of preceding block pointers having block pointer types CUE indicating an end of a compression region, following the closest preceding block pointer indicating a start of a compression region.

Furthermore, by reading the respective direct metadata node(s) for observing the block pointers in the vicinity of the respective requested offset 9 (specifically towards smaller offsets), the I/O processing may determine that the respective requested offset 9 is stored in a compression unit of compressed length 8 kB, e.g. due to the block pointer type CUS in the block pointer to offset 8 (indicating a respective compressed length of 8 kB) being the closest preceding block pointer indicating a start of a compression unit, i.e. indicating that offset 9 relates to the same compression unit as started with the block pointer type CUS in the block pointer of offset 8 (e.g. by observing the compressed length in the block pointer being the preceding block pointer indicating a start of a compression region). In other exemplary embodiments, the block pointer of offset 9 may already directly indicate the respective compressed length of 8 kB of the corresponding respective compression unit CR3.

Furthermore, by reading the respective direct metadata node(s) for observing the block pointers in the vicinity of the respective requested offset 9 (specifically towards smaller offsets), the I/O processing may determine that the respective requested offset 9 is stored at an actual offset of 21 kB in the compressed data of the respective compression region CR1, e.g. due to the two preceding block pointers CRS and CUS in block pointers to offsets 0 and 4 (indicating a respective compressed length of the preceding compression units) indicating the compressed lengths of 9 kB and 12 kB, leading to an actual offset of 21 kB=9 kB+12 kB.

In other words, the compressed length of the corresponding compression unit of the requested offset can be determined by observing and adding the compressed lengths in the preceding block pointers indicating a start of previous compression regions from the start of the corresponding compression region and preceding the start of the corresponding compression unit.

Based on the above, it may be determined that the corresponding offset 9 (relating to data offset 16 to 20 kB in the uncompressed object) is actually stored in a third compression unit CU3 of the corresponding compression region CR1 at an actual offset of 21 kB in the compression region CR in the compressed object and with a total compressed length of 8 kB.

Accordingly, based on the block size of 4 kB and the determined actual offset of 21 kB and the determined compressed length of 8 kB (i.e. the compressed data of the corresponding compression unit CU3 is stored in between the actual data offsets from 21 kB to 29 kB), the I/O processing may determine that the compressed data of the corresponding compression unit CU3 is stored in the sixth to eighth block of the corresponding compression region CR1 (corresponding to the offsets 20 kB to 32 kB in the corresponding compression region, or corresponding to logical offsets 5 to 7 of the corresponding compression region CR1), more specifically covering the data from a relative offset of 1 kB in the sixth block to the relative offset of 1 kB in the eighth block of the corresponding compression region.

The respective sixth to eighth block in the respective compression region CR1 may be read by using the sixth to eighth block pointers in the corresponding compression region (i.e. blocks B6 to B8 based on the block pointers of the logical offsets 5 to 7 of the uncompressed data object based on the logical offsets 5 to 7 of the corresponding compression region CR1) and reading the data of the identified compressed unit of 8 kB from a relative offset of 1 kB in the sixth block to the relative offset of 1 kB in the eighth block of the corresponding compression region CR1.

By then decompressing the corresponding compressed data, the uncompressed data of the compression region CR1 having the uncompressed data of logical offsets 8 to 11 (corresponding to logical offsets 5 to 7 of the corresponding compression region CR1), including the requested offset 9, can be retrieved to return the requested data of logical offset 9 of the uncompressed data object to the requesting client to service the read request as requested.

Accordingly, if a read request is received for a logical offset 9 (e.g. a data offset of equal or larger than 36 kB but smaller than 40 kB, e.g. 2 kB at an offset of 37 kB in the data object, i.e. from 37 kB to 39 kB) in the uncompressed data object, the requested offset will be used to traverse (walk) the metadata tree of the data object down to the direct node level to read the block pointer (of a respective direct metadata node) corresponding to the respective offset assuming that it would point to the block B10 storing the data of offsets of 36 kB up to 40 kB, in the uncompressed data object.

However, by observing the block pointer type "CUM" in the observed block pointer of the requested offset, the I/O processing can identify/determine the corresponding compression region (based on observing the plural preceding block pointers to identify/determine the preceding block pointer indicating the corresponding compression region) and the corresponding compression unit (based on observing the plural preceding block pointers to identify the zero or more preceding block pointers indicating the end of a preceding compression unit).

Furthermore, the I/O processing can identify/determine the actual offset of the corresponding compression unit (based on observing the plural preceding block pointers to identify the compressed length of the zero or more preceding compression units) in the compression region of the compressed data object, and the I/O processing can identify/determine the actual length (compressed length) of the corresponding compression unit (based on observing the plural preceding block pointers to identify the compressed length of the corresponding compression unit) in the compression region of the compressed data object.

Then, based on the above I/O processing, the compressed data of the corresponding compressed "compression unit" can be read based on the block pointers of the corresponding compression region and the determined offset and compressed length in the compressed data of the corresponding compression region. The read "compressed data" of the corresponding compression unit is then decompressed to then return the requested data to the client which issued the read request.

In the above, exemplarily, the compressed lengths of each compression unit after compression are indicated in the (or at least in some of the) block pointers, which may keep the required size of the block pointers low. Then, the offset of a compressed unit in the compression region of the compressed data object may be determined by adding compressed length(s) of the preceding compression units of the same compression region.

However, in other exemplary embodiments, the offset of the compressed unit in the compression region of the compressed object may also be additionally stored in the block pointers in other exemplary embodiments.

For example, based on the above example, the block pointers may also include the offset of the compressed unit in the compression region, as is given exemplarily in the below Table 3:

TABLE 3

| Logical Offset | Data Offset | Pointer Type | Compr. Length | Compr. Offset | Block Pointer |
|---|---|---|---|---|---|
| 0 | 0 kB | CRS | 9 kB | 0 kB | B1 |
| 1 | 4 kB | CUM | | | B2 |

TABLE 3-continued

| Logical Offset | Data Offset | Pointer Type | Compr. Length | Compr. Offset | Block Pointer |
|---|---|---|---|---|---|
| 2 | 8 kB | CUM | | | B3 |
| 3 | 12 kB | CUE | | | B4 |
| 4 | 16 kB | CUS | 12 kB | 9 kB | B5 |
| 5 | 20 kB | CUM | | | B6 |
| 6 | 24 kB | CUM | | | B7 |
| 7 | 28 kB | CUE | | | B8 |
| 8 | 32 kB | CUS | 8 kB | 21 kB | unall. |
| 9 | 36 kB | CUM | | | unall. |
| 10 | 40 kB | CUM | | | unall. |
| 11 | 44 kB | CRE | | | unall. |
| 12 | 48 kB | CRS | 14 kB | 0 kB | B13 |
| 13 | 52 kB | CUM | | | B14 |
| 14 | 56 kB | CUM | | | B15 |
| 15 | 60 kB | CUE | | | B16 |
| 16 | 64 kB | CUS | 10 kB | 14 kB | B17 |
| 17 | 68 kB | CUM | | | B18 |
| 18 | 72 kB | CUM | | | B19 |
| 19 | 76 kB | CUE | | | B20 |
| 20 | 80 kB | CUS | 11 kB | 24 kB | B21 |
| 21 | 84 kB | CUM | | | unall. |
| 22 | 88 kB | CUM | | | unall. |
| 23 | 92 kB | CRE | | | unall. |

Then, for the above read request example, by reading the respective direct metadata node(s) for observing the block pointers in the vicinity of the respective requested offset 9 (specifically towards smaller/preceding offsets), the I/O processing may determine that the respective requested offset 9 is stored at an actual offset of 21 kB in the compressed data of the respective compression region CR1, e.g. due to the block pointer to offset 8 (indicating the respective offset for the corresponding compression unit).

However, as mentioned above, this requires a larger block pointer size to store the additional offset information, but is may make the I/O processing more efficient.

IX.2.4 Exemplary Write Request Handling

Herein, another example is given in connection with a write request, which may be handled similar to the above read request processing. The present write request example is based on the compressed object of FIG. 12B and the modified block pointers according to the example of Table 2 above.

Assume that a write request is issued to rewrite block B17 of the uncompressed data object. Exemplarily, it is assumed that the whole block shall be rewritten (i.e. it is a 4 kB write completely rewriting block B17 in the data object of FIG. 11).

That is, based on the offsets of the uncompressed data object (see Table 1, for example), the write request is indicative of the logical offset 16 and/or the data offset 64 kB, and is further indicative of 4 kB of data to be written to that offset, i.e. exemplarily from offset 64 kB up to 68 kB, in the uncompressed data object.

Based on Table 2, the walking (observing) the metadata tree based on the requested offset (logical offset 16 and/or the data offset 64 kB) of the write request down to the direct metadata node level will conclude in observing the block pointer corresponding to that requested offset in the uncompressed data object, i.e. it will return a block pointer type of CUS being indicative of a compression unit start and being further indicative of a compressed length of 10 kB.

Furthermore, observing the preceding block pointers, corresponding at least to the block pointers of preceding offsets 15 (or 60 kB) to 12 (or 48 kB) until a block pointer type CRS is identified, the I/O processing can determine that the requested offset (logical offset 16 and/or the data offset 64 kB) relates to a compression region starting with the block pointer type CRS in the block pointer to offset 12 (or 48 kB).

Accordingly, it may be determined that the block pointer of offset 12 (or 48 kB) in the uncompressed object corresponds to the actual offset 0 (or 0 kB) in the corresponding compression region (CR2 in this example).

Furthermore, based on the block pointer to offset 12 (or 48 kB), it may be determined that a first compression unit (CU4 in this example) has a compressed length of 14 kB and, based on the single block pointer type CUE at offset 15 (or 60 kB) preceding the block pointer of the requested offset among the block pointers preceding the block pointer of the requested offset from the block pointer to offset 12 (or 48 kB) at the start of the compression region, it may be determined that the requested data is associated with a second compression unit (CU4 in this example) in the corresponding compression region.

Accordingly, the actual offset of the corresponding compressed unit (compressed "compression unit") in the corresponding compression region of the compressed object is determined to be 14 kB (compressed lengths of the preceding compression units in the corresponding compression region) and its length is 10 kB (compressed length of the corresponding compression unit).

Based on the above, the data of offset 14 kB to 24 kB in the compression region is read by reading the blocks of offsets 12 kB (logical offset 3, counting from the corresponding CRS block pointer type) to 20 kB (logical offset 5, counting from the corresponding CRS block pointer type) in the compression region, i.e. the blocks of the block pointers to blocks B16 to B18 and reading the latter 2 kB of block B16 and the full blocks B17 and B18 to read the complete 10 kB of the corresponding compression unit CU5.

Then, the compression unit CU5 is decompressed to retrieve the full uncompressed data of blocks B17 to B20 (16 kB) of the corresponding compression unit CU5 of the uncompressed data object. Based on the write request, the first 4 kB (block 17) is then overwritten to generate the new (written) compression unit CU5 of the uncompressed data object after servicing the write request.

Then, the new compression unit CU5 is compressed and the new compressed length is determined. If the new compressed length is equal to the previous compressed length of the compression unit CU5, then the new compression unit can be written again to block B16 (at offset 2 kB thereof) and to blocks B17 and B18, and the other compression units CU4 and CU6 of the same compression region may remain unaffected. Also the block pointers may be kept unchanged.

On the other hand, if the compressed length changes after compressing the new compression unit CU5 after the write operation, then, the compression unit CU5 may be written and the following one or more compression units (in this example only CU6) may be shifted accordingly, and the compressed length of the compression unit CU5 is updated in the corresponding block pointer(s) for the respective compression unit. Since the other compressed lengths of other compression units do not change, these do not need to be updated.

In order to avoid such shifting of other compression units in a data write that changes the size of a certain compression unit within a compression region, it is possible to provide only one compression unit per compression region (equivalent to no compression region).

In other exemplary embodiments, in order to avoid such shifting of other compression units in a data write that changes the size of a certain compression unit within a compression region, it is possible that additional padding units (free data units available allowing for enlarged compression units to be written later) may be placed between compressed compression units (compressed units) within a compression region, as is exemplarily described in the following.

IX.2.5 Exemplary Usage of Padding Units

Figure 13A:
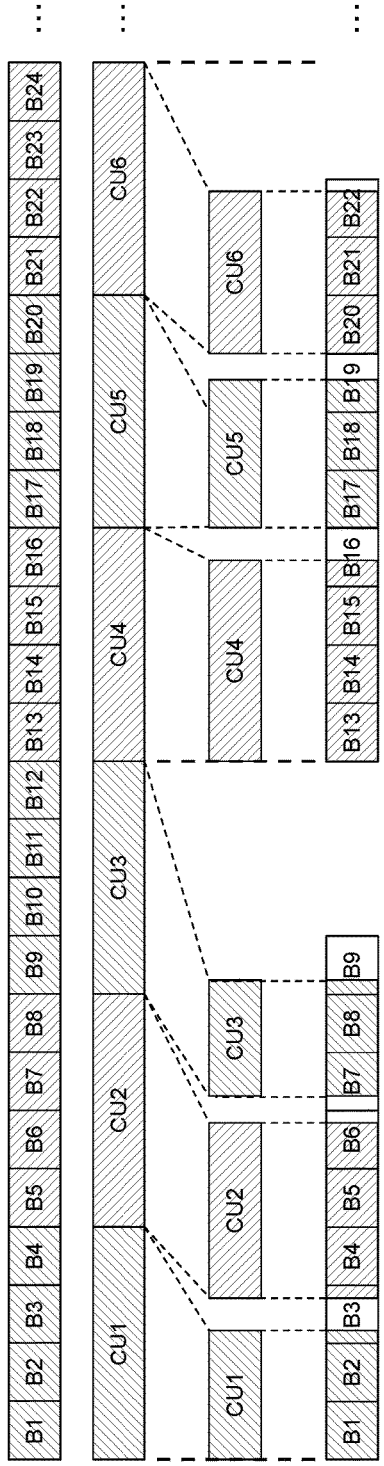
FIG. 13A exemplarily shows a schematic diagram of data compressed compression units of the object of FIG. 11 according to some other exemplary embodiments, and FIG. 13B exemplarily shows a schematic diagram of the exemplary direct node level of the metadata tree structure of the corresponding compressed data object.
Figure 13B:
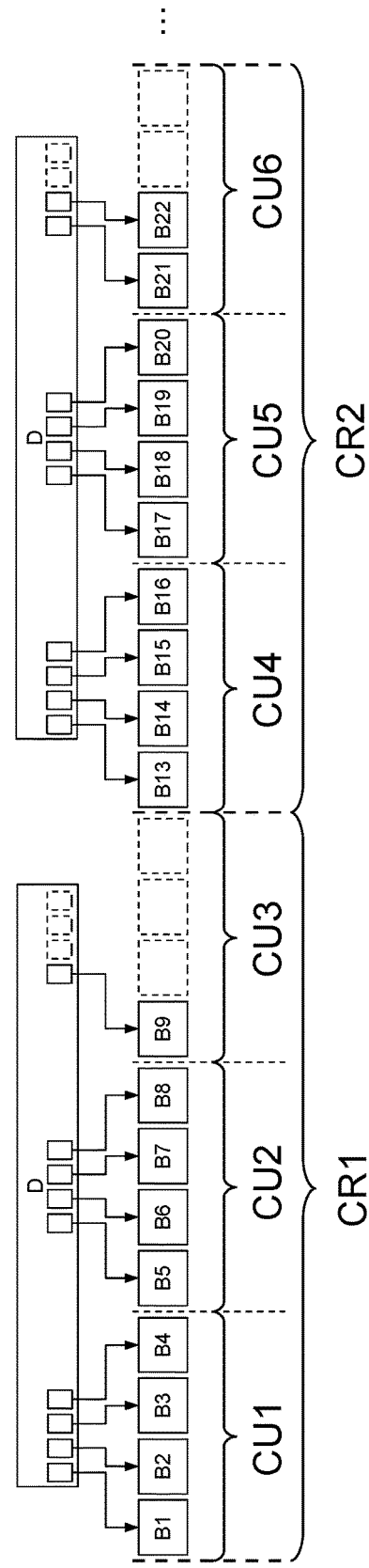

FIG. 13A exemplarily shows a schematic diagram of data compressed compression units of the object of FIG. 11 according to some other exemplary embodiments, and FIG. 13B exemplarily shows a schematic diagram of the exemplary direct node level of the metadata tree structure of the corresponding compressed data object.

FIGS. 13A and 13B are similar to FIGS. 12A and 12B above, with the additional placing of exemplary 2 kB padding units between the adjacent compressed compression units (compressed units) in the respective compression regions.

Accordingly, in the first compression region CR1, a respective padding unit of 2 kB size is placed between the compressed units CU1 and CU2 and between the compressed units CU2 and CU3, and in the second compression region CR2, a respective padding unit of 2 kB size is placed between the compressed units CU4 and CU5 and between the compressed units CU5 and CU6.

According to the above write example, if for example the data of compression unit CU5 is rewritten, the modified new compression unit CU5 is compressed again. Before the write, the compressed length of the compression unit CU5 was exemplarily 10 kB, and if the newly compressed compression unit CU5 (after executing the write to block B17 thereof according to the uncompressed data object) is equal to 10 kB, the new compression unit CU5 can be written to the previous location in the compressed data objects between compressed units CU4 and CU6 without shifting the following compression unit CU6 (this is true with or without padding units).

However, if the compressed length of the new compression unit CU5 (after executing the write operation and after compression thereof) is smaller than the previous compression length thereof, e.g. if the compressed length of the new compression unit CU5 is 9 kB, the new compression unit CU5 can be written to the previous location in the compressed data objects between compressed units CU4 and CU6 without shifting the following compression unit CU6. The padding unit preceding the new compression unit CU5 will remain the same (i.e. 2 kB in the present example), and the other padding unit between the newly written compression unit CU5 and its following compression unit CU6 will even increase (i.e. from 2 kB to 3 kB in the present example).

On the other hand, even if the compressed length of the new compression unit CU5 (after executing the write operation and after compression thereof) becomes larger than the previous compression length thereof, e.g. if the compressed length of the new compression unit CU5 becomes 11 kB, the new compression unit CU5 can be written to the previous location in the compressed data objects between compressed units CU4 and CU6 without shifting the following compression unit CU6, as long as the increase in compressed length after the write operation and recompression of the compression unit CU5 remains smaller or at least equal to the available padding unit size. The padding unit preceding the new compression unit CU5 will remain the same (i.e. 2 kB in the present example), and the other padding unit between the newly written compression unit CU5 and its following compression unit CU6 will decrease (i.e. from 2 kB to 1 kB in the present example), however shifting of any following compression units will not be necessary, at least as long as the increase in compressed length after the write operation and recompression of the compression unit remains smaller or at least equal to the available padding unit size following thereafter.

In such embodiments, preferably, either the block pointers need to store the actual offset of compressed compression units (compressed units) in the compression region (e.g. as in above Table 3), or the size of the respective padding units may need to be stored in the block pointers as well.

For example, padding unit sizes of padding units following a certain compression region may be stored in an unused offset storage portion of block pointers, e.g. for block pointers of the type CUE (such as in Table 4 below):

TABLE 4

| Logical Offset | Data Offset | Pointer Type | Compr. Length | Block Pointer |
|---|---|---|---|---|
| 0 | 0 kB | CRS | 9 kB | B1 |
| 1 | 4 kB | CUM | | B2 |
| 2 | 8 kB | CUM | | B3 |
| 3 | 12 kB | CUE | 2 kB | B4 |
| 4 | 16 kB | CUS | 12 kB | B5 |
| 5 | 20 kB | CUM | | B6 |
| 6 | 24 kB | CUM | | B7 |
| 7 | 28 kB | CUE | 2 kB | B8 |
| 8 | 32 kB | CUS | 8 kB | unall. |
| 9 | 36 kB | CUM | | unall. |
| 10 | 40 kB | CUM | | unall. |
| 11 | 44 kB | CRE | | unall. |
| 12 | 48 kB | CRS | 14 kB | B13 |
| 13 | 52 kB | CUM | | B14 |
| 14 | 56 kB | CUM | | B15 |
| 15 | 60 kB | CUE | 2 kB | B16 |
| 16 | 64 kB | CUS | 10 kB | B17 |
| 17 | 68 kB | CUM | | B18 |
| 18 | 72 kB | CUM | | B19 |
| 19 | 76 kB | CUE | 2 kB | B20 |
| 20 | 80 kB | CUS | 11 kB | B21 |
| 21 | 84 kB | CUM | | unall. |
| 22 | 88 kB | CUM | | unall. |
| 23 | 92 kB | CRE | | unall. |

Alternatively, in other exemplary embodiments, the sizes of padding units may be stored in a storage portion of block pointers of unallocated blocks (such as in Table 5 below).

TABLE 4

| Logical Offset | Data Offset | Pointer Type | Compr. Length | Block Pointer |
|---|---|---|---|---|
| 0 | 0 kB | CRS | 9 kB | B1 |
| 1 | 4 kB | CUM | | B2 |
| 2 | 8 kB | CUM | | B3 |
| 3 | 12 kB | CUE | | B4 |
| 4 | 16 kB | CUS | 12 kB | B5 |
| 5 | 20 kB | CUM | | B6 |
| 6 | 24 kB | CUM | | B7 |
| 7 | 28 kB | CUE | | B8 |
| 8 | 32 kB | CUS | 8 kB | unall. |
| 9 | 36 kB | CUM | | unall. |
| 10 | 40 kB | CUM | | 2 kB. |
| 11 | 44 kB | CRE | | 2 kB |
| 12 | 48 kB | CRS | 14 kB | B13 |
| 13 | 52 kB | CUM | | B14 |
| 14 | 56 kB | CUM | | B15 |
| 15 | 60 kB | CUE | 2 kB | B16 |
| 16 | 64 kB | CUS | 10 kB | B17 |
| 17 | 68 kB | CUM | | B18 |
| 18 | 72 kB | CUM | | B19 |
| 19 | 76 kB | CUE | 2 kB | B20 |
| 20 | 80 kB | CUS | 11 kB | B21 |
| 21 | 84 kB | CUM | | unall. |
| 22 | 88 kB | CUM | | 2 kB |
| 23 | 92 kB | CRE | | 2 kB |

It is to be noted that including the (optional) padding units as discussed exemplarily above may improve I/O handling efficiency since shifting of compression units following after a re-written and recompressed compression unit in the handling of a write request (which does not require decompression/compression processing but may require read and write operations from/to blocks) can be avoided, but on the other hand this decreases the compression efficiency, so it may be preferred that the allowed maximum padding unit size is selected and/or that the padding may be enabled or disabled by and administrator based on preferences and desired performance balance.

It is also possible to provide a padding processing which does not add padding units at the initial writing of a compressed data object, but rather contiguously concatenates adjacent compressed compression units in a compression region to optimize the compression efficiency, but when a compression unit gets re-written due to a write request as discussed above and when it compresses to a smaller compressed size thereafter, it may be preferred that a following padding unit is included at that time according to a size that avoids that the following compression unit needs to be shifted.

For example, while no padding unit may have been provided between two adjacent compression units, when the preceding compression unit gets re-written and a compression length thereof is reduced by a certain amount, a padding unit of a size of the same certain amount is thereafter added in front of the following compression unit so that it does not need to shifted and so that it will not need to be shifted even if the preceding compression unit is rewritten again and then compresses again to a larger compressed length, whereas the increase then does not exceed the certain amount added previously as a padding unit.

IX.2.6 Exemplary Flow Charts Based on Above Aspects

Figure 14:
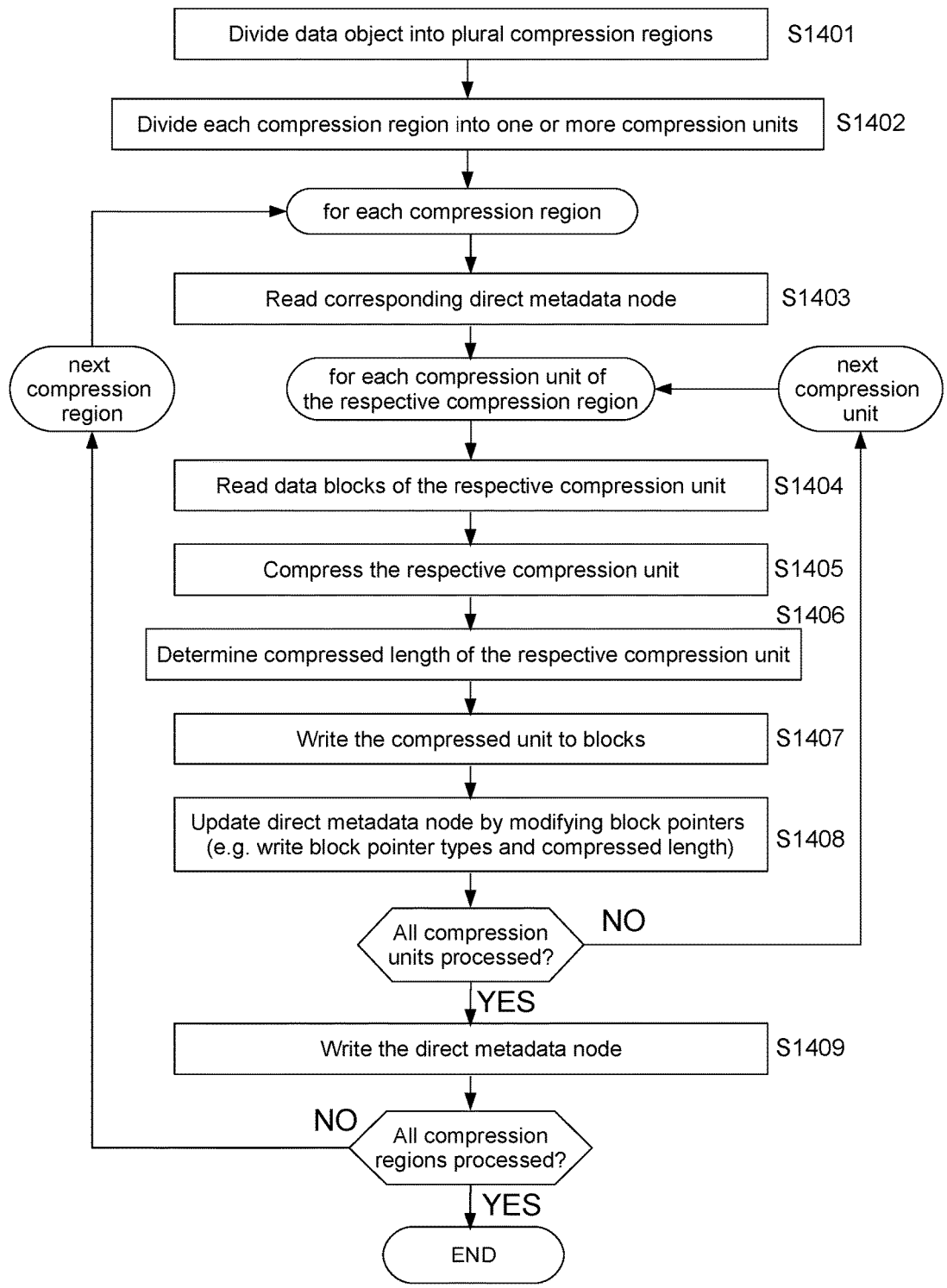
FIG. 14 exemplarily shows a schematic flow chart of a processing for compressing a data object according to exemplary embodiments.

FIG. 14 exemplarily shows a schematic flow chart of a processing for compressing a data object according to exemplary embodiments.

As mentioned above, the present compression aspects may be performed for any objects as discussed above, including a small data object, a large data object (or one or more or all child data objects thereof), a bitmap object (block allocation object), de-deduplication object, and/or holding object. In general, any object being stored as blocks referenced by a metadata tree may be handled according to the compression aspects above and/or below.

In FIG. 14, exemplarily, in step S1401, the data object is divided into a plurality of compression regions. Preferably, the size of the compression region is selected such that each block of a compression region is referenced by a block pointer of the same direct metadata node such that compression regions preferably do not extend cross direct metadata node boundaries.

Furthermore, in step S1402, the data object is divided into a plurality of compression units, wherein each compression region includes one or preferably more compression units.

The compression unit size may be preferably selected dynamically based on a host I/O size. For example, if host issue read (or write) requests of a certain I/O size (or maximum host I/O size), the size of the compression units is preferably selected smaller for smaller host I/O sizes and larger for larger I/O host sizes. For example, the compression unit size may be selected based on a linear relationship with the host I/O size, e.g. such that the compression unit size is preferably between 0.5 to 1.5 times the host I/O size.

Also, or alternatively, the compression unit size may be preferably selected dynamically based on an access frequency of access requests to the data object, preferably such that a smaller compression unit size is selected for larger access frequencies and a lower compression unit size is selected for smaller access frequencies. This has the advantage that smaller compression unit sizes (leading to improved I/O handling efficiency) may be selected for objects that are accessed very frequently, and larger compression unit sizes (leading to improved compression efficiency) may be selected for objects that are accessed less frequently.

The following steps will then exemplarily be performed for one, more or preferably all compression regions.

For a respective compression region of the plural compression regions, the corresponding direct metadata node is read (including its block pointers, preferably) in step S1403.

The following steps will then exemplarily be performed for one, more or preferably all compression units of the respective compression region.

In step S1404, the data blocks of the compression unit (in the uncompressed object) are read based on block pointers observed in the direct metadata node as read in step S1403.

Upon reading the data of the compression unit (in the uncompressed object), the compression unit is compressed based on a selected compression algorithm in step S1405. Preferably, the respective compression unit is compressed independently of the other compression units.

Then, in step S1406, upon compression of the respective compression unit, the compressed length, i.e. the length/size of the compression unit after compression thereof (length of the compressed unit) is determined, and the compressed "compression unit" ("compressed unit") corresponding to the respective compression unit is written to blocks in step S1407.

In step S1408, the direct metadata node is updated by modifying the block pointers for the respective compression unit, and particularly the block pointer types (including indicating the start, middle and/or end of the respective compression unit) and the compressed length are updated (written) to the block pointers in the direct metadata node for the respective compression unit.

Then, if the processing has not been performed yet for all compression units of the respective compression region, the process continues with steps S1404 to S1408 for the next compression unit of the corresponding compression region.

In the above, steps S1407 and S1408 are performed iteratively for each compression unit, however, in other exemplary embodiments, the process may first loop through steps S1404 and S1405 for all compression units, and then may execute steps S1407 and S1408 for all compression units together. In other words, the process may write all contiguous compression units (with or without padding units, depending on whether padding is enabled or not) of one compression region in one contiguous write operation. That is, the process may write the whole compressed "compression region" in one write operation to blocks, and then the process may update all block pointers associated with the compression region in the direct metadata node.

Then, when the compression region (or all compression regions related to blocks referenced by block pointers of the same direct metadata node) are processed, the process may write the (updated) direct metadata node in step S1409, and return to step S1403 for the next compression region, or end if the (all) compression regions of the object have been processed accordingly.

Figure 15:
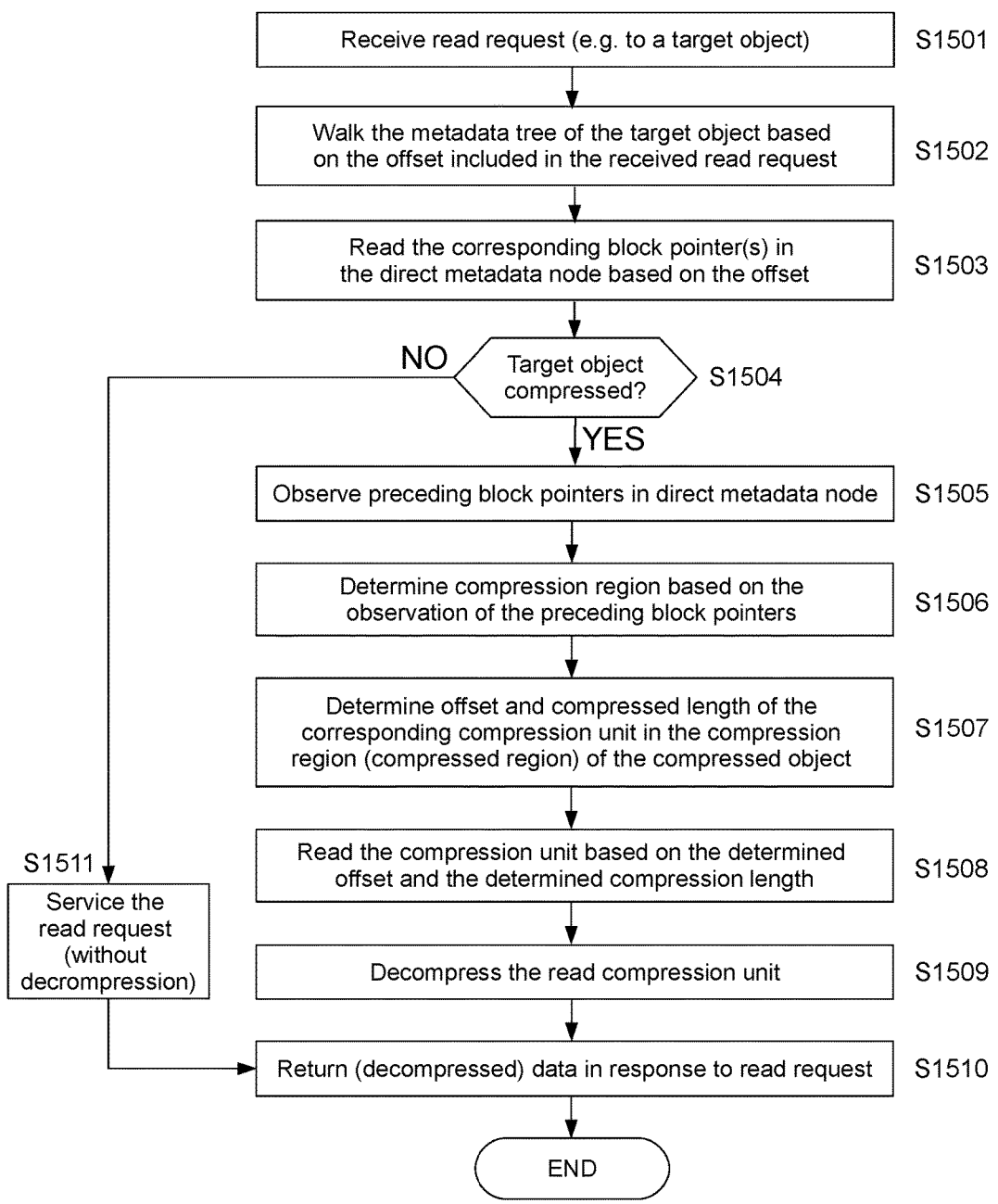
FIG. 15 exemplary shows a schematic flow chart of a processing for handling a read request to a compressed data object according to exemplary embodiments.

FIG. 15 exemplary shows a schematic flow chart of a processing for handling a read request to a compressed data object according to exemplary embodiments.

In step S1501, a read request to a data object is exemplarily received, indicating an offset (e.g. logical offset, such as a logical block number or other logical number, or a data offset) of data to be read in the target data object.

In step S1502, based on the offset indicated in the received read request, the metadata tree of the target data object (potentially starting with walking a metadata tree of an indirection object, as discussed above, and potentially with identifying a cluster node apparatus having the respective object or child object thereof) is observed by walking the metadata tree from the root metadata node level down to the leaf metadata nodes being the direct metadata nodes pointing to data blocks.

In step S1503, the respective block pointer of the identified direct metadata node being associated with the offset indicated in the received read request is read, and based on the read block pointer it is determined in step S1504 whether the data object is compressed or not.

If step S1504 returns NO (i.e. the data object is not compressed, and the read block pointer simply points to a data block from which the uncompressed data can be read), the read request is processed (serviced) in step S1511 without any decompression of data, i.e. the read uncompressed data is returned to the requesting client/host.

On the other hand, if step S1504 returns YES (e.g. in that the respective block pointer is determined to be a modified block pointer indicative of a block pointer type such as one of the above-described types, e.g. of type CRS, CRE, CUS, CUM, CUE or CUL, or other), other block pointers of preceding offsets in the direct metadata node are observed in step S1505 (e.g. by observing all preceding block pointers until a block pointer type indicating a start of a compression region is observed or identified, or by observing all preceding block pointers of a total block pointer number determined based on a pre-determined or set maximum compression region size).

In step S1506, the corresponding compression region is determined based on the observed preceding block pointers, e.g. by identifying a closest preceding block pointer of a type indicating a start of a compression region.

In step S1507, based on the observed preceding block pointers, the compressed length of a corresponding compression unit is determined (e.g. by observing the closest preceding block pointer indicating a compressed length, or by observing the compressed length indicated by a closest preceding block pointer having a block pointer type indicating a start of a compression unit, or, in some exemplary embodiments by observing the block pointer corresponding to the offset indicated in the read request).

Furthermore, based on the observed preceding block pointers, the process of step S1507 determines the actual offset of the corresponding compressed "compression unit" (compressed unit) of the corresponding compression unit (e.g. by observing the preceding block pointers and adding indicated compressed lengths of preceding compression units, or by an offset directly indicated in a block pointer of the corresponding compression unit).

Then, upon determining the compressed length of the corresponding compression unit and the actual offset thereof in the respective compressed compression region of the compressed object, the corresponding compression unit is read in step S1508 and then decompressed in step S1509 to obtain the uncompressed data of the corresponding compression unit.

Based on the obtained uncompressed data of the corresponding compression unit (or merely based on the read uncompressed data if step S1504 returned NO), the read request is serviced by returning the respective uncompressed data to the client/host in step S1510.

Figure 16:
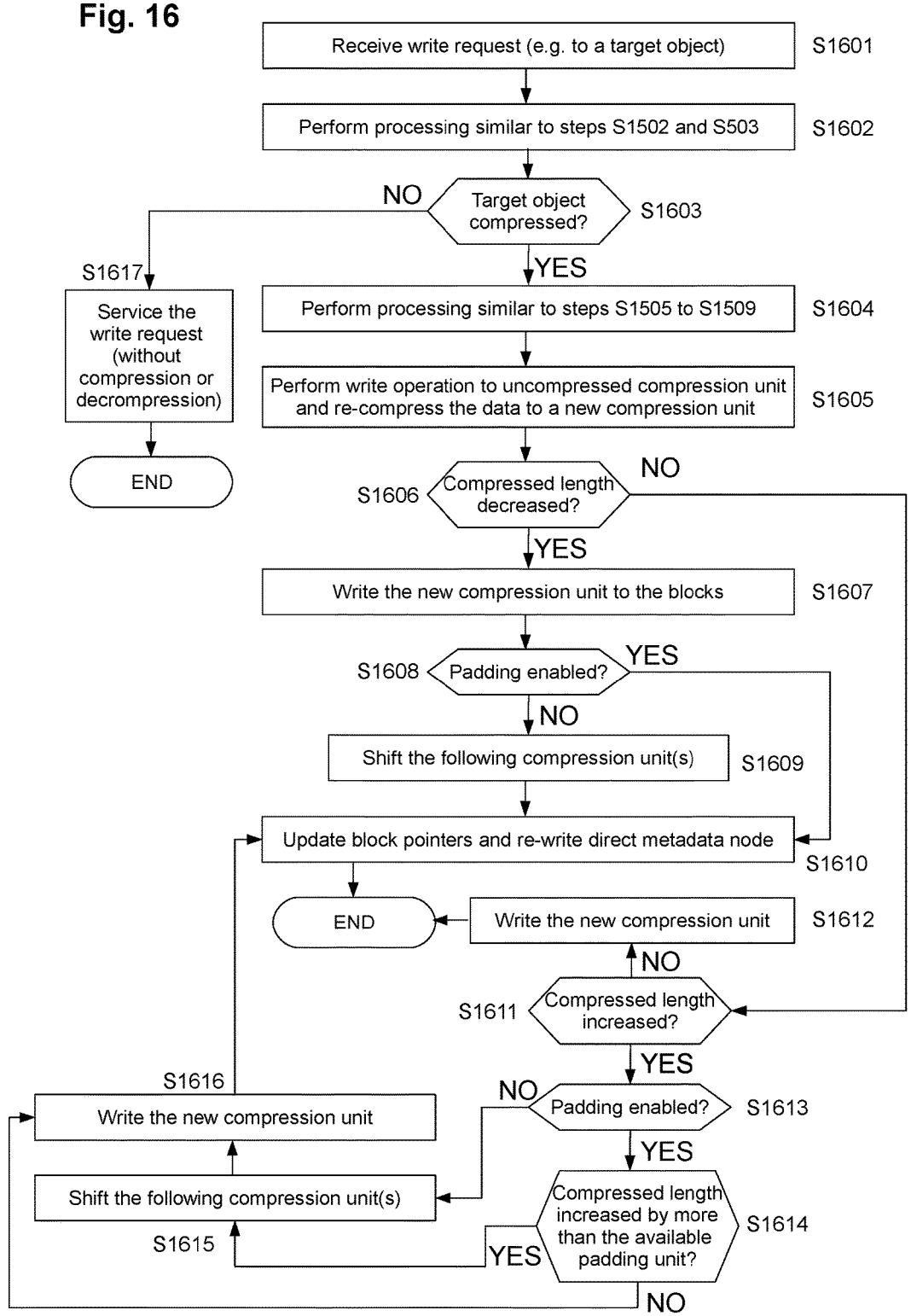
FIG. 16 exemplary shows a schematic flow chart of a processing for handling a write request to a compressed data object according to exemplary embodiments.

FIG. 16 exemplary shows a schematic flow chart of a processing for handling a write request to a compressed data object according to exemplary embodiments.

In step S1601, a write request to a data object is exemplarily received, indicating an offset (e.g. logical offset, such as a logical block number or other logical number, or a data offset) to which data is to be written (re-written) in the target data object.

In step S1602, the same processing as in steps S1502 and S1503 may be performed. For example, based on the offset indicated in the received write request, the metadata tree of the target data object is observed by walking the metadata tree from the root metadata node level down to the leaf metadata nodes being the direct metadata nodes pointing to data blocks. Then, the respective block pointer of the identified direct metadata node being associated with the offset indicated in the received write request is read, and based on the read block pointer it is determined in step S1603 whether the data object is compressed or not.

If step S1603 returns NO (i.e. the data object is not compressed, and the read block pointer simply points to a data block storing the uncompressed data), the write request is processed (serviced) in step S1617 without any decompression of data and without any compression of data, i.e. the uncompressed data is overwritten within the block or the uncompressed data of the block is read, modified based on the write request and stored in the block (or written to a new block).

On the other hand, if step S1603 returns YES (e.g. in that the respective block pointer is determined to be a modified block pointer indicative of a block pointer type such as one of the above-described types, e.g. of type CRS, CRE, CUS, CUM, CUE or CUL, or other), other block pointers of preceding offsets in the direct metadata node are observed in step S1604 (e.g. by observing all preceding block pointers until a block pointer type indicating a start of a compression region is observed or identified, or by observing all preceding block pointers of a total block pointer number determined based on a pre-determined or set maximum compression region size).

Basically, step S1604 may execute similar processing as steps S1505 to S1509 for a read request as discussed above.

For example, upon and based on observing the other block pointers of preceding offsets in the direct metadata node, the process may determine the corresponding compression region based on the observed preceding block pointers (e.g. by identifying a closest preceding block pointer of a type indicating a start of a compression region).

Furthermore the process may determine, based on the observed preceding block pointers, the compressed length of a corresponding compression unit (e.g. by observing the closest preceding block pointer indicating a compressed length, or by observing the compressed length indicated by a closest preceding block pointer having a block pointer type indicating a start of a compression unit, or, in some exemplary embodiments by observing the block pointer corresponding to the offset indicated in the write request).

Furthermore, based on the observed preceding block pointers, the process may determine the actual offset of the corresponding compressed "compression unit" (compressed unit) of the corresponding compression unit (e.g. by observing the preceding block pointers and adding indicated compressed lengths of preceding compression units, or by an offset directly indicated in a block pointer of the corresponding compression unit).

Then, upon determining the compressed length of the corresponding compression unit and the actual offset thereof in the respective compressed compression region of the compressed object, the corresponding compression unit is read and then decompressed to obtain the uncompressed data of the corresponding compression unit.

In step S1605, the requested write operation is performed on the obtained uncompressed data of the corresponding compression unit (e.g. by overwriting the corresponding portion of the uncompressed data based on the write request), and the new compression unit (after performing the write operation to the uncompressed data) is decompressed again.

Now, optionally the process is differently, depending on whether padding may optionally be enabled, or whether it is even implemented or not (since padding units may be optional, and other exemplary embodiments may be implemented without utilizing padding units). If padding is not enabled or not implemented, the same process may be followed by removing the optional steps S1608 and S1613 and all other steps resulting from the YES-branches thereof.

Upon compressing the new compression unit, its compressed length may be determined and may be compared with the previous associated compressed length of the same compression unit before executing the write request.

For example, in step S1606 it may be determined exemplarily whether the compressed length of the corresponding compression unit has been decreased. If the result is YES, the new compression unit can be written (e.g. in step S1607) to the same previous offset in the compressed object or compressed region since there will be sufficient space so that the following compression unit does not need to be shifted to higher offsets.

However, depending on whether the padding is enabled (or implemented) the following compression unit(s) may need to be shifted to lower offsets or may be kept at the same offset as it was previously stored.

Accordingly, If step S1608 returns NO (i.e. padding is not enabled or not implemented), then the following compression units are shifted (re-written without decompression) in step S1609 to be stored contiguously to the new compression unit as written in step S1607. Then, the block pointers of the new compression unit (to which the write was performed) are updated and the direct metadata node with the updated block pointers is written in step S1610, and the process may then end.

On the other hand, if step S1608 returns YES, the following compression unit(s) may be kept unchanged and do not need shifting to lower offsets, because the gained storage space due to the reduced compressed length of the new compression unit may be used as a padding unit or for enlarging a previous padding unit available after the corresponding compression unit. Then, the process continues in that the block pointers of the new compression unit (to which the write was performed) are updated and the direct metadata node with the updated block pointers is written in step S1610, and the process may then end without shifting the following compression unit(s).

However, if the compressed length of the corresponding new compression unit has not been decreased and step S1606 returns NO, the compressed may have remained the same (typically unlikely but possible), and step S1611 exemplarily checking whether the compressed length has increased may also give NO. Then, the new compression unit (of a same compression size) may be just written to the same portion of the compressed region, and the other compression units do not need shifting and the block pointers in the metadata node do not need to be updated, and the process may end.

Finally, if the compressed length of the corresponding new compression unit has been increased and step S1611 returns YES, step S1613 may again check whether padding is enabled or implemented. If not (step S1613 returns NO), then the following compression unit(s) are shifted in step S1615 (by the amount of increase in the compressed length of the new compression unit to be written) and then the new compression unit is written in step S1616 into the compressed.

On the other hand, if padding is enabled or implemented and step S1613 returns YES, the size of the currently available padding unit is determined, and if its size is sufficient (i.e. the decompressed length of the new compression unit has not increased by more than the available padding unit size, and step S1614 returns NO), the new compression unit is just written in step S1616 without shifting of the following compression unit(s). Otherwise, the size of the currently available padding unit is not sufficient (i.e. the decompressed length of the new compression unit has actually increased by more than the available padding unit size, and step S1614 returns YES), the new compression unit is written in step S1616 after shifting of the following compression unit(s) in step S1615 before the process ends.

As will be appreciated by one of skill in the art, the present invention and aspects and exemplary embodiments, as described hereinabove and in connection with the accompanying figures, may be embodied as a method (e.g., a computer-implemented process, a business process, or any other process), apparatus (including a device, machine, system, computer program product, and/or any other apparatus), or a combination of the foregoing.

Accordingly, exemplary embodiments of the present invention may take the form of an entirely hardware embodiment, an entirely software embodiment (including firmware, resident software, micro-code, etc.), or an embodiment combining software and hardware aspects that may generally be referred to herein as a "system" Furthermore, embodiments of the present invention may take the form of a computer program product on a computer-readable medium having computer-executable program code embodied in the medium.

It should be noted that arrows may be used in drawings to represent communication, transfer, or other activity involving two or more entities. Double-ended arrows generally indicate that activity may occur in both directions (e.g., a command/request in one direction with a corresponding reply back in the other direction, or peer-to-peer communications initiated by either entity), although in some situations, activity may not necessarily occur in both directions.

Single-ended arrows generally indicate activity exclusively or predominantly in one direction, although it should be noted that, in certain situations, such directional activity actually may involve activities in both directions (e.g., a message from a sender to a receiver and an acknowledgement back from the receiver to the sender, or establishment of a connection prior to a transfer and termination of the connection following the transfer). Thus, the type of arrow used in a particular drawing to represent a particular activity is exemplary and should not be seen as limiting.

Embodiments of the present invention are described hereinabove with reference to flowchart illustrations and/or block diagrams of methods and apparatuses, and with reference to a number of sample views of a graphical user interface generated by the methods and/or apparatuses. It will be understood that each block of the flowchart illustrations and/or block diagrams, and/or combinations of blocks in the flowchart illustrations and/or block diagrams, as well as the graphical user interface, can be implemented by computer-executable program code.

The computer-executable program code may be provided to a processor of a general purpose computer, special purpose computer, or other programmable data processing apparatus to produce a particular machine, such that the program code, which executes via the processor of the computer or other programmable data processing apparatus, generate means for implementing the functions/acts/outputs specified in the flowchart, block diagram block or blocks, figures, and/or written description.

These computer-executable program code may also be stored in a computer-readable memory that can direct a computer or other programmable data processing apparatus to function in a particular manner, such that the program code stored in the computer readable memory produce an article of manufacture including instruction means which implement the function/act/output specified in the flowchart, block diagram block(s), figures, and/or written description.

The computer-executable program code may also be loaded onto a computer or other programmable data processing apparatus to cause a series of operational steps to be performed on the computer or other programmable apparatus to produce a computer-implemented process such that the program code which executes on the computer or other programmable apparatus provides steps for implementing the functions/acts/outputs specified in the flowchart, block diagram block(s), figures, and/or written description. Alternatively, computer program implemented steps or acts may be combined with operator or human implemented steps or acts in order to carry out an embodiment of the invention.

It should be noted that terms such as "server" and "processor" may be used herein to describe devices that may be used in certain embodiments of the present invention and should not be construed to limit the present invention to any particular device type unless the context otherwise requires. Thus, a device may include, without limitation, a bridge, router, bridge-router (brouter), switch, node, server, computer, appliance, or other type of device. Such devices typically include one or more network interfaces for communicating over a communication network and a processor (e.g., a microprocessor with memory and other peripherals and/or application-specific hardware) configured accordingly to perform device functions.

Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies (e.g., Bluetooth), networking technologies, and internetworking technologies.

It should also be noted that devices may use communication protocols and messages (e.g., messages generated, transmitted, received, stored, and/or processed by the device), and such messages may be conveyed by a communication network or medium.

Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message.

Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention.

Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator).

Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code maybe converted (e.g., via a translator, assembler, or compiler) into a computer executable form.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Computer program logic implementing all or part of the functionality previously described herein may be executed at different times on a single processor (e.g., concurrently) or may be executed at the same or different times on multiple processors and may run under a single operating system process/thread or under different operating system processes/threads.

Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies.

The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Any suitable computer readable medium may be utilized. The computer readable medium may be, for example but not limited to, an electronic, magnetic, optical, electromagnetic, infrared, or semiconductor system, apparatus, device, or medium.

More specific examples of the computer readable medium include, but are not limited to, an electrical connection having one or more wires or other tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device.

The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies.

The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

While certain exemplary embodiments have been described and shown in the accompanying drawings, it is to be understood that such embodiments are merely illustrative of and are not restrictive on the broad invention, and that the embodiments of invention are not limited to the specific constructions and arrangements shown and described, since various other changes, combinations, omissions, modifications and substitutions, in addition to those set forth in the above paragraphs, are possible.

Those skilled in the art will appreciate that various adaptations, modifications, and/or combination of the just described embodiments can be configured without departing from the scope and spirit of the invention. Therefore, it is to be understood that, within the scope of the appended claims, the invention may be practiced other than as specifically described herein. For example, unless expressly stated otherwise, the steps of processes described herein may be performed in orders different from those described herein and one or more steps may be combined, split, or performed simultaneously.

The invention claimed is:

1. A non-transitory computer readable medium storing a computer program including instructions to cause a computer to execute a method for managing data compression of data objects in a data storage system, the method comprising:
   storing a data object to one or more storage devices of the data storage system in units of data blocks;
   storing a metadata structure for the data object including one or more direct metadata nodes, each direct metadata node including block pointers referencing respective data blocks of the respective data object, for managing I/O access to the data object based on the metadata structure of the data object;
   dividing the data object into plural compression units;
   compressing each compression unit of the plural compression units to a respective compressed unit associated with the respective compression unit; and
   modifying, for each compression unit, block pointers of the direct metadata node associated with respective data blocks of the respective compression unit on the basis of the associated compressed unit;
   wherein managing I/O access to the data object after compression thereof is based on the metadata structure of the data object and based on the modified block pointers of direct metadata nodes of the metadata structure of the data object,
   wherein the metadata structure for the data object includes a metadata tree including a root metadata node and the one or more direct metadata nodes, and optionally further including one or more indirect metadata nodes, and
   wherein a metadata node structure of the metadata tree of the data object is built based on the data object in the uncompressed state, and, upon compression of the data object, managing I/O access to the data object is based on the same tree structure of the metadata tree of the data object as built based on the data object in the uncompressed state and further based on the modified block pointers of the direct metadata nodes of the metadata tree of the data object.

2. The non-transitory computer readable medium according to claim 1, wherein
   each block pointer of a direct metadata node of the metadata structure is associated with a respective data block being included in one of the compression units of the data object in the uncompressed state, and,
   for each block pointer, the corresponding modified block pointer is associated with the compressed unit that is associated with the compression unit including the respective data block.

3. The non-transitory computer readable medium according to claim 2, wherein,
   for each block pointer, the corresponding modified block pointer indicates a location of the associated block in the compressed unit associated with the respective the compression unit including the associated data block.

4. The non-transitory computer readable medium according to claim 2, wherein, for managing I/O access directed to a respective data block of the data object based on the metadata structure of the data object, the method further includes:
   identifying a block pointer associated with the respective data block of the data object, and
   observing the identified block pointer,
   observing multiple other modified block pointers of the direct metadata node, which includes the identified block pointer, and
   identifying a compressed unit associated with the respective compression unit including the respective data block based on the identified block pointer and/or the observed multiple other modified block pointers of the direct metadata node, which includes the identified block pointer.

5. The non-transitory computer readable medium according to claim 4, wherein
   at least one of the observed block pointers including the identified block pointer and the multiple other modified block pointers of the direct metadata node, which includes the identified block pointer, is indicative of a compressed length of the compressed unit associated with the respective compression unit including the respective data block.

6. The non-transitory computer readable medium according to claim 4, wherein
   at least one of the observed block pointers including the identified block pointer and the multiple other modified block pointers of the direct metadata node, which includes the identified block pointer, is indicative of an offset of the compressed unit, which is associated with the respective compression unit including the respective data block, in the data object in the compressed state.

7. The non-transitory computer readable medium according to claim 4, wherein
the method further comprises determining an offset of the compressed unit, which is associated with the respective compression unit including the respective data block, in the data object in the compressed state based on compressed lengths of one or more compression units preceding the respective compressed unit associated with the respective compression unit including the respective data block.

8. The non-transitory computer readable medium according to claim 1, the method further comprising:
receiving an I/O access request directed to a respective data block of the data object in the uncompressed state;
identifying a compressed unit associated with the compression unit including the respective data block based on the modified block pointers;
decompressing the identified compressed unit to obtain the compression unit including the respective data block; and
executing the I/O access request based on the obtained compression unit.

9. The non-transitory computer readable medium according to claim 8, wherein
identifying the compressed unit associated with the compression unit including the respective data block is performed based on a compressed length of the compressed unit associated with the compression unit determined based on the modified block pointers and/or based on an offset of the compressed unit, which is associated with the respective compression unit including the respective data block, in the data object in the compressed state.

10. The non-transitory computer readable medium according to claim 1, the method further comprising:
dividing the data object into a plurality of compression regions, each compression region including one or more of the compression units; and
storing, for each compression region, the one or more compressed units of the same respective compression region into a concatenated compressed region contiguously comprising the compressed units of the respective compression region, optionally further including padding units between adjacent compressed units to provide a padding space for re-written compressed units of increased compressed length.

11. The non-transitory computer readable medium according to claim 10, the method further comprising:
receiving a write access request directed to a respective data block of the data object in the uncompressed state;
identifying a compressed unit associated with the compression unit including the respective data block based on the modified block pointers;
decompressing the identified compressed unit to obtain the compression unit including the respective data block;
executing the write access request based on the obtained compression unit to modify the obtained compression unit based on the write request;
re-compressing the modified compression unit;
storing the re-compressed compression unit as a new compressed unit in place of the previously identified compressed unit into the compressed region; optionally further including shifting one or more following compressed units of the compressed region, in particular when a compressed length of the re-compressed compression unit has increased or when a compressed length of the re-compressed compression unit has decreased.

12. A data storage system, comprising:
a plurality of node apparatuses communicably connected to each other,
the data storage system being configured, in particular by a processor, to execute:
storing a data object to one or more storage devices of the data storage system in units of data blocks;
storing a metadata structure for the data object including one or more direct metadata nodes, each direct metadata node including block pointers referencing respective data blocks of the respective data object for managing I/O access to the data object based on the metadata structure of the data object;
dividing the data object into plural compression units;
compressing each compression unit of the plural compression units to a respective compressed unit associated with the respective compression unit; and
modifying, for each compression unit, block pointers of the direct metadata node associated with respective data blocks of the respective compression unit on the basis of the associated compressed unit;
wherein managing I/O access to the data object after compression thereof is based on the metadata structure of the data object and based on the modified block pointers of direct metadata nodes of the metadata structure of the data object,
wherein the metadata structure for the data object includes a metadata tree including a root metadata node and the one or more direct metadata nodes, and optionally further including one or more indirect metadata nodes, and
wherein a metadata node structure of the metadata tree of the data object is built based on the data object in the uncompressed state, and, upon compression of the data object, managing I/O access to the data object is based on the same tree structure of the metadata tree of the data object as built based on the data object in the uncompressed state and further based on the modified block pointers of the direct metadata nodes of the metadata tree of the data object.

13. A node apparatus for use in a data storage system according to claim 12, comprising:
an interface for establishing a communication connection to one or more other node apparatuses of the data storage system;
one or more storage devices for storing data; and
a storage controller for controlling a data storage distribution in the data storage system, including:
storing a data object to one or more storage devices of the data storage system in units of data blocks;
storing a metadata structure for the data object including one or more direct metadata nodes, each direct metadata node including block pointers referencing respective data blocks of the respective data object for managing I/O access to the data object based on the metadata structure of the data object;
dividing the data object into plural compression units;
compressing each compression unit of the plural compression units to a respective compressed unit associated with the respective compression unit; and
modifying, for each compression unit, block pointers of the direct metadata node associated with respective data blocks of the respective compression unit on the basis of the associated compressed unit;

wherein managing I/O access to the data object after compression thereof is based on the metadata structure of the data object and based on the modified block pointers of direct metadata nodes of the metadata structure of the data object, wherein the metadata structure for the data object includes a metadata tree including a root metadata node and the one or more direct metadata nodes, and optionally further including one or more indirect metadata nodes, and wherein a metadata node structure of the metadata tree of the data object is built based on the data object in the uncompressed state, and, upon compression of the data object, managing I/O access to the data object is based on the same tree structure of the metadata tree of the data object as built based on the data object in the uncompressed state and further based on the modified block pointers of the direct metadata nodes of the metadata tree of the data object.

14. A method for managing data compression of data in a data storage system, comprising:

storing a data object to one or more storage devices of the data storage system in units of data blocks;

storing a metadata structure for the data object including one or more direct metadata nodes, each direct metadata node including block pointers referencing respective data blocks of the respective data object for managing I/O access to the data object based on the metadata structure of the data object;

dividing the data object into plural compression units;

compressing each compression unit of the plural compression units to a respective compressed unit associated with the respective compression unit; and modifying, for each compression unit, block pointers of the direct metadata node associated with respective data blocks of the respective compression unit on the basis of the associated compressed unit;

wherein managing I/O access to the data object after compression thereof is based on the metadata structure of the data object and based on the modified block pointers of direct metadata nodes of the metadata structure of the data object, wherein the metadata structure for the data object includes a metadata tree including a root metadata node and the one or more direct metadata nodes, and optionally further including one or more indirect metadata nodes, and wherein a metadata node structure of the metadata tree of the data object is built based on the data object in the uncompressed state, and, upon compression of the data object, managing I/O access to the data object is based on the same tree structure of the metadata tree of the data object as built based on the data object in the uncompressed state and further based on the modified block pointers of the direct metadata nodes of the metadata tree of the data object.

* * * * *